United States Patent [19]

Shigemura et al.

[11] Patent Number: 4,551,009
[45] Date of Patent: Nov. 5, 1985

[54] ELECTROSTATIC COPYING APPARATUS

[75] Inventors: Yutaka Shigemura, Takarazuka; Hiroshi Kimura, Habikino; Masahiko Hisajima, Osaka; Isao Yada, Neyagawa; Shinobu Satonaka, Toyonaka; Seiji Kaminaga, Hirakata, all of Japan

[73] Assignee: Mita Industrial Co., Ltd., Japan

[21] Appl. No.: 451,184

[22] Filed: Dec. 20, 1982

[30] Foreign Application Priority Data

| Dec. 21, 1981 | [JP] | Japan | 56-207562 |
| Dec. 28, 1981 | [JP] | Japan | 56-212707 |
| Dec. 28, 1981 | [JP] | Japan | 56-198684[U] |
| Dec. 29, 1981 | [JP] | Japan | 56-210298 |
| Dec. 29, 1981 | [JP] | Japan | 56-210299 |
| Jan. 13, 1982 | [JP] | Japan | 57-4216 |
| Jan. 18, 1982 | [JP] | Japan | 57-6657 |
| Jan. 19, 1982 | [JP] | Japan | 57-7090 |

[51] Int. Cl.⁴ .................................. G03G 21/00
[52] U.S. Cl. ........................... 355/15; 355/14 R; 355/14 SH
[58] Field of Search .............. 355/3 R, 15, 3 SH, 8, 355/11, 14 SH, 14 R, 14 CU, 47–51, 66

[56] References Cited

U.S. PATENT DOCUMENTS

| 3,900,258 | 8/1975 | Hoppner et al. | 355/8 X |
| 4,057,341 | 11/1977 | Sohm | 355/8 |
| 4,170,414 | 10/1979 | Hubert et al. | 355/14 SH |
| 4,174,172 | 11/1979 | Lane | 355/15 |
| 4,278,345 | 7/1981 | Davis | 355/15 |
| 4,348,103 | 9/1982 | Kawazu et al. | 355/15 |
| 4,465,272 | 8/1984 | Kajita et al. | 271/246 |

Primary Examiner—Richard L. Moses
Attorney, Agent, or Firm—Beveridge, DeGrandi & Weilacher

[57] ABSTRACT

An electrostatic copying apparatus having a semiautomatic document supplying and discharging device and a sorter, in addition to its main body. The main body of the apparatus includes a rotatable photosensitive member, means for forming a latent electrostatic image on the photosensitive member, a developer, a transfer unit, a conveying unit for conveying a copying paper, a cleaner and a heat fixing device. Various improvements have been made in the manner of controlling cleaning, the manner of controlling the delivery of a copying paper, the manner of controlling troubleshooting and display, the manner of controlling interrupting of copying, the manner of controlling heating, and the manner of distributing electric power.

6 Claims, 29 Drawing Figures

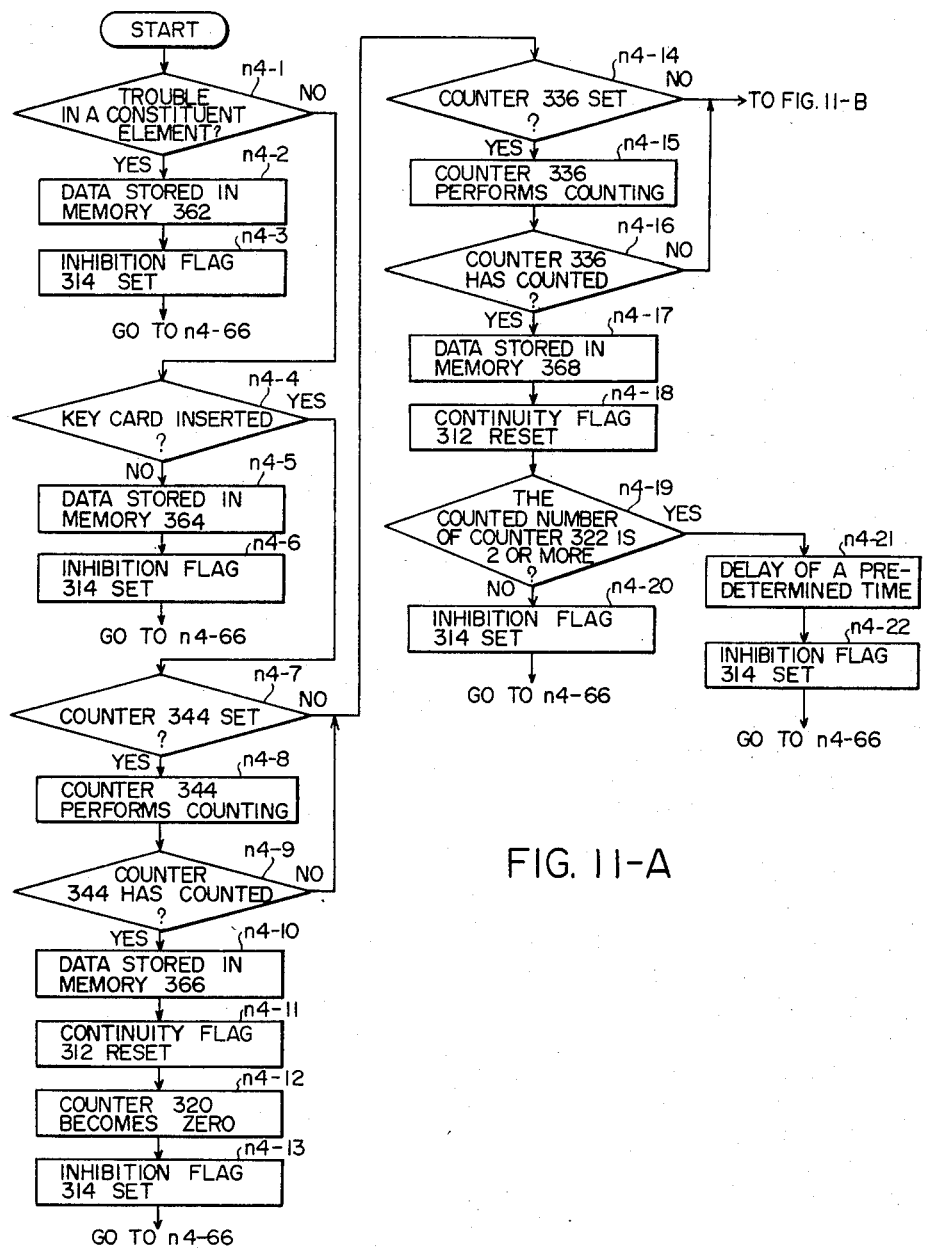
FIG. 11-A

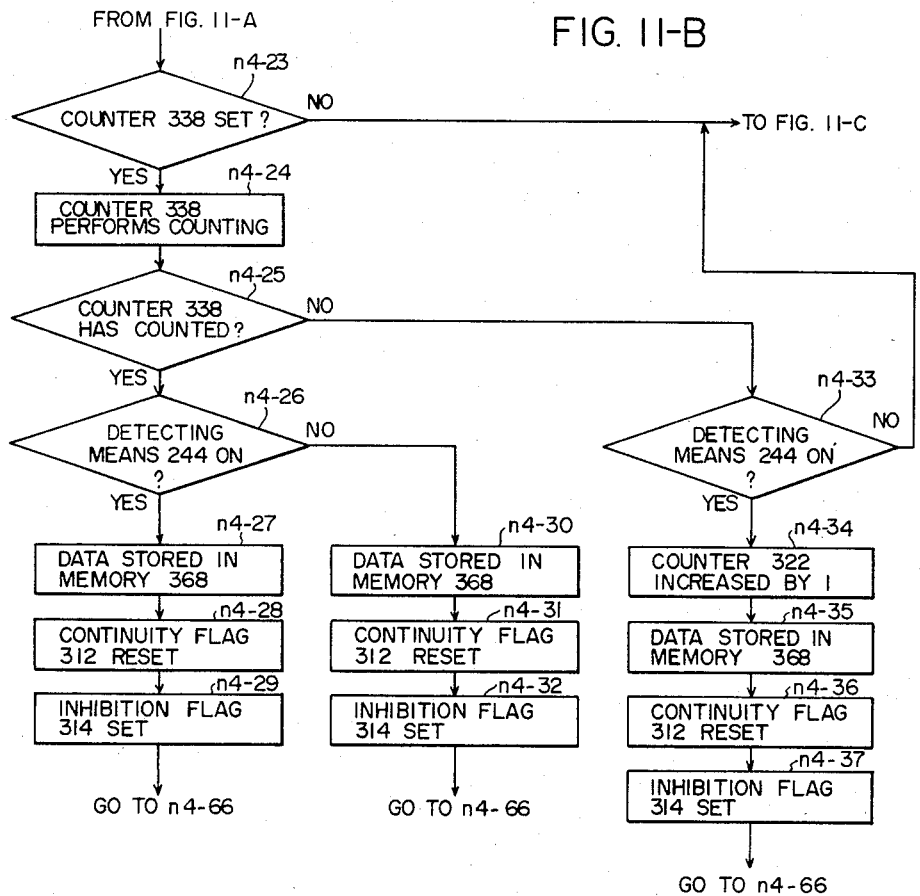

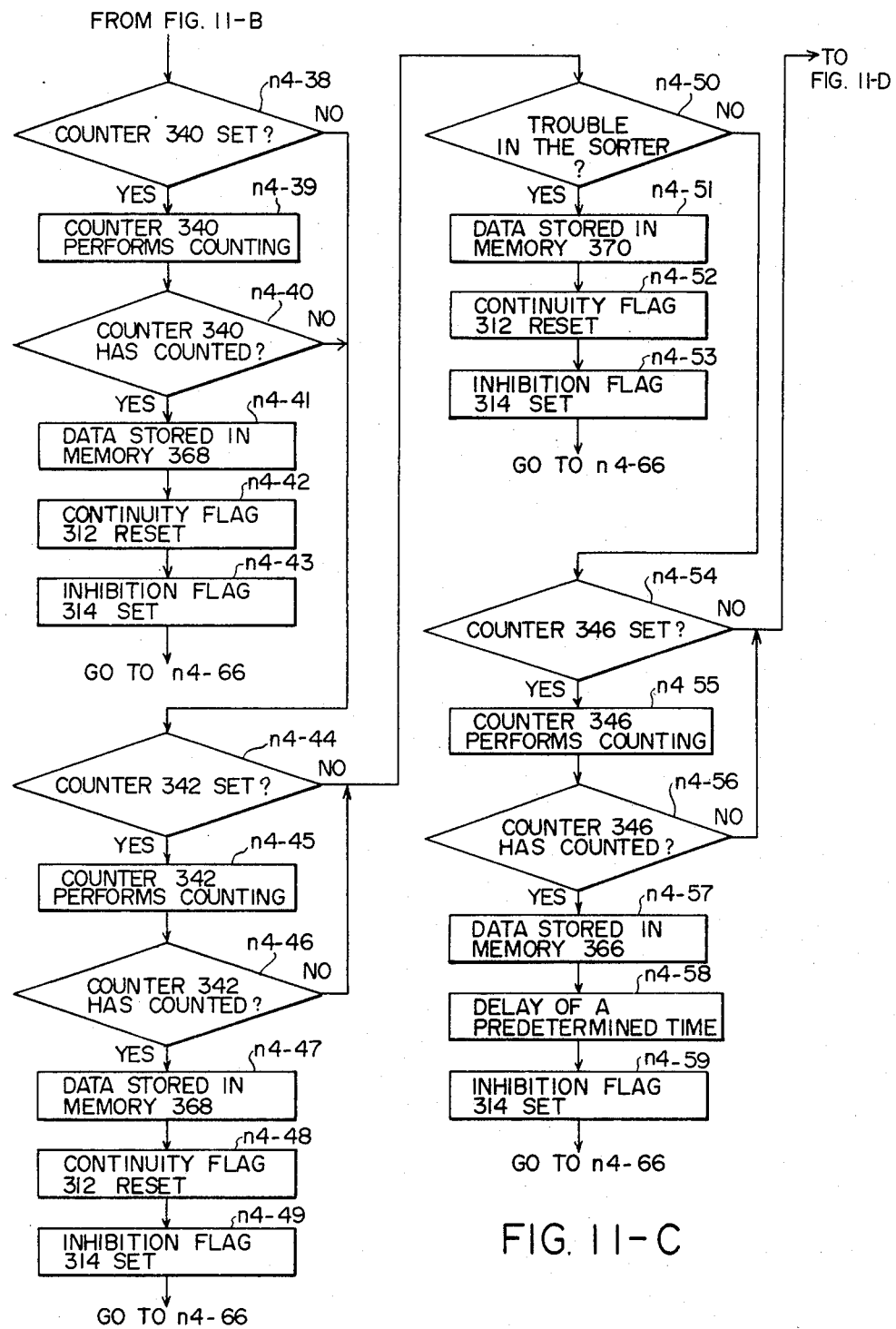
FIG. 11-C

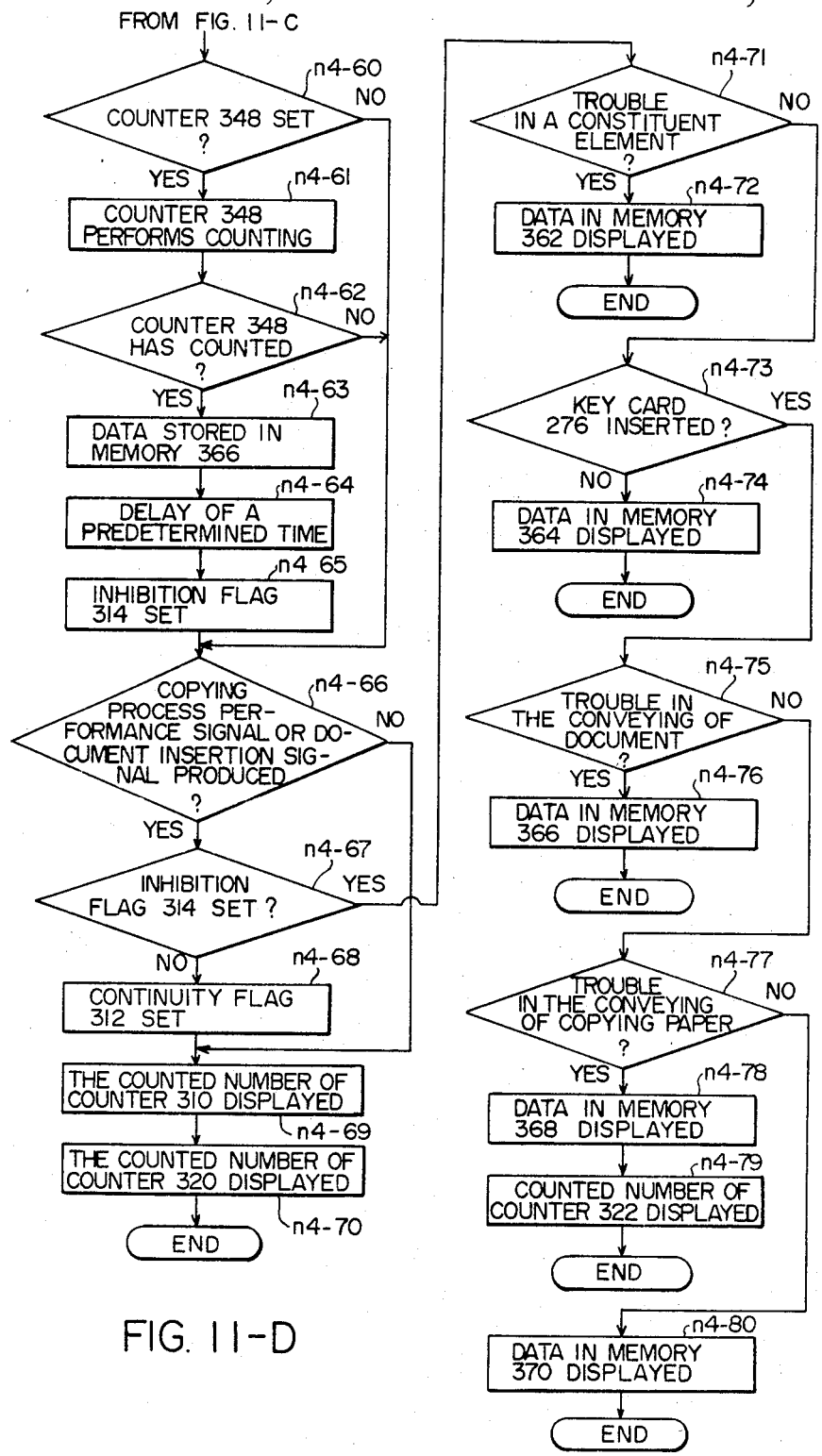
FIG. 11-D

FIG. 12-A 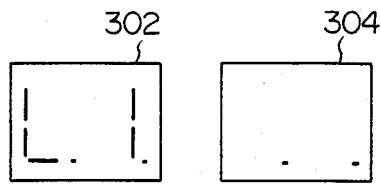
FIG. 12-B 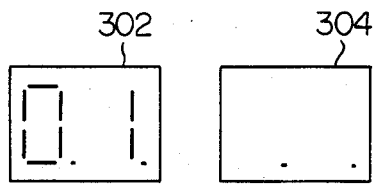
FIG. 12-C 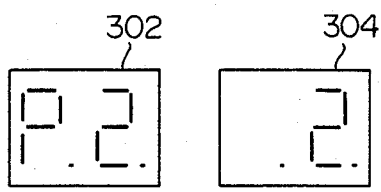
FIG. 12-D 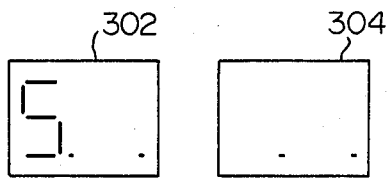

ELECTROSTATIC COPYING APPARATUS

FIELD OF THE INVENTION

This invention relates to certain improvements in an electrostatic copying apparatus.

DESCRIPTION OF THE PRIOR ART

Electrostatic copying apparatuses of various types have been suggested and come into commercial acceptance in the past. In a typical electrostatic copying apparatus, a rotating drum having a photosensitive member disposed on its peripheral surface is provided, and around the rotating drum are located a charging zone, an exposure zone, a developing zone, a transfer zone, a peeling zone and a cleaning zone in this order in the rotating direction of the rotating drum. In the charging zone, the photosensitive member is charged to a specified polarity by the action of a charging corona discharge device, and in the exposure zone, the image of a document to be copied is projected onto the photosensitive member, whereby the charge on the photosensitive member is selectively eliminated and a latent electrostatic image is formed on the photosensitive member. In the developing zone, a toner is applied to the latent electrostatic image on the photosensitive member by, for example, a developing means of the magnetic brush type to develop the latent electrostatic image into a toner image. In the transfer zone, the toner image on the photosensitive member is transferred onto a copying paper conveyed through the transfer zone. In the peeling zone, the copying paper contacted with the photosensitive member in the transfer zone is peeled off from the photosensitive member. In the cleaning zone, the toner remaining on the photosensitive member after the transfer is removed by, for example, the action of a cleaning blade to be in contact with the photosensitive member. In the meantime, the copying paper having the toner image transferred thereto, which has been peeled from the photosensitive member in the peeling zone, is passed through a fixing device such as a heat fixing device whereby the toner image is fixed to the copying paper in the fixing device.

As is well known, the electrostatic copying apparatus described above frequently has a semi-automatic document supplying and discharging device and a sorter annexed thereto. The semi-automatic document supplying and discharging device feeds a document inserted by hand into its document introducing section to a document supporting transparent plate disposed on the upper surface of the housing of the main body of the electrostatic copying apparatus. The sorter is actuated when multiple copies are to be formed from each of a plurality of documents, and sorts the copying papers having a fixed toner image which are discharged from the main body of the electrostatic copying apparatus.

The conventional electrostatic copying apparatus, however, has various inconveniences or defects in regard to the following operations and devices which will be described in detail hereinafter.

(1) Control of the positioning of the cleaning blade adapted to be selectively positioned at its operating position at which it is brought into contact with the photosensitive member and at its non-operating position at which it is moved away from the photosensitive member, when the cleaning blade is used with the magnetic brush-type developing means;

(2) Control of continued delivery of copying papers in response to the copying process performed continuously, when there is used a copying paper feed device loaded with a copying paper cassette containing a plurality of stacked paper sheets;

(3) Display control for making the operator aware that the electrostatic copying apparatus should not perform the copying process;

(4) Displaying of the number of copying papers to be removed by hand (i.e., copying papers present in and outside the paper conveying passage), when a trouble occurs in the conveying of paper;

(5) Counting of the number of copying cycles when a trouble occurs in the transfer of a document in a semi-automatic document supplying and discharging device annexed to the electrostatic copying apparatus;

(6) Realization of interruption in the copying process when the semi-automatic document supplying and discharging device is annexed to the electrostatic copying apparatus;

(7) Control based on the temperature of the surface or its vicinity of the photosensitive member;

(8) Control of the energization or deenergization of an electric heating means when a heat-fixing device containing the electronic heating means is used;

(9) Control of distributing an electric power when the heat-fixing device having the electric heating means is used; and

(10) electrical detecting devices for temperature, etc.

SUMMARY OF THE INVENTION

The general object of this invention is to remove the various inconveniences and defects existing in conventional electrostatic copying apparatuses and to improve such apparatuses in various respects.

Various specific objects of this invention will become apparent from the following detailed description of the invention taken in conjunction with the accompanying drawings.

BRIEF DESCRIPTION OF THE DRAWINGS

FIGS. 11-A to 11-D are flow charts showing the manner of controlling trouble shooting and display in the copying apparatus shown in FIG. 1;

FIGS. 12-A to 12-D are simplified views showing examples of display means in the copying apparatus shown in FIG. 1;

DETAILED DESCRIPTION OF THE PREFERRED EMBODIMENTS

The invention will be described in detail with reference to the accompanying drawings.

General Outline of Copying Apparatus

The outline of the construction of one embodiment of an electrostatic copying apparatus improved variously in accordance with this invention will be described.

Figure 1:
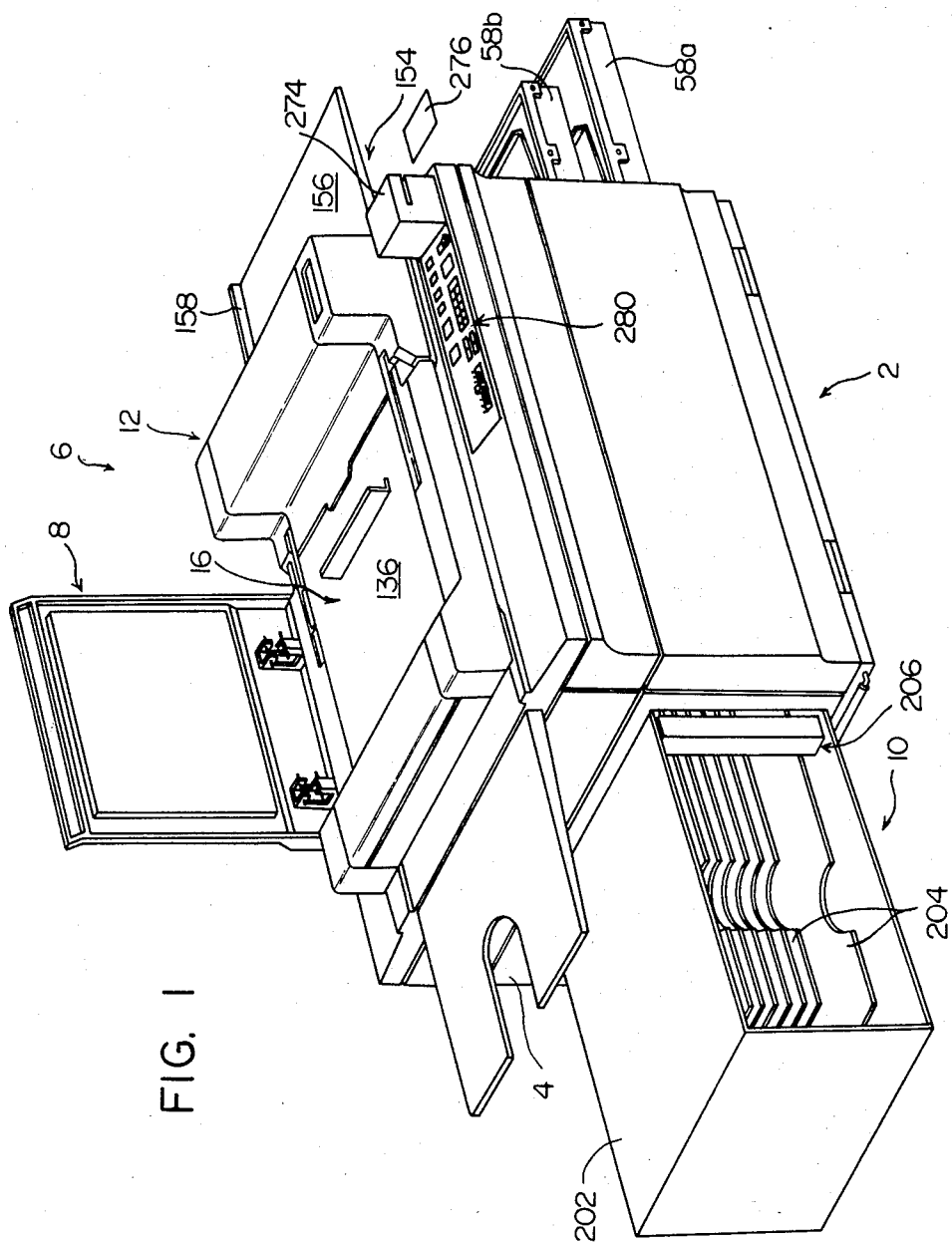
FIG. 1 is a perspective view of one embodiment of the copying apparatus constructed in accordance with this invention in a condition in which a semi-automatic document supplying and discharging device is held in its operating position.
Figure 2:
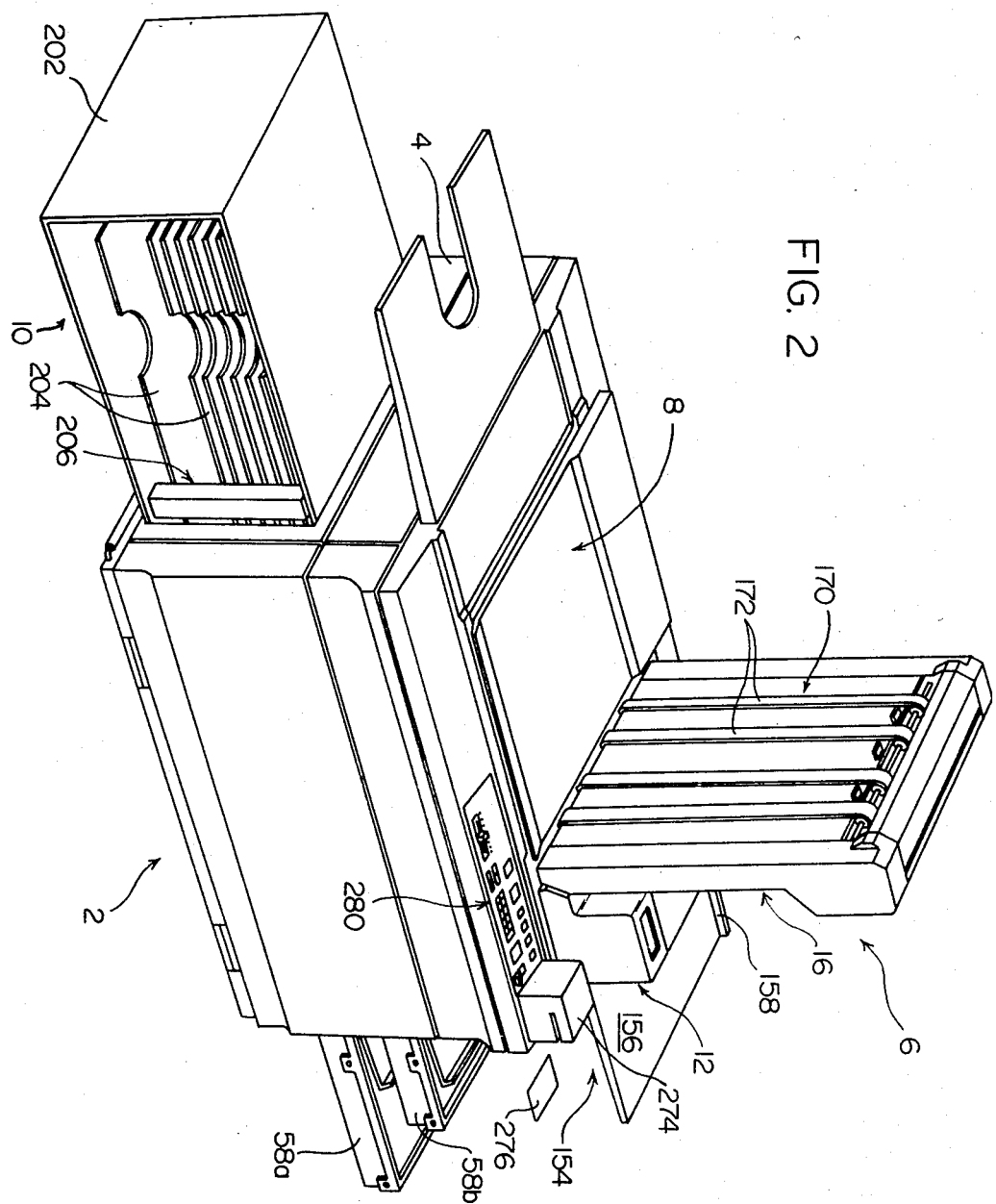
FIG. 2 is a perspective view of the copying apparatus of FIG. 1 in a condition in which the semi-automatic document supplying and discharging device is held in its non-operating position.

With reference to FIGS. 1 and 2, the illustrated electrostatic copying apparatus has a main body shown generally at 2 which includes a nearly rectangularly-shaped housing 4. The copying apparatus further includes a semi-automatic document supplying and discharging device shown generally at 6 and annexed to the upper surface of the housing 4, a document holding mechanism shown generally at 8 and annexed similarly to the upper surface of the housing 4, and a sorter shown generally at 10 and annexed to one side surface of the housing 4.

The semi-automatic document supplying and discharging device 6 includes a stationary support frame structure 14 mounted on the top of the housing 4 adjacent to one side edge of a transparent plate 12 (FIG. 3) disposed on the top of the housing 4, and a movable main frame structure 16 mounted for free turning about an axis extending along said one side edge of the transparent plate 12 and between an operating position (the position shown in FIG. 1) at which it covers the transparent plate 12 and a non-operating position (the position shown in FIG. 2 which is displaced about 90° from the above operating position in a clockwise direction as viewed from the right bottom in FIGS. 1 and 2) at which it brings the transparent plate 12 to view. On the other hand, the document holding device 8 is mounted such that it is free to turn between an operating position at which it covers the transparent plate 12 (the position shown in FIG. 2) and a non-operating position (the position shown in FIG. 1 displaced about 90° from the above operating position as viewed from the right top in FIGS. 1 and 2) at which it brings the transparent plate 12 to view, and about an axis extending along the other side edge of the transparent plate 12 which extends substantially at right angles to the pivot axis of the main frame structure 16 of the semi-automatic document supplying and discharging device 6. In positioning a document to be copied on the transparent plate 12 by utilizing the semi-automatic document supplying and discharging device 6 in the above-illustrated electrostatic copying apparatus, the document holding device 8 is brought to the non-operating position and the main frame structure 16 of the semi-automatic document supplying and discharging device 6 is brought to the operating position. When the document to be copied is to be positioned on the transparent plate 12 by a manual operation without utilizing the semi-automatic device 6 (for example, when the document is a thick one such as a book or one having relatively high rigidity, such as a thick sheet of paper or a metal plate), the operator brings the main frame structure 16 of the semi-automatic device 6 to the non-operating position, then places the document on the desired site of the transparent plate 12, turns the document holding device 8 to the above operating position, and thus covers the transparent plate 12 and the document thereon with the document holding device 8. In withdrawing the document after the end of a copying cycle, the document holding device 8 is turned to the non-operating position.

Figure 3:
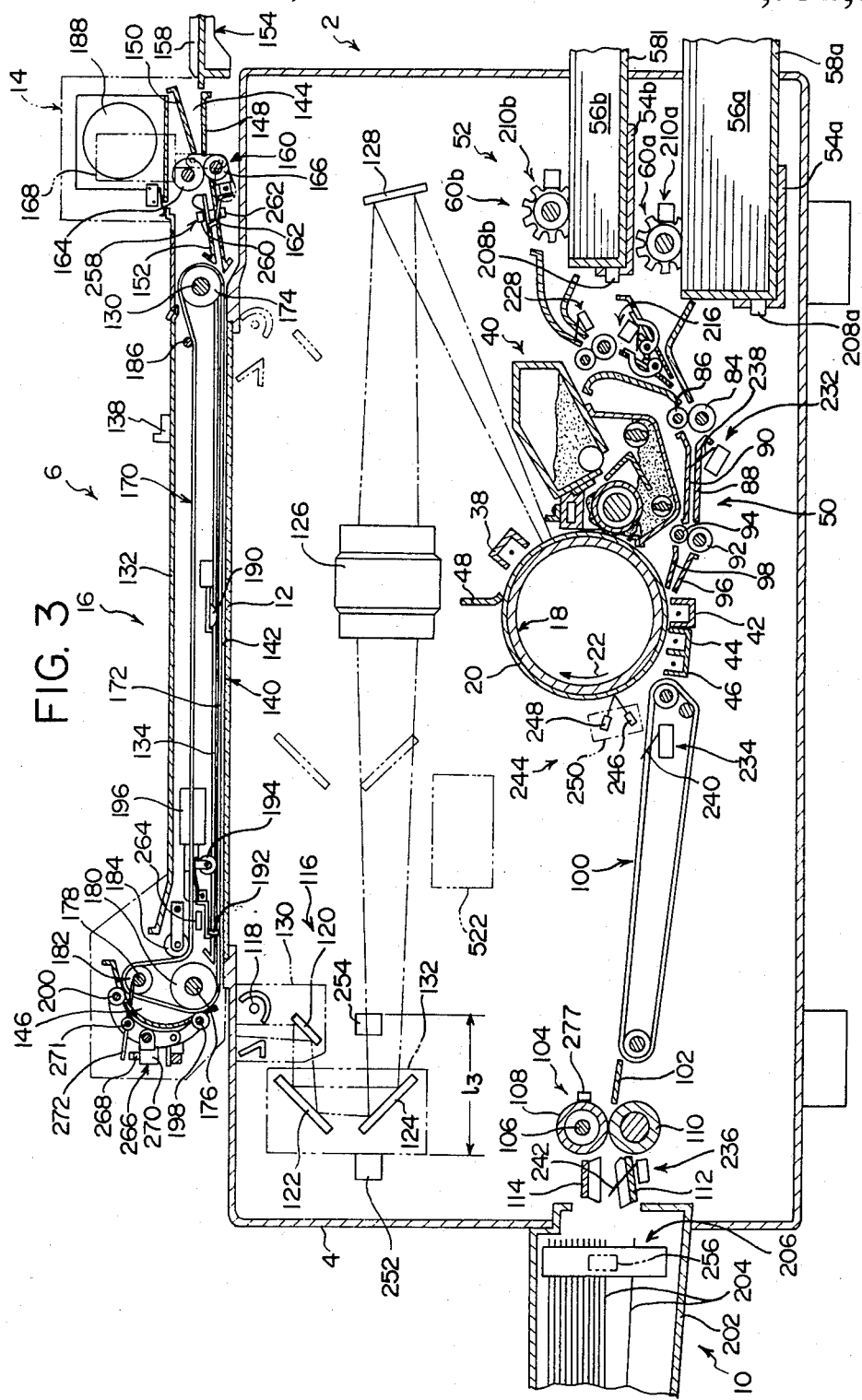
FIG. 3 is a simplified sectional view of the copying apparatus shown in FIG. 1.
Figure 4:
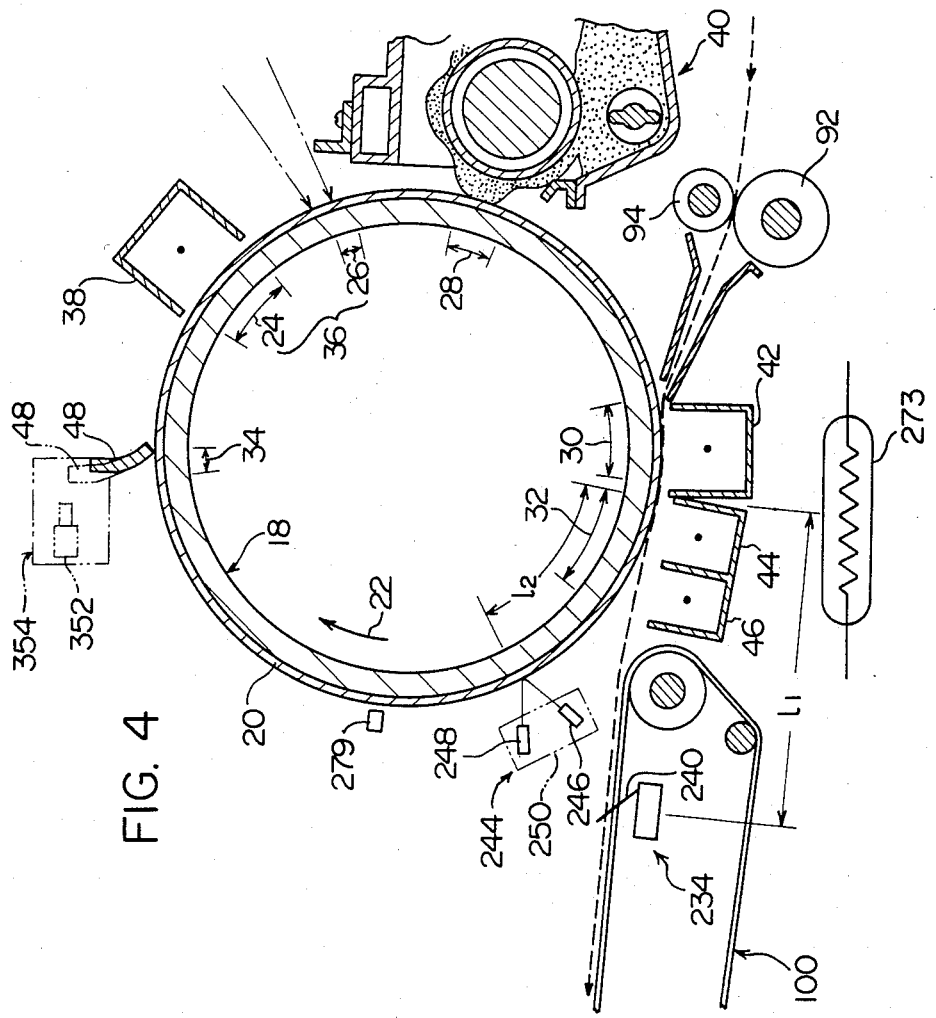
FIG. 4 is a simplified partial sectional view showing a rotating drum and its vicinity in the copying apparatus shown in FIG. 1.

With reference to FIG. 3, the main body 2 of the copying apparatus will be described. The transparent plate 12 on which to place a document to be copied is disposed on the upper surface of the housing 4. A cylindrical rotating drum 18 is rotatably mounted substantially centrally at the lower part of the housing 4, and an endless photosensitive member 20 is provided on the peripheral surface of the rotating drum 18. It is also possible to use an endless belt element known to those skilled in the art in place of the rotating drum 18 and to dispose the photosensitive member on the surface of the endless belt element. With reference to FIG. 4 together with FIG. 3, around the rotating drum to be rotated in the direction of an arrow 22 are located a charging zone 24, an exposure zone 26, a developing zone 28, a transfer zone 30, a peeling zone 32 and a cleaning zone 34 in this sequence as viewed in the rotating direction of the rotating drum 18. The charging zone 24 and the exposure zone 26, taken together, form a latent electrostatic image-forming zone 36. A charging corona discharge device 38 is disposed in the charging zone 24, and a developing means 40 of the magnetic brush type in any desired form is disposed in the developing zone 28. A transfer corona discharge device 42 is disposed in the transfer zone 30, and peeling corona discharge devices 44 and 46 are disposed in the peeling zone 32. In the cleaning zone 34, a cleaning blade 48 is provided.

Figure 5:
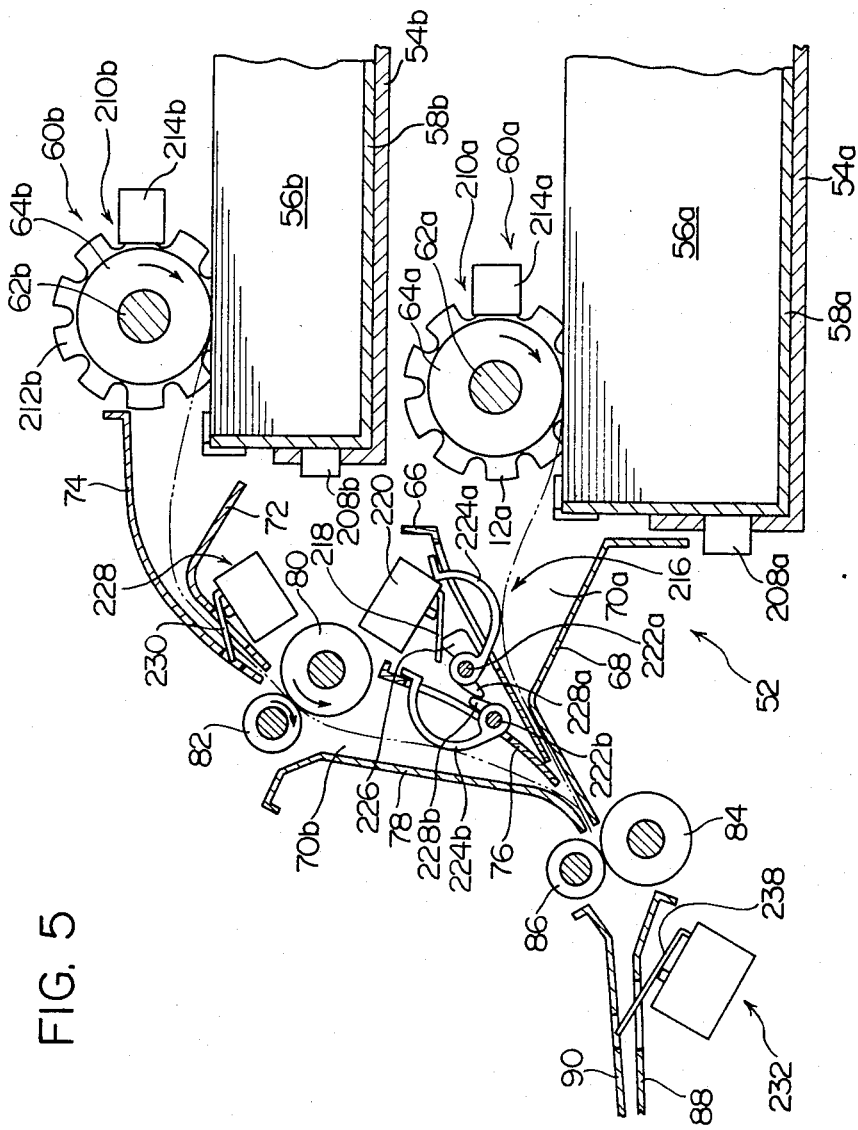
FIG. 5 is a simplified partial sectional view showing a paper feed device in the copying apparatus shown in FIG. 1.

A paper conveying means shown generally at 50 is provided in the lower portion of the housing 4. A paper feed device 52 is disposed at the upstream end portion (the right end portion in FIG. 3) of the paper conveying means 50. With reference to FIG. 5 taken in conjunction with FIG. 3, the paper feed device 52 includes a first cassette-receiving section 54a and a second cassette-receiving section 54b located above it. The first cassette-receiving section 54a receives a paper cassette 58a containing a plurality of stacked copying paper sheets 56a, and the second cassette-receiving section 54b receives a paper cassette 58b containing a plurality of stacked copying paper sheets 56b. A first paper supply means 60a and a second paper supply means 60b are provided respectively in the first cassette-receiving section 54a and the second cassette-receiving section 54b. The first paper supply means 60a is comprised of a support shaft 62a and a supply roller 64a fixed thereto, and the second paper supply means 60b is comprised of a support shaft 62b and a supply roller 64b fixed thereto. To the first cassette-receiving section 54a is annexed a first paper introducing passage 70a defined by a pair of guide plates 66 and 68. Likewise, a second paper introducing passage 70b defined by a pair of guide plates 72 and 74 and a pair of guide plates 76 and 78 is annexed to the second cassette-receiving section 54b. A pair of supply assisting rollers 80 and 82 are provided between the pair of guide plates 72 and 74 and the pair of guide plates 76 and 78. Further, with reference to FIG. 3, a pair of conveyor rollers 84 and 86 are provided at a point of junction of the first paper introducing passage 70a and the second paper introducing passage 70b, and following this pair of conveyor rollers 84 and 86, a pair of guide plates 88 and 90, a pair of conveyor rollers 92 and 94 and a pair of guide plates 96 and 98 are provided. The downstream end of the pair of guide plates 96 and 98 extend to the upstream end of the transfer zone 30. A conveyor belt mechanism 100 is disposed downstream of the peeling zone 32 as viewed in the paper conveying direction. A guide plate 102 is disposed downstream of the conveyor belt mechanism 100, and a heat-fixing device 104 is disposed downstream of the guide plate 102. The heat-fixing device 104 is comprised of a heating roller 108 having an electrical heating means 106 therein, and a press-contact roller 110 cooperating with the heating roller 108. A pair of guide plates 112 and 114 are disposed downstream of the heat-fixing device 104. In the paper conveying means 50 of the aforesaid construction, a copying paper is supplied through the first paper introducing passage 70a from the paper cassette 58a in the paper feed device 52 or through the second paper introducing passage 70b from the paper cassette 58b (the paper feed device 52 will be described in more detail hereinafter), and conveyed to the transfer zone 30 by the pair of conveyor rollers 84 and 86, the pair of guide plates 88 and 90, the pair of conveyor rollers 92 and 94, and the pair of guide plates 96 and 98. The paper is brought into contact with the photosensitive member 20 on the rotating drum 18 in the transfer zone 30, then peeled from the photosensitive member 20 in the peeling zone 32, thereafter conveyed by the conveyor belt mechanism 100, introduced into the heat-fixing device 104 via the guide plate 102, and thereafter passed through the pair of guide plates 112 and 114 and discharged into the sorter 10.

In the upper portion of the housing 4, there is provided an optical unit generally shown at 116 for scanning and exposing a document on the transparent plate 8 and projecting its image onto the photosensitive member 20 on the rotating drum 18 in the exposure zone 26. The optical unit 116 has a document illuminating lamp 118 for illuminating the document placed on the transparent plate 8, a first reflecting mirror 120 for projecting the reflected light from the document onto the photosensitive member 20, a second reflecting mirror 122, a third reflecting mirror 124, a lens assembly 126 and a fourth reflecting mirror 128. During scanning and exposure, the document illuminating lamp 118 and the first reflecting mirror 120 which are mounted on a common support frame 130 are moved substantially horizontally at a predetermined speed V from their initial position shown by the solid line to required positions (for example, maximum scanning-exposure termination positions shown by the two-dot chain line), and the second reflecting mirror 122 and the third reflecting mirror 124 which are mounted on a common support frame 132 are moved at a speed one half of the aforesaid speed (i.e., ½V) from their initial positions shown by the solid line to required positions (for example, maximum scanning-exposure termination positions shown by the two-dot chain line). At this time, the light reflected from the document illuminated by the document illuminating lamp 118 is reflected successively by the first reflecting mirror 120, the second reflecting mirror 122 and the third reflecting mirror 124 and reaches the lens assembly 126. Thereafter, it is reflected by the fourth reflecting mirror 126 and reaches the photosensitive member 20 in the exposure zone 26. When the scanning exposure is terminated, the document illuminating lamp 118, the first reflecting mirror 120, the second reflecting mirror 122 and the third reflecting mirror 124 are returned to their initial positions shown by the solid line.

In the main body 2 of the copying apparatus described above, while the rotating drum is rotated in the direction of arrow 22, the charging corona discharge device 38 substantially uniformly charges the photosensitive member 20 to a specified polarity in the charging zone 24, and thereafter in the exposure zone 26, the optical unit 116 projects the image of the document to eliminate the charge on the photosensitive member 20 selectively, whereby a latent electrostatic image corresponding to the document is formed on the photosensitive member 20. Thereafter, the developing means 40 applies a toner to the latent electrostatic image on the photosensitive member 20 to develop the latent electrostatic image to a toner image. Then, in the transfer zone 30, a copying paper conveyed by the paper conveying means 50 is brought into contact with the photosensitive member 20, and by the action of the transfer corona discharge device 42, the toner image on the photosensitive member 20 is transferred to the paper. Subsequently, in the peeling zone 32, the copying paper is peeled from the photosensitive member 20 by the action of the peeling corona discharge devices 44 and 46. The copying paper having the toner image transferred thereto is then conveyed to the heat-fixing device 104 where the toner image is fixed to the copying paper. The paper is then discharged into the sorter 10. In the meantime, the photosensitive member 20 continues to rotate, and the toner remaining on the photosensitive member 20 after the transfer operation is removed from it by the action of the cleaning blade 48 in the cleaning zone 34 or by the action of the magnetic brush-type developing means 40 in the developing zone 28 (the removal of the residual toner from the photosensitive member 20 will be described in more detail hereinafter).

With reference to FIG. 3, the semi-automatic document supplying and discharging device 6 will be generally described. The semi-automatic device 6 includes the stationary support frame structure 14 and the movable main frame structure 16, as already stated above. As can be seen from FIG. 3, the support frame structure 14 is mounted on one end portion (the right end portion in FIG. 3) of the top of the housing 4 adjacent to one side edge of the transparent plate 12 fixed to the top of the housing 4. A shaft 130 extending in the front and rear direction (a direction perpendicular to the sheet surface in FIG. 3) is rotatably mounted on the support frame structure 10. One end portion (the right end portion in FIG. 3) of the main frame structure 16 is mounted pivotally on the shaft 130. The main frame structure 16 has an upper plate 132 and a lower plate 134. The upper plate 132 defines a substantially flat, document receiving surface 136 on the top side of the main frame structure 16. As will be described below, the document receiving surface 136 receives the document discharged from the main frame structure 16. Preferably, a restraining member 138 for restraining the leading edge of the document discharged onto the receiving surface 136 to put it in order is secured to the top side of the upper plate 132 in such a manner that its position can be adjusted according to the size of the document. When the main frame structure 6 is held at the operating position as shown in FIG. 3, the lower plate 134 defining the under side of the main frame 16 is positioned slightly upwardly of, and substantially parallel to, the transparent plate 12 to define a main portion 142 of a document conveying passage 140 between it and the top side of the transparent plate 12. The document conveying passage 140 additionally has an introducing portion 144 located upstream of the main portion 142 and a curved discharging portion 146 connecting the main portion 142 to the document receiving surface 136. The introducing portion 144 is defined in the support frame structure 14, and the curved discharging portion 146 is defined in the other end portion, i.e. the free end portion (the left end portion in FIG. 3) of the main frame structure 16.

The introducing portion 144 of the document conveying passage 140 is defined between a lower guide plate 148 and two upper guide plates 150 and 152. A document stand 154 is annexed to the upstream side of the support frame structure 14. The surface of the document stand 154 defines a guide surface 156 for manually positioning a document to be copied, which joins the upstream end of the introducing portion 144 of the document conveying passage 140. On the surface of the document stand 154 is formed a guiding protrusion 158 which restrains the position of one side edge of a document placed on the guide surface 156 for insertion into the introducing portion 144 of the conveying passage 140 and thus restricts the position of the document in the widthwise direction. In the introducing portion 144 of the document conveying passage 140, there are further provided a conveying roller unit 160 for conveying the document inserted into the introducing portion 144 to the main portion 142 through the introducing portion 144 and a first regulating member 162 for regulating the position of the document, which projects into the introducing portion 144 at a position downstream of the conveying roller unit 160 and can arrest the advancing of the document passing through the introducing portion 144. The conveying roller unit 160 is comprised of a driven roller 164 and a follower roller 166. A solenoid 168 is provided in relation to the conveying roller unit 160 and the first regulating member 162. When the solenoid 168 is in the deenergized state, the follower roller 166 is positioned below the lower guide plate 148 away from the driven roller 164, and the first regulating member 162 projects into the introducing portion 144 through an opening formed in the lower guide plate 148 to hamper the advancing of the document. On the other hand, when the solenoid is energized, the follower roller 166 projects into the introducing portion through the opening formed in the lower guide plate 148 and is pressed against the driven roller 164, and the first regulating member 162 moves away from the introducing portion 144 and is located below the lower guide plate 148 to permit the advancing of the document.

The semi-automatic document supplying and discharging device 6 further includes a conveyor belt mechanism 170 for conveying the document, which has been sent to the main portion 142 of the conveying passage 140 from the introducing portion 144, through the main portion 142, further conveying it from there through the curved discharging portion 146 and discharging it onto the document receiving surface 136. The conveyor belt mechanism 170 has a plurality of laterally spaced endless belts 172 (only one of which is shown in FIG. 3) which are wrapped about a driven wheel 174 mounted on the shaft 130 and follower wheels 180 and 182 mounted respectively on shafts 176 and 178 mounted on the free end portion (the left end portion in FIG. 3) of the main frame structure 16. A tension roller 184 and a tension rod 186 for maintaining the endless belt 172 taut are also provided. The lower travelling section of the endless belts 172 extends between the lower plate 134 and the transparent plate 12. The shaft 130 on which the driven wheel 174 is mounted is drivingly connected to an electric motor 188 mounted on the support frame structure 14, and rotated clockwise in FIG. 3 when the motor 188 is energized. In the intermediate portion of the main portion 142 of the conveying passage 140 is provided a hemispherical pressing piece 190 projecting downwardly through an opening formed in the lower plate 134 for forcing the endless belts 172 downwardly. The second regulating member 192 and a rotatably mounted pressing roller 194 are provided in the downstream end portion of the main portion 142. A solenoid 196 is provided in relation to the second regulating member 192 and the pressing roller 194. When the solenoid 196 is in the deenergized state, the second regulating member 192 projects into the main portion 142 of the conveying passage 140 through the opening formed in the lower plate 134 to hamper the advancing of the document, and the pressing roller 194 is located above the lower plate 134. On the other hand, when the solenoid 196 is energized, the second regulating member 192 moves away from the main portion 142 and is located above the lower plate 134, while the pressing roller 194 projects downwardly through the opening formed in the lower plate 134 to force the endless belts 172 downwardly. In the curved discharging portion 146 of the conveying passage 140, a roller 198 located opposite to the wheel 180 and a roller 200 located opposite to the wheel 182 are rotatably mounted. The rollers 198 and 200 cooperate with the endless belts 172.

Since the semi-automatic document supplying and discharging device 6 described above is substantially the same as the semi-automatic document supplying and discharging device disclosed in Japanese Laid-Open Patent Publication No. 161874/1982 (corresponding to U.S. Pat. No. 4,465,272 and European Patent Application No. 82102455.1), the disclosure of the aforesaid Japanese Laid-Open Patent Publication No. 161874/1982 is cited herein as reference in lieu of a detailed description of the device 6.

The sorter 10 has a frame structure 202 having an open front side. The inside of the frame structure 202 includes a plurality of vertically stacked bins 204 and a moving means 206 for suitably moving the bins 204. When the copying process is to be repeated a number of times for the same document, after a copy (i.e., a copying paper having a fixed toner image) formed in a given copying cycle is received in the lowermost bin 204, the moving means 206 immediately moves downwardly that bin 204 which exists immediately above the aforesaid bin so as to receive a copy to be formed in the next copying cycle. After a copy in the final cycle of the copying process is received in a specified bin 204, the moving means 206 raises those bins 204 excepting the lowermost bin 204 to return them to the initial positions shown in FIG. 3. The sorter 10 itself may be substantially the same as the sorter disclosed in the specification of Japanese Patent Application No. 162205/1981, and a detailed description of the structure of the sorter 10 itself is omitted in this specification.

Detecting means, manually operable switches, display means, etc.

With reference to FIGS. 3 and 5, in the paper feed device 52 in the main body 2 of the electrostatic copying apparatus in accordance with this invention, either one of three types of paper cassettes containing copying paper sheets according to JIS standards A3, A4 and A5 is mounted on the first cassette-receiving section 54a, and either one of three types of paper cassettes containing paper sheets according to JIS standards B4, B5 and B6 is mounted on the second cassette-receiving section 54b. In the first cassette-receiving section 54a and the second cassette-receiving section 54b, discriminating means 208a and 208b are respectively provided for determining which of the three types of the paper cassettes has been mounted. Each of the discrminating means 208a and 208b may be comprised of two reed switches disposed in spaced-apart relationship in the widthwise direction. In this case, two permanent magnets (not shown) are fixed to the opposite sides of the front surface of each of the A3 paper cassette containing paper sheets having a size A3 and the B4 paper cassette containing paper sheets having a size B4, for example; one permanent magnet is fixed to one side of the front surface of each of the A4 paper cassette containing paper sheets having a size A4 and the B5 paper cassette containing paper sheets having a size B5; and one permanent magnet is fixed to one side of the front surface of each of the A5 paper cassette containing paper sheets having a size A5 and the B6 paper cassette containing paper sheets having a size B6 which side is opposite to said one side of the front surface of the A4 or B5 paper cassette. Accordingly, when the A3 paper cassette is to be loaded on the first cassette-receiving section 54a, both of the two reed switches constituting the discriminating means 208a are closed. When the A4 paper cassette is to be loaded therein, one of the two reed switches is closed. Furthermore, when the A5 paper cassette is to be loaded, the other of the two reed switches is closed. Likewise, when the B4 paper cassette is to be loaded in the second cassette-receiving section 54b, both of the two reed switches constituting the discriminating means 208b are closed. When the B5 paper cassette is to be loaded, one of the two reed switches is closed. Furthermore, when the B6 paper cassette is to be loaded, the other of the two reed switches is closed.

Detecting means 210a and 210b for detecting the rotation or stopping of the shafts 62a and 62b are provided with respect to each of the shaft 62a fixed to the supply roller 64a and the shaft 62b fixed to the supply roller 64b in the paper feed device 52. The detecting means 210a and 210b are comprised respectively of discs 212a and 212b fixed to one end portions of the shafts 62a and 62b and stationary photocouplers 214a and 214b consisting of light emitting elements located on one side of the discs 212a and 212b and light-receiving elements located on the other sides of the discs 212a and 212b. A number of cuts are formed at suitable intervals in the circumferential direction in the circumferential edge portion of each of the discs 212a and 212b. When each of the shafts 62a and 62b is at rest, a cut or a portion between cuts of each of the discs 212a and 212b exists continuously between the light-emitting element and the light-receiving element of each of the photocouplers 214a and 214b, and therefore the light-receiving element of each of the photocouplers 214a and 214b is continuously maintained in condition for receiving light from the light-emitting element or for not receiving it. On the other hand, when each of the shafts 62a and 62b is rotated, a cut and a portion between cuts of each of the discs 212a and 212b alternately pass between the light-emitting element and the light receiving element of each of the photocouplers 214a and 214b, and therefore, the light receiving element of each of the photocouplers 214a and 214b is alternately maintained in condition for not receiving light from the light emitting element and for receiving it.

As clearly shown in FIG. 4, a paper detecting means 216 is provided in relation to both of the first paper introducing passage 70a extending from the first cassette-receiving section 58a and the second paper introducing passage 70b extending from the second casette-receiving section 58b. The detecting means 216 includes a microswitch 220 having an actuating arm 218, a detecting piece 224a mounted pivotally on a shaft 222a and projecting into the first paper introducing passage 70a through an opening formed in the guide plate 66, and a detecting piece 224b mounted pivotally on a shaft 222b and projecting into the second paper introducing passage 70b through an opening formed in the guide plate 76. When the leading edge of the copying paper 56a supplied to the first paper introducing passage 70a from the cassette 58a by the action of the supply roller 64a rotated in the direction of the arrow comes into contact with the nip position of the pair of conveyor rollers 84 and 86 and consequently the copying paper 56a is bent as shown by the two-dot chain line, the detecting piece 224a is caused to pivot counterclockwise from its normal position shown in the drawing, and as a result, a projection 226 of the detecting piece 224a acts on the actuating arm 218 of the microswitch 220 to close the microswitch 220. When the leading edge of the copying paper 56b supplied to the second paper introducing passage 70b from the paper cassette 58b by the action of the supply roller 64b rotated in the direction of the arrow and conveyed through the second paper introducing passage 70b by the action of the pair of supply assisting rollers 80 and 82 rotated in the direction of the arrow comes into contact with the nip position of the pair of conveyor rollers 84 and 86 and as a result, the copying paper 56b is bent as shown by the two-dot chain line, the detecting piece 224b is caused to pivot clockwise from its normal position shows in the drawing. As a result, a projection 228b of the detecting piece 224b acts on the projection 228a of the detecting piece 224a to cause the detecting piece 224a to pivot counterclockwise from its normal position shown in the drawings. Finally, the projection 226 of the detecting piece 224a acts on the actuating arm 218 of the microswitch 220 to close the microseitch 220. A copying paper detecting means 228 is further provided with regard to the second paper introducing passage 70b. The detecting means 228 is constructed of a microswitch having an actuating arm 230 which projects into the second paper introducing passage 70b through the opening formed in the guide plate 74 upstream of the pair of supply assisting rollers 80 and 82. When the leading edge of the copying paper 56b supplied to the second paper introducing passage 70b from the copying paper cassette 58b acts on the actuating arm 230, the detecting means 228 is closed, and when the trailing edge of the paper 56b goes past the actuating arm 230, the detecting means 228 is opened.

Again with reference to FIG. 3, the main body 2 of the electrostatic copying apparatus further includes paper detecting means 232, 234 and 236 which detect a copying paper conveyed by the paper conveying means 50, at a position slightly downstream of the pair of conveyor rollers 84 and 86, at a position slightly downstream of the peeling zone and at a position slightly downstream of the heat-fixing device 104 (the downstream end portion of the paper conveying passage in the main body 2). The detecting means 232, 234 and 236 respectively having actuating arms 238, 240 and 242 projecting into the paper conveying passage, and are closed when the leading edge of the copying paper acts on the actuating arms 238, 240 and 242 respectively and are opened when the trailing edge of the copying paper goes past the actuating arms 238, 240 and 242.

With reference to FIGS. 3 and 4, there is provided a paper wrapping detecting means 244 which when a copying paper kept in contact with the photosensitive member 20 on the rotating drum 18 in the transfer zone 30 wraps about the photosensitive member 20 without being peeled from the photosensitive member 20 in the peeling zone, detects the wrapping paper. The detecting means 244 is comprised of a light emitting element 246 for irradiating light onto the photosensitive member 20 at a position slightly downstream of the peeling zone as viewed in the rotating direction of the rotating drum 18, a light receiving element for receiving the light reflected from the photosensitive member 20, and a signal generator 250 electrically connected to the light receiving element 248 for producing a paper wrapping signal when the intensity of light received by the light receiving element is below a predetermined threshold value. The photosensitive member 20 itself has a high reflectance, and therefore when the paper is not wrapped about the photosensitive member 20, the light receiving element 248 receives light having a sufficient intensity. However, when the paper wraps about the photosensitive member, the light receiving element 248 receives light having an intensity below the threshold value and the signal generator 250 produces a paper wrapping signal, because the copying paper has a relatively low reflectance. Preferably, the distance $l_2$ from the peeling zone 32 to the detecting position of the detecting means 244 as viewed in the rotating direction of the rotating drum 18 is substantially equal to the distance $l_1$ from the peeling zone 32 to the detecting position of the detecting means as viewed in the moving direction of the copying paper.

With reference to FIG. 3, the main body 2 of the electrostatic copying apparatus further has disposed therein detecting means 252 and 254 for detecting the support frame 132 on which the second reflecting mirror 122 and the the third reflecting mirror 124 in the optical unit 116 are mounted. Each of the detecting means 252 and 254 may be constructed of a reed switch to be actuated by a permanent magnet fixed to the support frame 132. The detecting means 252 detects the support frame 132 when the support frame 132 is at its initial position shown by the solid line. The detecting means 254 detects the support frame 132 and is closed, when the support frame 132 moves from its initial position to a position displaced to the right by a predetermined distance $l_3$.

A detecting means 256 which may be of any known form is disposed in the sorter 10, which when a trouble occurs (for example, when the bins 204 are not moved as required), detects it and produces a signal.

In the semi-automatic document supplying and discharging device 6, there is provided a document insertion detecting means 258 which detects a document at that position of the introducing portion 144 of the conveying passage 140 which is slightly upstream of the document advancing arresting position of the first regulating member 162. The detecting means 258 may be comprised of a light emitting element 260 located above the introducing portion 144 and a light receiving element 262 located below the introducing portion 144. When a document is inserted by hand into the introducing portion 144, light projected onto the light receiving element 262 from the light emitting element 260 is shut off by the document, whereupon the detecting means 258 produces a document insertion signal. There is also provided a detecting means 264 which detects a document at that position of the main portion 142 of the conveying passage 140 which is slightly upstream of the document advancing arresting position of the second regulating member 192. The detecting means 264 may be constructed of a light emitting element for projecting light onto the transparent plate 12, a light receiving element for receiving light reflected from the transparent plate 12, and a signal generator which produces a document detection signal when the intensity of the light received by the light receiving element falls below a predetermined threshold value. Since the transparent plate 12 itself has a high reflectance, the light receiving element receives light of a sufficient intensity when no document exists at the detecting position. On the other hand, because the reflectance of the document is relatively low, when the leading edge of the document arrives at the detecting position, the light receiving element receives light having an intensity below the predetermined threshold value, and the signal generator produces a document detection signal. When the trailing edge of the document goes past the detecting position, the light receiving element again receives light having a sufficient intensity and the above document detection signal disappears. Furthermore, a detecting means 266 is provided which detects the document at the downstream end portion of the curved discharging portion 146 of the conveying passage 140. The detecting means 266 is comprised of a microswitch 270 having an actuating arm 268, and a detecting piece 272 mounted pivotally by a supporting pin 271. One end portion of the detecting piece 272 projects into the curved discharging portion 146. When the leading edge of the document acts on one end portion of the detecting piece 272, the detecting piece 272 is caused to pivot counterclockwise from its normal position shown in the drawing. As a result, the other end portion of the detecting piece 272 acts on the actuating arm 268 of the microswitch 270 to close the microswitch 270. When the trailing edge of the document goes past the one end portion of the detecting piece 272, the detecting piece 272 returns to its normal position shown in the drawings, and the microswitch 270 is opened.

In the illustrated copying apparatus, there are further provided known suitable detecting means (inclusively designated by numeral 275) which detect a disorder in various other constituent elements such as the document illuminating lamp 118 (FIG. 3), the electrical heating means 106 (FIG. 3) in the heatfixing means, and the electrical heating means 273 (FIG. 4) for heating the photosensitive member 20. The electrical heating means 273 (FIG. 4) for heating the photosensitive member 20 will be described further hereinafter. In the illustrated copying apparatus, a temperature detecting means 277 (FIG. 3) for detecting the temperature of the heat-fixing device 104 and a temperature detecting means 279 (FIG. 4) for detecting the temperature of the surface or its vicinity of the photosensitive member 20 are further provided. Detecting devices 281 and 283 respectively including the temperature detecting means 277 and 279 produce not only a temperature signal but also a signal showing a disorder which occurs in the temperature detecting means 277 and 279, as will be described in detail hereinbelow.

Figure 6:
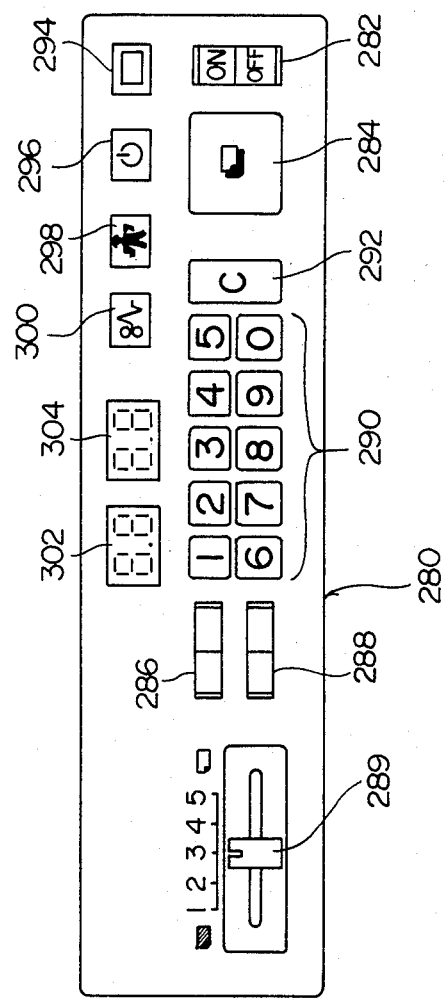
FIG. 6 is a simplified partial view showing a panel in the copying apparatus shown in FIG. 1.
Figure 7:
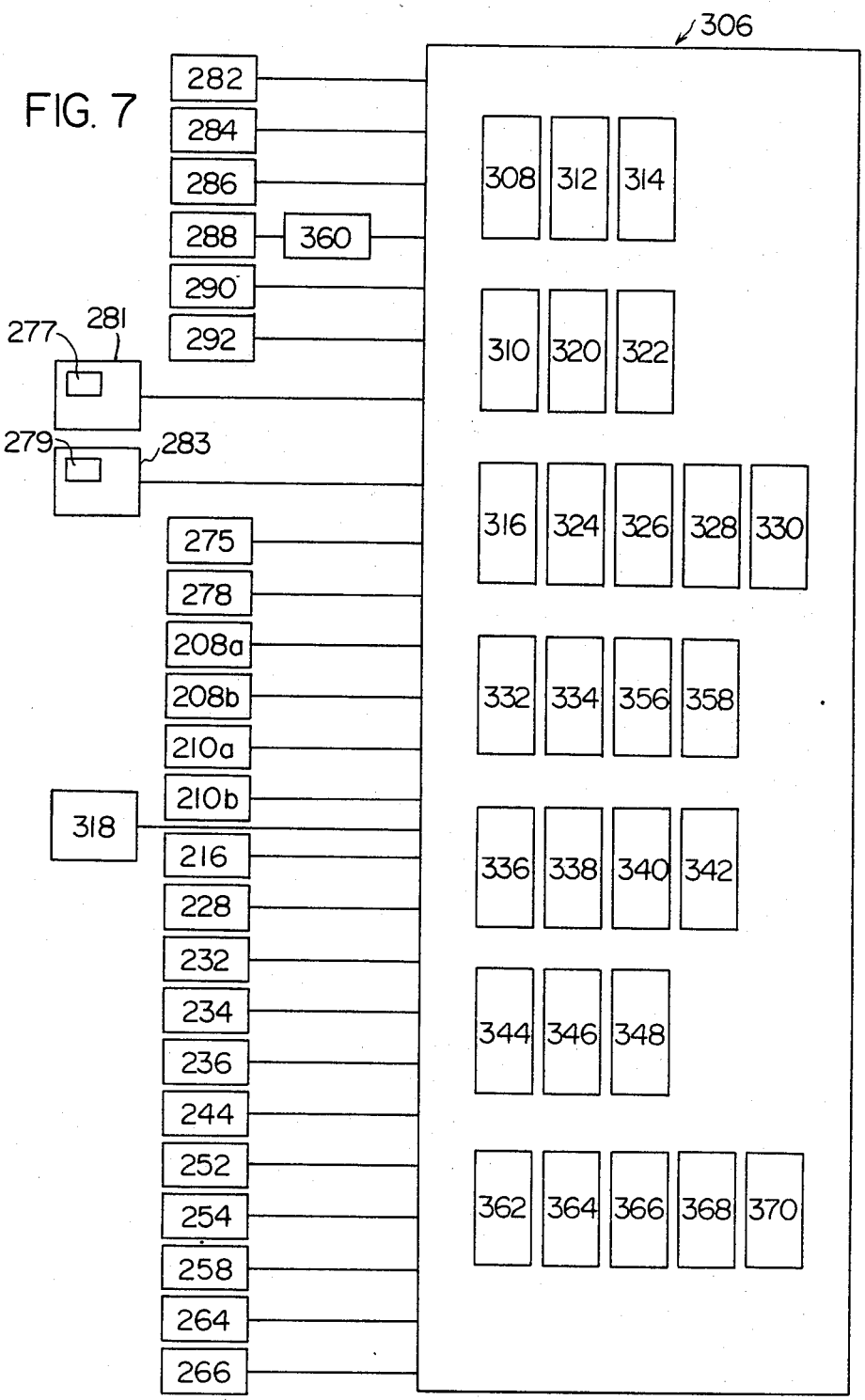
FIG. 7 is a simplified block diagram showing processing means and various detecting means for feeding signals thereto.

With reference to FIGS. 1 and 2, a key card inserting section 274 is provided at the front end portion of the upper surface of the housing 4 of the main body 2 of the copying apparatus. A given key cars 276 is inserted into the key card inserting section by an operator. In the key card inserting section 274 is provided a signal producing means 278 which when the key card 276 is inserted, detects it and produces a copying process performance permission signal (FIG. 7). As will be described hereinafter, in the illustrated electrostatic copying machine, the copying process cannot be performed unless the operator inserts the key card 276 into the key card inserting section 274 thereby producing the aforesaid signal for the permission of the performance of the copying process, as will be described in more detail hereinafter. This prevents any unauthorized person from operating the copying apparatus and obtaining copies. Adjacent to the key card inserting section 274, a panel 280 is disposed at the front end portion of the upper surface of the housing 4. Referring to FIG. 6, the panel 280 has arranged thereon a power switch 282, a print switch 284, a paper selection switch 286 and an interruption switch 288. When the power switch 282 is closed by a manual operation, the copying apparatus is connected to a suitable power supply such as a commercial alternate-current power supply, and when the power switch 282 is opened, the copying apparatus is cut off from the power supply. When the print switch 284 is instantaneously closed by a manual operation, a signal for starting the copying process is produced. The paper selection switch 286 is maintained in one of two conditions. When it is maintained in one condition, the supply roller 64a in the paper feed device 52 is set in an operable condition (therefore, a copying paper is ready for supplying from the paper cassette 58a loaded in the first cassette-receiving section 54a). When it is maintained in the other condition, the supply roller 64b in the paper feed device 52 is set in an operable condition (therefore, a copying paper is ready for supplying from the paper cassette 58b loaded in the second cassette receiving section 54b) (FIGS. 3 and 5). The interruption switch 288 is manually closed when so-called "interrupting copying" is to be performed, as will be described hereinafter. An operating knob 289 for controlling the amount of light exposure on the photosensitive member 20 is also disposed on the panel 280. The panel 280 further includes ten input keys from 0 to 9 for inputting the number of copies to be produced from each document and a clear key 292 for cleaning the input numeral set by these input keys 290. The panel 280 further has a key card lamp 294 for showing that the key card 276 has not been inserted into the key card inserting section 274 and the copying process performance permission signal has not yet been produced; a waiting display lamp 296 for showing that the heatfixing device 104 has not yet attained the required temperature; a service man call lamp 298 showing that a disorder has occurred in a constituent element in the copying apparatus and a service man is required for inspection and repair; and a trouble lamp 300 which shows that a trouble has occurred in the conveying of a copying paper in the main body 2 of the copying apparatus, a trouble has occurred in the conveying of a document in the semiautomatic document supplying and discharging device, or a trouble has occurred in the sorter 10. A first display means 302 and a second display means 304 are also arranged on the panel 280. Each of the first display means 302 and the second display means 304 has two light emitting segments having the shape of the arabic figure 8. The mode of display by the first and second display means 302 and 304 will be described in more detail hereinafter.

Basic operating procedure of the copying apparatus

The operations of the copying apparatus as described hereinabove is controlled by a processing means 306 including microprocessors constituting various control and discriminating means.

With reference to FIGS. 3 and 7, when the power switch 282 (FIG. 6) is manually closed, power is applied to the copying apparatus, whereby a waiting flag 308 included in the processing means 306 is set at logic "1" and the electrical heating means 106 of the heat fixing device 104 and the electrical heating means 273 (FIG. 4) for heating the photosensitive member 20 are energized (the controlling of the energization and deenergization of the heating means 106 and the heating means 273 will be described in more detail hereinafter). When the waiting flag 308 is set at logic "1", the waiting display lamp 296 (FIG. 6) is energized to indicate that the copying apparatus is in a preparatory condition, and the copying apparatus is prevented from performing the copying process described below. When the temperature of the heat fixing device 104 detected by the temperature detecting means 277 exceeds a predetermined value as a result of heating by the heating means 106, the waiting flag 308 is reset at logic "0", and the waiting display lamp (FIG. 6) is deenergized.

The operator manipulates ten input keys 290 to input the number of copies to be produced from the same document. As a result, a copy number setting counter 310 included in the processing means 306 is set at a predetermined number, whereby a continuity flag 312 included in the processing means 306 is set at logic "1". The logic "1" of the continuity flag 312 shows that the copying process should be continuously performed. When the number of copies to be produced from the same document is only one, it is not necessary to operate the input keys 290. In this case, the continuity flag 312 is set at logic "1" when the operator instantaneously closes the print switch 284 (FIG. 6).

When the semi-automatic document supplying and discharging device 6 is not utilized, a document is placed by hand on the transparent plate 12, and the document holding device 8 is brought to its operating position (the position shown in FIG. 2). Then, the operator instantaneously closes the print switch 284 (FIG. 6) by a manual operation, whereupon a copying process performance signal is produced. If at this time, an inhibition flag 314 included in the processing means 306 is not set at logic "1" (the setting of the inhibiting flag 314 will be described hereinafter) and therefore the copying process can be performed, the rotation of the rotating drum 18 and the operation of the developing means 40 are started in response to the copying process performance signal, and a copying paper is delivered from one of the paper cassettes 58a and 58b in the paper feed device 52 (from which of the cassette 58a or 58b the paper is delivered depends upon the condition of the paper selection switch 286 described hereinabove). When the paper 56a is delivered from the paper cassette 58a, the supply roller 64a is rotated. When the leading edge of the copying paper 56a delivered by the supply roller 64a abuts against the nip position of the pair of stationary conveyor rollers 84 and 86 and the copying paper 56a is bent as shown by the two-dot chain line in FIG. 5, the detecting means 216 is closed to thereby stop the rotation of the supply roller 64a. When the copying paper 56b is delivered from the paper cassette 58b, the pair of supply assisting rollers 80 and 82 are rotated together with the supply roller 64b. When the leading edge of the copying paper 56b delivered by the supply roller 64b is detected by the detecting means 228, a first counter 316 for paper conveyance included in the processing means 306 starts to count clock pulses supplied from a clock pulse supply source 318. When the counter 316 has counted a predetermined number, the rotation of the supply roller 64b is stopped, and the delivered copying paper 56b is fed by the pair of supply assisting rollers 80 and 82. The aforesaid predetermined number counted by the counter 316 is set at a value corresponding to the time sufficient for the leading edge of the copying paper 56b to reach the nip position of the pair of supply assisting rollers 80 and 82. When the leading edge of the copying paper 56b fed by the pair of supply assisting rollers 80 and 82 abuts against the nip position of the pair of stationary conveyor rollers 84 and 86 and the copying paper 56b is bent as shown by the two-dot chain line in FIG. 5, the detecting means 216 is closed to thereby stop the rotation of the pair of supply assisting rollers 80 and 82.

When the above-described paper supplying action is terminated and the detecting means 216 is closed, the counted numbers of a copying cycle counter 320 and a copying paper counter 322 included in the processing means 306 are increased by one. When the countered number of the copying cycle counter 320 becomes equal to that of the copy number setting counter 310, the continuity flag 312 is reset at logic "0". The paper counter 322 will be described further hereinafter.

At the same time, when the copying process performance signal is produced, the document illuminating lamp 118 is energized, and a timing counter 324 included in the processing means 306 starts to count clock pulses supplied from the clock pulse supply source 318. When the counter 324 has counted a first predetermined number, the supporting frames 130 and 132 of the optical unit 116 begin to move to the right in FIG. 3 from their initial positions shown by the solid line in FIG. 3. Thereafter, when the counter 324 has counted a second predetermined number, the charging corona discharge device 38 is energized. Thus, a latent electrostatic image is formed on the photosensitive member 20, and then developed into a toner image.

When the support frame 132 of the optical unit 116 has moved a predetermined distance $l_3$, the detecting means 254 detects it. As a result, the pair of conveyor rollers 84 and 86 (and the pair of supply assisting rollers 80 and 82) are rotated, and at the same time, the pair of conveyor rollers 92 and 94, the conveying belt mechanism 100 and the rollers 108 and 110 of the heat-fixing device 104 are rotated. Thus, the conveying of the copying paper having its leading edge located at the nip position of the pair of conveyor rollers 84 and 86 is started.

When the detecting means 232 has detected the leading edge of the copying paper, a first counter 326 for transfer included in the processing means begins to count clock pulses supplied from the clock pulse supply source 318. When the counter 362 has counted a predetermined number, the transfer corona discharge device 42 is energized. Thus, the toner image on the photosensitive member 20 is transferred to the copying paper in the transfer zone. Thereafter, in the peeling zone 32, the copying paper is peeled off from the photosensitive member 20 by the action of the peeling corona discharge devices 44 and 46. By the copying process performance signal, the peeling corona discharge devices 44 and 46 begin to be energized as soon as the rotating drum 18 begins to rotate, and are deenergized when the rotation of the rotating drum 18 is stopped after the termination of the copying process.

When the copying paper is further conveyed, and the detecting means 232 detects the passage of the trailing edge of the copying paper past the detecting position of the detecting means 232, the charging corona discharge device 38 and the document illuminating lamp 18 are deenergized, and furthermore, the supporting frames 130 and 132 of the optical unit 116 stop moving to the right in FIG. 3 and begin to move to the left in FIG. 3. At the same time, a second counter 328 for transfer included in the processing means 306 begins to count clock pulses supplied from the clock pulse supply source 318. When the counter 328 has counted a predetermined number, the transfer corona discharge device 42 is deenergized.

The copying paper is further conveyed by the conveying belt mechanism 100 and the rollers 108 and 110 of the heat fixing device 104, and discharged into the sorter 10. When at this time, the continuity flag 312 is set at logic "1", one bin 204 of the sorter 10 is moved downwardly when a second paper conveyance counter 330, which begins to count clock pulses supplied from the clock pulse supply source 318 when the trailing edge of the copying paper has gone past the deetecting position of the detecting means 236, has counted a predetermined number. Simultaneously, the counted number of the paper counter 322 is decreased by one.

When the support frames 130 and 132 of the optical unit 116 moving to the left in FIG. 3 reach their initial positions shown by the solid line in FIG. 3, the detecting means 252 detects it. When the continuity flag 312 is reset at logic "0", the support frames 130 and 132 of the optical unit 116 are stopped at the initial positions. On the other hand, when the continuity flag 312 is set at logic "1", the support frames 130 and 132 of the optical unit 116 begin to move to the right in FIG. 3 for the next cycle of copying simultaneously with (or as will be described below, after the lapse of a predetermined period of time from) the stopping of their leftward movement in FIG. 3. At this time, the paper delivery action for the next copying cycle has already ended, and the leading edge of a copying paper for the next copying cycle stops in abutment against the nip position of the pair of stationary conveyor rollers 84 and 86. How the action of delivering paper for the next copying cycle is started will be described in detail hereinafter.

When the continuity flag 312 is set at logic "1", the rotating drum 18 continues to rotate for the next copying cycle. But when the continuity flag 312 is reset at logic "0", the rotating drum 18 is stopped at a suitable time after it has undergone the cleaning action of the cleaning blade 48 or the cleaning action of the developing means 40 (this feature will be described further hereinafter).

When the semi-automatic document supplying and discharging device 6 is utilized, the main frame structure 16 is brought to its operating position shown in FIGS. 1 and 3. The operator manually introduces a document into the introducing portion 144 of the conveying passage 140. As a reslt, the detecting means 258 detects the inserted document to produce a document insertion signal. When the document insertion signal is produced, the print switch 284 (FIG. 6) is instantaneously closed, and quite the same procedure as in the case of producing the aforesaid copying process performance signal is performed in the main body 2 of the copying apparatus.

On the other hand, in the semi-automatic document supplying and discharging device 6, the motor 188 is energized upon the production of the document insertion signal, thereby rotating the driven roller 164 of the conveying roller unit 160 and the conveying belt mechanism 170. At the same time, the solenoid 168 is energized to press the follower roller 166 of the conveying roller unit 160 against the driven roller 164 and simultaneously cause the first regulating member 162 to move away from the introducing portion 144 thereby permitting advancing of the document. Thus, the inserted document is conveyed to the main portion 142 from the introducing portion 144.

When the detecting means 258 has detected the passage of the trailing edge of the inserted document past the detecting position of the detecting means 258, a first counter 332 for document conveyance included in the processing means 306 begins to count clock pulses supplied from the clock pulse supplying source 318. When the counter 332 has counted a predetermined number, the solenoid 168 is deenergized.

When the detecting means 264 detects the leading edge of the document conveyed by the conveying belt mechanism 170, the motor 188 is deenergized. But the document further advances owing to inertia, and stops when its leading edge makes contact with the second regulating member 192. Thus, the document is positioned as required on the transparent plate 12.

The motor 188 is energized when the detecting means 232 has detected the passage of the trailing edge of the copying paper past the detecting position of the detecting means 232 after the copying process is performed in the main body 2 of the copying paper through a predetermined number of cycles and the continuity flag 312 is reset at logic "0" (namely, when the exposure of the document in the final cycle of the copying process has ended). Simultaneously, the solenoid 196 is energized to cause the second regulating member 192 to move away from the main portion 142, thereby permitting advancing of the document. Thus, the document is discharged by the conveying belt mechanism 170 from the main portion 142 through the curved discharging portion 146.

When the detecting means 266 has detected the passage of the trailing edge of the document past the detecting position of the detecting means 266, a second counter 334 for document conveyance included in the processing means 306 begins to count clock pulses supplied from the clock pulse supply source 318. When the counter 334 has counted a predetermined number, the motor 188 and the solenoid 196 are deenergized.

When the next document has been introduced into the introducing portion 144 by hand before the previous document is discharged from the transparent plate 12, the aforesaid procedure is not immediately performed even when the detecting means 258 has detected the document and produced a document insertion signal. The aforesaid procedure is performed when the previous document has been completely discharged (i.e., after the counter 334 has counted a predetermined number).

Detection of troubles in the conveying of the copying paper and the document

In the main body 2 of the copying apparatus, conveying troubles such as jamming of the copying paper are detected in the following instances.

(1) When the delivery of a copying paper by the supply roller 64a or 64b is started, a first paper jam counter 336 included in the processing means 306 begins to count clock pulses supplied from the clock pulse supply source 318, but the counter 336 has counted a predetermined number without being reset by the detection of the leading edge of the copying paper by the detecting means 232.

(2) When the detecting means 232 has detected the leading edge of the copying paper, a second paper jam counter 338 included in the processing means 306 begins to count clock pullses supplied from the clock pulse supply source 318, but the counter has counted a predetermined number without being reset by the detection of the leading edge of the copying paper by the detecting means 234.

(3) The detecting means 244 has detected the wrapping of the copying paper about the photosensitive member 20.

(4) The detecting means 244 has detected the wrapping of the copying paper about the photosensitive member 20 and the detecting means 234 has detected the copying paper (this means that two sheets of copying paper are delivered simultaneously, and one of them wraps about the photosensitive member 20).

(5) When the detecting means 234 has detected the leading edge of the copying paper, a third paper jam counter 340 included in the processing means 306 begins to count clock pulses supplied from the clock pulse supply source 318, but the counter 340 has counted a predetermined number without being reset by the detection of the leading edge of the copying paper by the detecting means 236.

(6) When the detecting means 236 has detected the leading edge of the copying paper, a fourth paper jam counter 342 included in the processing means 306 begins to count clock pulses supplied from the clock pulse supply source 318, but the counter 342 has counted a predetermined number without being reset by the detection of the trailing edge of the copying paper by the detecting means 236.

In the semi-automatic document supplying and discharging device 6, jamming of a document is detected in the following instances.

(1) When the motor 188 is energized for supplying the inserted document to the transparent plate 12, a first document jam counter 344 included in the processing means 306 begins to count clock pulses supplied from the clock pulse supply source 318, but the counter 344 has counted a predetermined number without being reset by the detection of the leading edge of the document by the detectng means 264.

(2) When the motor 188 is energized for discharging the document from the transparent plate 12, a second document jam counter 346 begins to count clock pulses supplied from the clock pulse supply source 318, but the counter 346 has counted a predetermined number without being reset by the detection of the leading edge of the document by the detecting means 266.

(3) When the detecting means 266 has detected the leading edge of the document, a third document jam counter 348 included in the processing means 306 begins to count clock pulses supplied from the clock pulse supply source 318, but the counter 348 has counted a predetermined number without being reset by the detection of the trailing edge of the document by the detecting means 266.

Control of the positioning of the cleaning blade

As already stated with reference to FIGS. 3 and 4, in the main body 2 of the copying apparatus, a cleaning blade 48 made of a suitable flexible material such as synthetic rubber is disposed for removing the residual toner from the photosensitive member 20 in the cleaning zone 34 located around the rotating drum 18. The cleaning blade 48 is supported by a blade supporting mechanism 354 known per se including a solenoid 352 as illustrated in a simplified form in FIG. 4. When the solenoid 352 is energized, the cleaning blade 48 is held at its operating position shown by the solid line in FIG. 4. When it is deenergized, it is held at its non-operating position shown by the two-dot chain line in FIG. 4. At the operating position shown by the solid line in FIG. 4, the cleaning blade 48 is pressed elastically against the photosensitive member 20 on the rotating drum 18. On the other hand, at the non-operating position shown by the two-dot chain line in FIG. 4, the cleaning blade 48 is away from the photosensitive member 20 on the rotating drum 18.

As already stated hereinabove, a magnetic brush type developing means 40 is disposed in the developing zone 28 around the rotating drum 18 in the main body 2 of the copying apparatus. As is well known to those skilled in the art, the magnetic brush-type developing means 40 can be used not only for developing a latent electrostatic image formed on the photosensitive member 20 but also, as a cleaning means, for removing the residual toner from the photosensitive member 20 after the transfer. When the magnetic brush-type developing means 40 is used as a cleaning means, the rotating drum 18 should additionally be kept rotating even after the transfer so that that area of the photosensitive member on which the toner remains after the transfer (i.e., that area where the toner image is formed) passes through the developing zone 28 and thus undergoes the cleaning action of the magnetic brush-type developing means 40; and then the next cycle of the copying process should be started. Hence, the copying time necessarily becomes longer.

It will be easily understood on the other hand that when the residual toner on the photosensitive member 20 is removed by using the cleaning blade 48, it is not necessary to keep the rotating drum 18 rotating additionally, and therefore, the time required for copying can be minimized. In the case of removing the residual toner from the photosensitive member 20 by means of the cleaning blade 48, the photosensitive member and/or the cleaning blade 48 tends to be degraded relatively early because the cleaning blade 48 is pressed against the photosensitive member 20.

In the main body 2 of the copying apparatus, paper cassettes containing copying paper sheets of various sizes are selectively mounted on the first cassette receiving section 54a and the second cassette receiving section 54b of the paper feeding device 52, and copying paper sheets of various sizes are selectively delivered and conveyed through the transfer zone 30. Some of these sizes are longer than the total length of the photosensitive member 20, and the others are equal to, or smaller than, the photosensitive member 20. As will be understood from the foregoing description about the basic operating procedure of the copying apparatus, the length of a toner image formed on the photosensitive member 20 is substantially equal to the length of a copying paper delivered.

In view of the aforesaid fact, in the copying apparatus improved in accordance with this invention, when a copying paper conveyed through the transfer zone 30 is a long one having a length larger than the total length of the photosensitive member 20, the cleaning blade 48 is positioned at the aforesaid operating position and thus performs its cleaning action. When a copying paper conveyed through the transfer zone 30 is a short one having a length equal to, or smaller than, the total length of the photosensitive member 20, the cleaning blade 48 is held at its non-operating position, and the magnetic brush-type developing means 40 performs a cleaning action.

In the copying apparatus improved in accordance with this invention, when the copying paper conveyed through the transfer zone 30 is a short one the cleaning blade 48 is held at its non-operating position and is away from the photosensitive member 20. Hence, the life of the photosensitive member 20 and/or the cleaning blade 48 becomes correspondingly longer. When the copying paper conveyed through the transfer zone 30 is a long one, the cleaning of the residual toner is carried out by utilizing the magnetic brush-type developing means 40. It is necessary therefore to rotate the rotating drum 18 additionally after the transfer, and the copying time becomes correspondingly longer. However, as will be understood from the foregoing description of the basic operating procedure of the copying apparatus, when the copying paper conveyed through the transfer zone 30 is a long one, the basic copying time, i.e., the time other than the time during which the rotating drum 18 is additionally rotated is relatively short. Hence, the prolongation of the copying time owing to the additional rotation of the rotating drum 18 does not give rise to any practical problem.

Figure 8:
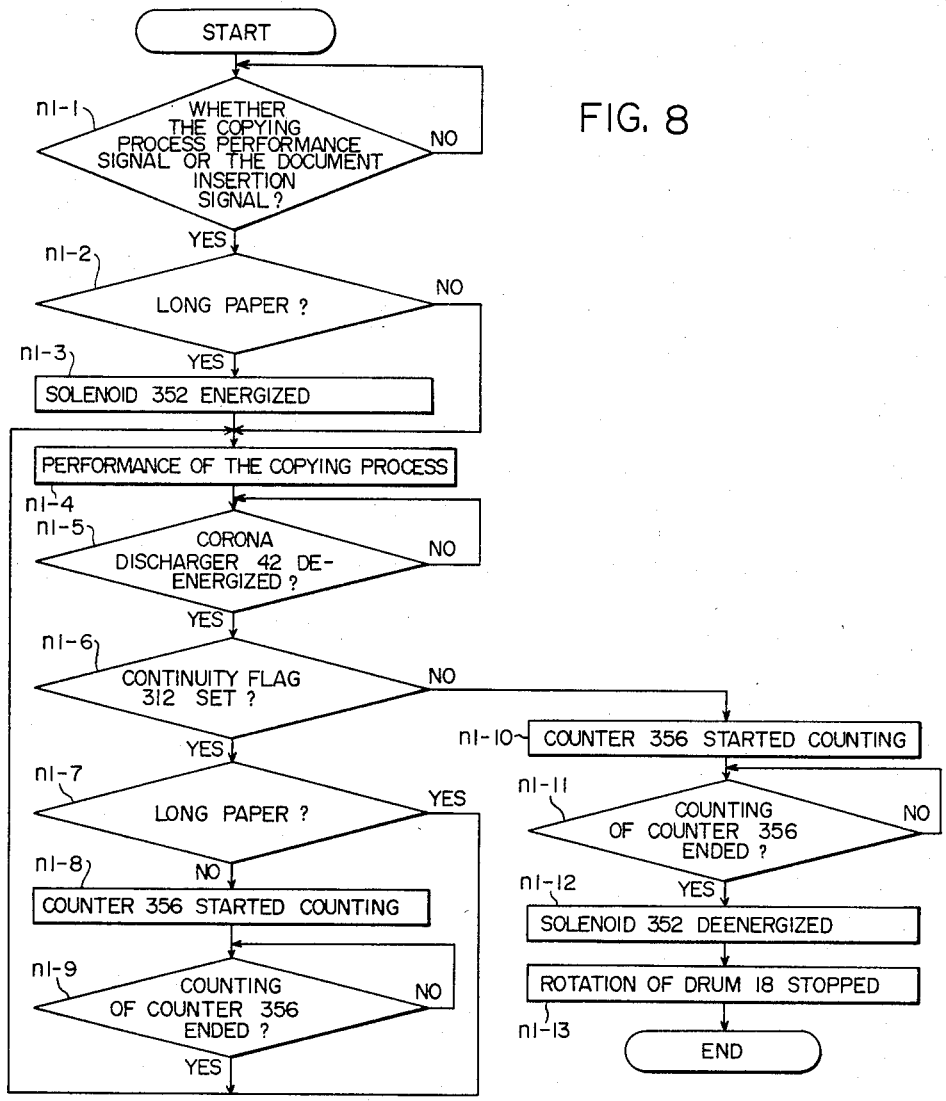
FIG. 8 is a flow chart showing the manner of controlling cleaning in the copying apparatus shown in FIG. 1.

With reference to FIG. 8 showing a flow chart of controlling of positioning of the cleaning blade 48 by the processing means 306 taken in conjunction with FIGS. 3, 4 and 7, it is judged in step n1-1 whether the aforesaid copying process performance signal has been produced by the instantaneous closing of the print switch 284 (FIG. 6), or the aforesaid document insertion signal has been produced by the detection of the inserted document by the detecting means 258. Then, step n1-2 sets in. When the aforesaid copying process performance signal or the document insertion signal which induces the start of rotation of the rotating drum 18 is produced, it is judged in step n1-2 whether the copying paper to be delivered is a long paper, namely whether the length of the copying paper delivered is longer than the total length of the photosensitive member 20. This judgement is made by (a) determining in which of the two conditions the paper selection switch 286 (FIG. 6) is (therefore which of the supply roller 64a and the supply roller 64b is actuated), and at the same time, (b) recognizing the paper cassette 58a loaded in the first cassette receiving section 54a on the basis of a signal from the discriminating means 208a, or recognizing the paper cassette 58b loaded in the second cassette receiving section 54a on the basis of a signal from the discriminating means 208. When the copying paper delivered is a long one, step n1-3 sets in. In step n1-3, the solenoid 352 is energized, and consequently, the cleaning blade 48 is held at its operating position shown by the solid line in FIG. 4. Then, in step n1-4, the copying process described hereinabove is performed. When in step n1-2, the delivered copying paper is a short one, step n1-4 sets in subsequent to step n1-2, and therefore, the solenoid 352 is maintained in the deenergized state and the cleaning blade 48 is held at its non-operating position shown by the two-dot chain line in FIG. 4. In step n1-5, it is judged whether the transfer corona discharge device 42 has been deenergized as above. When the transfer corona discharge device 42 is deenergized, step n1-6 sets in. In step n1-6, it is judged whether the continuity flag 312 is set at logic "1" and therefore the next cycle of the copying process is successively carried out. When the continuity flag 312 is set at logic "1", step n1-7 sets in. In step n1-7, it is again judged whether the copying paper is a long paper or not. When the copying paper is a long one, step n1-4 again sets in. When the copying paper is a short one, step n1-8 sets in. In step n1-8, a cleaning counter 356 included in the processing means 306 begins to count clock pulses supplied from the clock pulse supply source 318. In step n1-9, it is judged whether the cleaning counter 356 has counted a predetermined number. After the cleaning ounter 356 has counted the predetermined number, step n1-4 again sets in. Before the cleaning counter 356 has counted the predetermined number, the rotating drum 18 keeps rotating while the charging corona discharge device 38 and the transfer corona discharge device 42 are in the deenergized state. During this time, the magnetic brush-type developing means 40 removes a toner remaining on the photosensitive member 20 after the transfer. The aforesaid predetermined number of the cleaning counter 356 is set such that the time from the beginning of counting by the cleaning counter 356 becomes equal to the time required for the rotating drum 18 to rotate through at least one turn after the rear edge of that area of the photosensitive member 20 in which the toner image is formed, i.e. that area of the photosensitive member 20 with which the copying paper is brought into contact in the transfer zone, has gone past the developing zone 28. When it is determined in step n1-6 that the continuity flag 312 is reset at logic "0", step n1-6 is followed by step n1-10 in which the cleaning counter 356 begins counting. In step n1-11, it is judged whether the cleaning counter 356 has counted a predetermined number (this predetermined number may be equal to, or larger than, the predetermined number in step n1-9). During the time from the starting of counting by the cleaning counter 356 to the counting of the aforesaid predetermined number, the rotating drum 18 keeps rotating while the charging corona discharge device 38 and the transfer corona discharge device 42 are maintained in the deenergized state. During this time, the residual toner is removed from the photosensitive member 20 by the cleaning bladed 48 (in the case of a long copying paper) or the magnetic brush-type developing means 40 (in the case of a short copying paper). When the cleaning counter has counted the predetermined number, step n1-12 sets in. In step n1-12, the solenoid 352 is deenergized if it is in the energized state. Furthermore, in step n1-13, the rotation of the rotating drum 18 is stopped.

Control of continued delivery of the copying paper

With reference to FIGS. 3 and 5, in the copying apparatus described hereinabove, when the next cycle of the copying process is performed successively after the previous copying cycle, it is desired to start delivery of a copying paper for the next copying cycle as early as possible after the paper delivery in the previous copying cycle. On the other hand, the delivery of a copying paper in the next cycle of copying should be started (a) in order to prevent overlapping of the trailing edge portion of the copying paper fed in the previous copying cycle with the leading edge of the copying paper delivered fed in the next cycle of copying in the first paper introducing passage 70a or the second paper introducing passage 70b, after the copying paper delivered in the previous copying cycle and abutting at its leading edge against the nip position of the pair of stationary conveyor rollers 84 and 86 begins to be conveyed by the pair of conveyor rollers 84 and 86 whose rotation has been started, and (b) after the trailing edge of the copying paper delivered in the previous copying cycle has departed from the paper cassette 58a or 58b. As stated hereinabove, various paper cassettes are selectively mounted on the first and second cassette receiving sections 54a and 54b, and the length of a copying paper to be delivered is various. When a copying paper of a relatively large length is delivered, the trailing edge of the copying paper departs from the paper cassette only after the lapse of a relatively long period of time from the starting of conveying of the delivered paper by the pair of conveyor rollers 84 and 86. When the relatively short copying paper is delivered, the trailing edge of the copying paper departs from the paper cassette after the lapse of a relatively short period of time from the starting of the conveying of the delivered copying paper by the pair of conveyor rollers 84 and 86. When a copying paper is to be delivered from the paper cassette 58b loaded in the second cassette receiving section 54b, the length of the copying paper may sometimes be shorter than the length of the second paper introducing passage 70b extending from the paper cassette 58b to the pair of conveyor rollers 84 and 86. Hence, it sometimes happens that when the leading edge of the delivered copying paper has arrived at the nipping position of the conveyor rollers 84 and 86, the trailing edge of the copying paper has already departed from the paper cassette 58b.

In conventional copying apparatuses, the starting of delivery of a copying paper in the next copying cycle is controlled on the basis of the longest copying paper in order to meet the requirements (a) and (b) described above. Specifically, the delivery of a copying paper in the next copying cycle is started after a period of time required for the trailing edge of the longest copying paper to depart from the paper cassette or a longer period of time after the initiation of rotation of the pair of conveyor rollers 84 and 86 and therefore the initiation of conveying of the previous copying paper. Such a conventional copying apparatus suffers from the inconvenience that if the copying paper to be delivered is relatively short, the starting of delivery of the copying paper in the next copying cycle becomes undesirably slow. It is important that the leading edge of the copying paper in the next copying cycle should reach the nip position of the pair of conveyor rollers 84 and 86 before the support frames 132 (and 130) of the optical unit 116, which have moved to the right in FIG. 3 and then to the left in FIG. 3 in the previous copying cycle and thus have returned to their initial positions, again begin to move to the right in FIG. 3 for the next cycle of copying and have advanced over the predetermined distance $l_3$. Otherwise, it would be impossible to perform the scanning exposure of the document and the conveyance of the copying paper in synchronism. In contrast, when the copying paper is relatively short, the reciprocating distance of the support frame 132 of the optical unit 116 in the previous copying cycle is relatively short, and therefore, the support frame 132 returns to its initial position relatively early. Hence, when the reciprocal movement of the support frame 132 is started for the next copying cycle simultaneously with or immediately after the returning of the support frame 132 to its initial position, the copying paper delivered in the next copying cycle does not reach the nip position of the pair of conveying rollers 84 and 86 before the support frame 132 moves the predetermined distance $l_3$. To avoid the occurance of such a situation, the starting of the reciprocation of the support frame 132 in the next copying cycle should be delayed, and consequently, the copying time becomes longer than necessary.

In the copying apparatus of this invention, the following improvement has been made in order to avoid the aforesaid disadvantage of the conventional copying apparatus.

Figure 9:
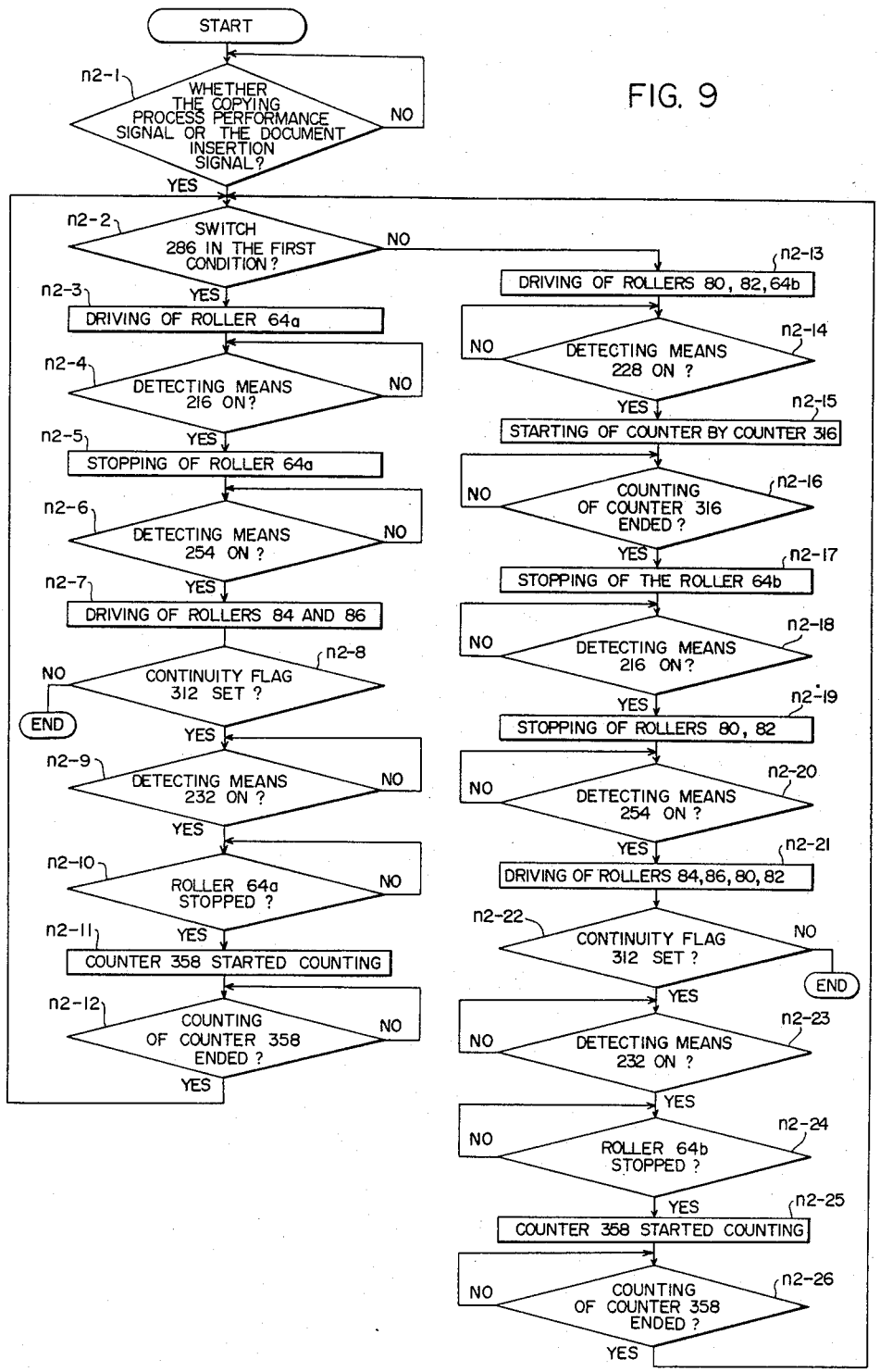
FIG. 9 is a flow chart showing the manner of controlling the supply of a copying paper in the copying apparatus shown in FIG. 1.

With reference to FIG. 9 showing a flow chart of controlling the delivery of a copying paper by the processing means 306 taken in conjunction with FIG. 5, it is judged in step n2-1 whether the aforesaid copying process performance signal has been produced by the instantaneous closing of the print switch 284 (FIG. 6), or whether the aforesaid document insertion singal has been produced by the detection of the inserted document by the detecting means 258. When the aforesaid copying process performance signal or the document insertion signal has been produced, step n2-2 sets in. In step n2-2, it is judged whether the paper selection switch 286 is in a first or a second condition. When the paper selection switch 286 is in the first condition, step n2-3 sets in, and the supply roller 64a is rotated and the delivery of a copying paper from the paper cassette 58a is started. Then, in step n2-4, it is judged whether the detecting means 216 is closed or not. When the detecting means 216 is closed, step n2-5 sets in, and the rotation of the supply roller 64a is stopped. Then, step n2-6 sets in and in this step, it is judged whether the detecting means 254 (FIG. 3) has been closed as a result of detecting the support frame 132 of the optical unit 116. When the detecting means 254 is closed, step n2-7 sets in, and the pair of conveyor rollers 84 and 86 are rotated to start the conveying of the copying paper. Then, step n2-8 sets in, and it is judged whether the continuity flag 312 is set at logic "1". In other words, it is judged whether the copying process is to be performed further. When the continuity flag 312 is set at logic "1", step n2-9 sets in, and it is judged whether the detecting means 232 has been closed as a result of detecting the leading edge of the copying paper. When the detecting means 232 is closed, step n2-10 sets in. In step n2-10, it is judged whether the shaft 62a having the supply roller 64a fixed thereto is rotating. Such a judgement is made by determining whether the light receiving element of the detecting means 210a alternately assumes a condition in which it does not receive light and a condition in which it receives light and therefore the production and dispearance of a signal are alternately repeated (when the shaft 62a is rotating), or the light receiving element of the detecting means 21a is continuously maintained in a condition in which it does not receive light or a condition in which it receives light and therefore the production or disappearance of a signal is continuously maintained (when the shaft 62a is at rest). When the trailing edge portion of the copying paper which has begun to be conveyed by the pair of conveyor rollers 84 and 86 is still in contact with the supply roller 64a, the supply roller 64a and the shaft 62a are rotated following the movement of the trailing edge of the copying paper being conveyed [the shaft 62a having the supply roller 64a fixed thereto is connected to a drive source by a suitable clutch means (not shown) such as an electromagnetic clutch when it is rotated, but when the clutch means is in an inoperative condition and cut off from the drive source, the shaft 62a can freely rotate at least in the delivery direction, i.e. in the clockwise direction in FIG. 5]. However, when the trailing edge of the copying paper being conveyed leaves the supply roller 64a, the rotation of the supply roller 64a and the shaft 62a comes to a stop. When the rotation of the shaft 62a stops, step n2-11 sets in, and a delivery counter 358 included in the processing means 306 begins to count clock pulses supplied from the clock pulse supply source 318. Thereafter, in step n2-12, it is judged whether the delivery counter 358 has counted a predetermined number. When the delivery counter 358 has counted the predetermined number, step n2-2 again sets in, and the delivery of a copying paper for the next copying cycle is started. The above predetermined number of the delivery counter 358 is set such that the time required for the counter 358 to count the predetermined number after the starting of counting is substantially equal to, or slightly longer than, the time required for the trailing edge of the copying paper to leave the paper cassette 58a after leaving the supply roller 64a.

On the other hand, when in step n2-2 the paper selection switch 286 is in the second condition, n2-13 sets in, and the supply roller 64b and the pair of supply assisting rollers 80 and 82 are rotated, and the delivery of a copying paper from the paper cassette 58b is started. Then, in step n2-14, it is judged whether the detecting means 228 has been closed as a result of detecting the leading edge of the copying paper. When the detecting means 228 is closed, step n2-15 sets in. In step n2-15, the first paper conveyance counter 316 begins to count clock pulses supplied from the clock pulse supply source 318. Then, it is judged in step n2-16 whether the counter 316 has counted a predetermined number. When the counter 316 has counted the predetermined number, step n2-17 sets in and the rotation of the supply roller 64b is stopped (but the delivery roller 64b is kept rotating incident to the movement of the copying paper being conveyed). Thereafter, it is judged in step n2-18 whether the detecting means 216 is closed. When the detecting means 216 is closed, step n2-19 sets in, and the rotation of the pair of supply assisting rollers 80 and 82 is stopped. Step n2-20 then sets in, and it is judged whether the detecting means 254 (FIG. 3) has been closed as a result of detecting the support frame 132 of the optical unit 116. When the detecting means 254 is closed, step n2-21 sets in, and the pair of conveyor rollers 84 and 86 are rotated and simultaneously the pair of supply assisting rollers 80 and 82 are rotated. Thus, the conveyance of the copying paper is started. Then, step n2-22 sets in, and it is judged whether the continuity flag 312 is set at logic "1". When the continuity flag 312 is set at logic "1", step 2-23 sets in, and it is judged whether the detecting means 232 has been closed as a result of detecting the leading edge of the copying paper. When the detecting means 232 is closed, step n2-24 sets in. In step n2-24, it is judged whether the shaft 62b having the supply roller 64b fixed thereto is rotating. Such a judgement is made on the basis of a signal from the detecting means 210b as is the case with the judgement in step n2-10. When the rotation of the shaft 62b is stopped, step n2-25 sets in, and the delivery counter 358 begins to count clock pulses supplied from the clock pulse supply source 318. Then, in step n2-26, it is judged whether the delivery counter 358 has counted a predetermined number. This predetermined number may be the same as the predetermined number in step n2-12. When the delivery counter 358 has counted the predetermined number, step n2-2 again sets in, and the delivery of the copying paper for the next copying cycle is started.

According to the above-described control of continued delivery of a copying paper, when the requirements (a) and (b) for starting the delivery of the next copying paper are met, the delivery of the next copying paper is started without any substantial delay irrespective of the length of the copying paper. Thus, the aforesaid disadvantage in the conventional copying apparatus can be avoided.

In the illustrated embodiment, the departing of the copying paper from the paper cassette 58a or 58b is detected by utilizing the detecting means 210a and 210b for detecting the stopping of the rotation of the shafts 62a and 62b having the supply rollers 64a and 64b fixed thereto and the delivery counter 358 associated with the detecting means 210a and 210b. If desired, instead of this, the departing of the copying paper from the paper cassette 58a or 58b can be detected by providing a suitable paper detecting means capable of detecting a copying paper immediately below the paper cassette 58a or 58b and detecting the passing of the trailing edge of the copying paper past the detecting position of such detecting means.

Control of interrupting copying

When the semi-automatic document supplying and discharging device 6 is not used, so-called "interrupting copying" is possible without any probem in conventional apparatuses, too. No technique, however, has been established to date which makes interrupting copying possible without any problem even when the semi-automatic document supplying and discharging device 6 is used. In contrast, in the copying apparatus improved in accordance with this invention, interrupting copying can be performed without any problem even in the case of using the semi-automatic document supplying and discharging device 6.

Figure 10:
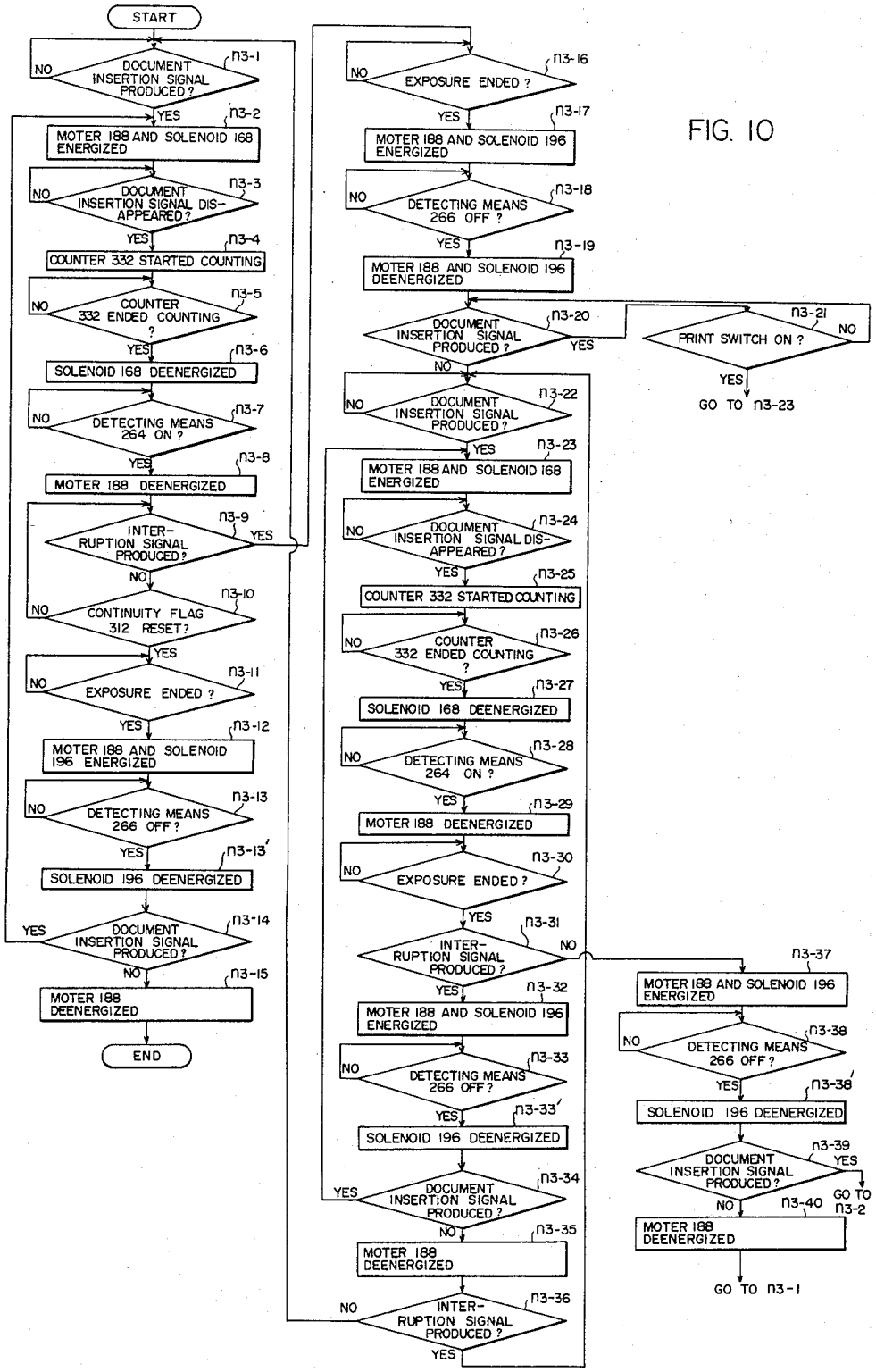
FIG. 10 is a flow chart showing the manner of controlling a semi-automatic document supplying and discharging device in the copying apparatus shown in FIG. 1.

This improvement achieved by this invention will be described with reference to FIG. 10 showing a flow chart of controlling the semi-automatic document supplying and discharging device 6 by the processing means 306 taken in conjunction with FIGS. 3 and 7. In step n3-1, it is judged whether the detecting means 258 has produced a document insertion signal by detecting a document inserted into the document inserting portion. When the document insertion signal has been produced, the rotation of the rotating drum 18 and the delivery of a copying paper are started in the main body 2 of the copying apparatus as already stated. When the detecting means 216 has been closed by the delivered copying paper, the counted number of the copying process counter 320 included in the processing means 306 is increased by one. On the other hand, as regards the semi-automatic document supplying and discharging device 6, step n3-2 sets in when the document insertion signal is produced. As a result, the motor 188 and the solenoid 168 are energized to start conveying of the inserted document. Then, in step n3-3, it is judged whether the document insertion signal has disappeared as a result of the passage of the trailing edge of the document past the detecting position of the detecting means 258. When the document insertion signal disappears, step n3-4 sets in, and the first counter 332 for document conveyance begins to count clock pulses supplied from the clock pulse supply source 318. In step n3-5, it is judged whether the counter 332 has counted a predetermined number. When the counter 332 has counted the predetermined number, step n3-6 sets in, and the solenoid 168 is deenergized. Then, in step n3-7, it is judged whether the detecting means 264 has been closed as a result of detecting the leading edge of the document. When the detecting means 264 is closed, step n3-8 sets in, and the motor 188 is deenergized. Thus, as stated hereinabove, the document is positioned as required on the transparent plate 12. Then, in step n3-9, it is judged which of an interrupting signal (logic "1") or a noninterrupting signal (logic "2") the signal producing means 360 (FIG. 7) is producing in response to the operation of the interruption switch 288. When the operator has no intention of performing interupting copying, and therefore a non-interupting signal is produced, step n3-10 sets in. In step n3-10, it is judged whether the continuity flag 312 is reset at logic "0". Step n3-11 sets in when the counted number of the copying process counter 320 which is increased one by one every time the delivery of the copying paper is performed in the main body 2 of the copying paper (and therefore, every time the copying cycle is performed) becomes equal to the counted number of the copy number counter 310 set by the operator, and therefore, the copying process is performed through the desired number of cycles and the continuity flag 312 is reset at logic "0". In step n3-11, it is judged whether the detecting means 232 has detected the passing of the trailing edge of the copying paper past the detecting position of the detecting means 232, namely whether exposure in the final copying cycle had ended. When the exposure has ended, step n3-12 sets in, and the motor 188 and the solenoid 196 are energized. As a result, the discharging of the document from the transparent plate 12 is started. Thereafter, in step n3-13, it is judged whether the detecting means 266 once closed has been opened as a result of its detection of the passage of the trailing edge of the document past the detecting position of the detecting means 266. When the detecting means 266 is opened, step n3-13' sets in, and solenoid 196 is deenergized. Thereafter, step n3-14 sets in, and it is judged whether the detecting means 258 has produced a document insertion signal as a result of its detection of the insertion of the next document. When no document insertion signal is produced, step n3-15 sets in, and the motor 188 is deenergized. When the document insertion signal is produced, step n3-2 again sets in, and the conveying of the next document is started.

On the other hand, when the operator intends to perform interrupting copying and operates the interuption switch 288 (FIG. 6), the signal producing means 360 (FIG. 7) produces an interrupting signal. When the signal interrupting signal is produced, the addition of a count number to the copying process counter 320 is inhibited, even if the delivery of a copying paper is performed in the main body 2 of the copying apparatus and the detecting means 216 is closed. Step n3-9 is thus followed by step n3-16. In step n3-16, it is judged whether the detecting means 232 has detected the passage of the trailing edge of the copying paper past the detecting position of the detecting means 232, namely whether exposure in the copying process at the time of producing the interrupting signal has ended. When the exposure comes to an end, steps n3-17, n3-18, and n3-19 which ae the same as the steps n3-12, n3-13 and n3-15 are performed, and thus, the document located on the transparent plate 12 at the time of producing the interrupting signal is discharged. Then, step n3-20 sets in, and it is judged whether a document insertion signal has been produced as a result of the insertion of a document for interrupting copying before the discharging of the aforesaid document. When the document insertion signal is produced, step n3-21 sets in, and the print switch 284 is manually closed and step n3-23 sets in. This is for the purpose of making the operator fully aware that it is the performance of interrupting copying. If desired, in step n3-21, it is possible to energize a suitable display lamp or the like so as to urge the operator to close the print switch 284 by hand. On the other hand, when no document insertion signal is produced in the step n3-20, step n3-22 sets in, and it is judged whether a document insertion signal has been produced as a result of the insertion of a document after the discharging of the aforesaid document. When the document insertion signal is produced, the aforesaid step n3-23 sets in. In this step n3-23 and the following steps n3-24, n3-25, n3-26, n3-27, n3-28 and n3-29, the same processings as in steps n3-2, n3-3, n3-4, n3-5, n3-6, n3-7 and n3-8 are carried out. As a result, the document for interrupting copying is positioned as required on the transparent plate 12. On the other hand, in the main body 2 of the copying machine, in step n3-20, the starting of the rotation of the rotating drum 18 and the delivery of a copying paper are inhibited, and the rotation of the rotating drum 18 and the delivery of the copying paper are started for the first time in step n3-23. Step n3-29 is followed by step n3-20. In step n3-20, it is judged whether the detecting means 232 has detected the passage of the trailing edge of the copying paper past the detecting position of the detecting means 232, namely whether exposure in the interrupting copying process has ended. When the exposure comes to an end, step n3-31 sets in, and it is judged whether an interrupting signal has been produced. When the interrupting signal is produced, steps n3-32, n3-33, n3-33', n3-34 and n3-35 which are the same as the above steps n3-12, n3-13, n3-13', n3-14 and n3-15 are performed, and the document for interrupting copying is discharged from the transparent plate 12. When the step n3-34, a document insertion signal is produced as a result of the insertion of the next document for interrupting copying, step n3-13 again sets in. In step n3-36 following step n-35, it is judged whether an interrupting signal has been produced. When the interrupting signal is produced, step n3-22 again sets in. On the other hand, when the operator has ended interrupting copying and operated the interruption switch 288 (FIG. 6) in order to return to ordinary copying whereby the signal producing means 260 (FIG. 7) produces a non-interrupting signal, step n-3-36 is followed by step n3-1. Thus, when the document used before the interrupting copying is inserted by hand, it is supplied to the transparent plate 12, and the copying process is performed through the remaining number of cycles for this document.

On the other hand, when the operator operates the interruption switch 288 (FIG. 6) before the step n3-31 whereby the signal producing means 360 (FIG. 7) produces a non-interrupting signal, the step n3-31 is followed by step n3-37. In stop n3-37 and the following steps n3-38, n3-38', n3-39 and n3-40, the same processings as in steps n3-12, n3-13, n3-13', n3-14 and n3-15 are carried out, and the document for interrupting copying is discharged from the transparent plate 12. When in step n3-39, a document insertion signal is produced as a result of the insertion by hand of the document before interrupting copying, the above step n3-2 again sets in. Thus, the document used before the interrupting copying is delivered to the transparent plate 12, and the copying process is automatically repeated for this document through the remaining number of cycles.

Troubleshooting and display

This subject will be described with reference to FIGS. 11-A to 11-D which are flow charts showing the controlling of the processing means 309 relating to troubles taken in conjunction with FIGS. 3 and 7. In step n4-1, it is judged whether a trouble has occurred in various constituent elements of the copying apparatus (for example, the document illuminating lamp 118, the electrical heating means 106 of the heat fixing device 104, the electrical heating element 273 for heating the photosensitive member 20, the temperature detecting means 277 for detecting the temperature of the heat fixing device 104, and the detecting means 279 for detecting the temperature of the surface of its vicinity of the photosensitive member 20). When a trouble such as wire breaks has occurred in the temperature detecting means 277 and the temperature detecting means 279, detecting devices 281 and 283 respectively supply trouble imdicating signals to the processing means 306 (this will be further described hereinafter). Furthermore, when a trouble has occurred in other constituent elements, the detecting means 275 supplys a trouble indicating signal to the processing means 306. When a trouble has occured in the constituent elements in step n4-1, the details of the trouble (i.e., which of the constituent elements gets out of order) are stored in a trouble memory 362, and thereafter in step n4-3, the inhibition flag 314 is set at logic "1" (hence, the operation of the copying machine is stopped). Thereafter, step n4-66 sets in.

When it is judged in step n4-1 that no trouble has occurred in the constituent elements, step n4-4 sets in. In step n4-4, it is jedged whether the key card 276 is inserted in the key card inserting section 274 (FIGS. 1 and 2) (i.e. whether the signal producing means 278 has produced a copying process performance permission signal). When the key card 276 is not inserted, the fact that the key card 276 is not inserted is stored in a key card memory 364 included in the processing means 306 in step n4-5, and thereafter in step n4-6, the inhibition flag 314 is set at logic "1". Then, step n4-66 sets in.

When the key card 276 is inserted in step n4-4, step n4-7 sets in, and in step n4-7 it is judged whether the first document jam counter 344 is set (namely, whether it is in condition for counting). When the counter 344 is set, the counter 344 performs counting in step n4-8 and thereafter in step n4-9, it is judged whether the counter 344 has counted a predetermined number. When the counter 344 has counted a predetermined number (namely when a document inserted by hand in the semi-automatic document supplying and discharging device 6 has jammed during its feeding to the transparent plate 12), the fact that the document jammed during feeding is stored in a document trouble memory 366 included in the processing means 306 in step n4-10. In step n4-11, the continuity flag 312 is reset at logic "0", and in step n4-12, the counted number of the copying process counter 320 is reduced to zero. Thereafter, in step n4-13, the inhibition flag 314 is set at logic "1". Then, step n4-66 sets in.

The following fact must be noted with regard to the step n4-12. When the detecting means 258 detects the document inserted by hand in the semi-automatic document supplying and discharging device 6, the supplying of the document toward the transparent plate 12 is started, and simultaneously, the paper feeding operation of the paper feed device 52 is started in the main body 2 of the copying apparatus. When the detecting means 216 is closed by the copying paper supplied, the counted number of the copying process counter 310 for indicating the number of copying cycles performed in the main body 2 of the copying apparatus is increased by one. This increment in the copying process counter 310 is achieved before the counter 344 has counted the predetermined number. Accordingly, when the document inserted by hand in the semi-automatic document supplying and discharging device 6 jams during supplying to the transparent plate, the counted value of the copying process counter 310 becomes zero in spite of the fact that no copy is obtained because of document jamming.

Accordingly in the copying apparatus improved in accordance with this invention, the counted number of the copying process counter 320 is brought to zero in step n4-12, and thus the occurrence of the above inconvenience is avoided.

When the counter 344 is not set in step n4-7, and when the counter 344 has not countered the predetermined number in step n4-9, step n4-14 sets in. In step n4-14, it is judged whether the first copying paper jam counter 336 is set. When the counter 336 is set, the counter 366 performs counting in step n4-15, and thereafter in step n4-16, it is judged whether the counter 336 has counted a predetermined number. When the counter 336 has counted the predetermined number (namely, when the copying paper jams upstream of the detecting means 232), the fact that the copying paper jammed upstream of the detecting means 232 is stored in a paper trouble memory 368 included in the processing means 306 in step n4-17. Then, in step n4-18, the continuity flag 312 is reset at logic "0", and thereafter in step n4-19, it is judged whether the counted value of the copying paper counter 322 is 2 or more. If the counted number of the paper counter 322 is not 2 or more, step n4-20 sets in. In step n4-20, the inhibition flag 314 is set at logic "1", and thereafter, step n4-66 sets in. When the counted value of the paper counter 322 is 2 or more, after the delay of a predetermined period of time in step n4-21, the inhibition flag 314 is set at logic "1" in step n4-22. Then, step n4-66 sets in.

With regard to these steps n4-19, to n4-22, the following fact should be noted. As stated hereinabove, the paper counter 322 counts up by one as a result of the closing of the detecting means 216 by the copying paper fed to the first or second paper instroducing passage 70a or 70b from the paper feed device 52, and counts down by one when the trailing edge of the copying paper has passed the detecting position of the detecting means 236 disposed at the discharge end portion of the paper conveying passage (in more detail, after the lapse of a predetermined period of time defined by the predetermined number of the second paper conveyance counter 330 from the aforesaid time of passage). Accordingly, the counted number of the paper counter 322 indicates the number of copying paper sheets present in the first paper introducing passage 70a, the second paper introducing passage 70b and the paper conveying passage. The fact that the counted value of the paper counter 322 is 1 or 0 when the copying paper jams upwardly of the detecting means 232 means that no copying paper exists downstream of the detecting means 232. In such a case, the inhibition flag 314 is set at logic "1" in step n4-20 to stop the operation of the copying apparatus immediately. On the other hand, the fact that the counted value of the paper counter 322 is 2 or more when the copying paper jams upstream of the detecting means 232 means that a separate copying paper different from the jamming paper exists downstream of the detecting means 232. In such a case, a delay of a predetermined period of time is provided in step n4-21 to continue the operation of the copying apparatus for a required period of time, and the separate copying paper existing downstream of the detecting means 232 is discharged into the sorter 10. Thereafter, in step n4-22, the inhibition flag 314 is set at logic "1" to stop the operation of the copying apparatus.

When the counter 336 is not set in step n4-14, and when the counter 336 has not counted the predetermined value, step n4-23 sets in, and in step n4-23, it is judged whether the second paper jam counter 338 is set. When the counter 338 is set, the counter 338 performs counting in step n4-24, and thereafter, in step n4-25 it is jedged whether the counter 338 has counted a predetermined number. When the counter 338 has counted the predetermined number (namely, when the copying paper jams in a path from the detecting means 232 to the detecting means 234 and/or the copying paper wraps about the photosensitive member 20), step n4-26 sets in. In step n4-26, it is judged whether the detecting means 244 detects the copying paper. When the detecting means 244 detects the copying paper (namely, when the counting of the predetermined number by the counter 338 in step n4-25 is attributed to the wrapping of the copying paper about the photosensitive member 20), the wrapping of the paper about the photosensitive member 20 is stored in the paper trouble memory 368 in step n4-27, and in step n4-28, the continuity flag 312 is reset at logic "0". Thereafter, in step n4-29, the inhibition flag 314 is set at logic "1", and then step n4-66 sets in. When the detecting means 244 does not detect the copying paper in step n4-26 (namely, when the counting of the predetermined number by the counter 338 in step n4-25 is attributed to the jamming of the copying paper in a path from the detecting means 232 to the detecting means 234), the jamming of the copying paper between the detecting means 232 and the detecting means 234 is stored in the paper trouble memory 368 in step n4-30, and in step n4-31, the continuity flag 312 is reset at logic "0". Thereafter, in step n4-32, the inhibition flag 314 is set at logic "1", and then step n4-66 sets in.

When the counter has not counted the predetermined number in step n4-25, step n4-33 sets in. In step n4-33, it is judged whether the detecting means 244 detects the copying paper. The detection of the copying paper by the detecting means 244 in step n4-33 means that the detecting means 244 has detected the wrapping of the copying paper about the photosensitive member in spite of the fact that because of the detection of the copying paper by the detecting means 234, the counter 338 has not counted the predetermined number in step n4-25. Hence, this means that two sheets of copying paper are fed simultaneously, and one of them wraps about the photosensitive member and the other exists in the conveying passage. In such a case, the counted value of the paper counter 322 is increased by 1 in step n4-34. As a result, the counted number of the paper counter 322 is made equal to the number of copying paper sheets which exist in the main body 2 of the copying apparatus and should therefore be removed before resuming the copying process. Then, in step n4-35, the above fact is stored in the paper trouble memory 368, and thereafter in step n4-36, the continuity flag 312 is reset at logic "0". Then, in step n4-37, the inhibition flag 314 is set at logic "1", and thereafter step n4-66 sets in.

When the counter 338 is not set in step n4-23 and when the detecting means 244 does not detect the copying paper in step n4-33, step n4-38 sets in. In step n4-38, it is judged whether the third paper jam counter 340 is set. When the counter 340 is set, the counter 340 performs counting in step n4-39, and thereafter, in step n4-40, it is judged whether the counter 340 has counted a predetermined number. When the counter 340 has counted a predetermined number (namely, when the copying paper has jammed between the detecting means 234 and the detecting means 236), the fact that the copying paper has jammed between the detecting means 234 and the detecting means 236 is stored in the paper trouble memory 368 in step n4-41. Then, in step n4-42, the continuity flag 312 is reset at logic "0", and in step n4-43, the inhibition flag 314 is set at logic "1". Thereafter, step n4-66 sets in.

When the counter 340 is not set in step n4-38, and when the counter 340 has not counted a predetermined number in step n4-40, step n4-44 sets in. In step n4-44, it is judged whether the fourth paper jam counter 342 is set. When the counter 342 is set, the counter 342 performs counting in step n4-45, and thereafter the step n4-46, it is judged whether the counter 342 has counted a predetermined number. When the counter 342 has counted the predetermined number (namely, when the copying paper has jammed during the time from the arrival of the leading edge of the copying paper at the detecting position of the detecting means 236 to the passage of its trailing edge past this detecting position), this fact is stored in the paper trouble memory 368 in step n4-47. Then, in step n4-48, the continuity flag 312 is reset at logic "0", and in step n4-49, the inhibition flag 314 is set at logic "1". Thereafter, step n4-66 sets in.

When the counter 342 is not set in step n4-44 and when the counter 342 has not counted the predetermined number in step n4-46, step n4-50 sets in. In step n4-50, it is judged whether a trouble has occurred in the sorter 10. When a trouble has occurred in the sorter 10, a signal showing this fact is fed from the detecting means 256 into the processing means 306. When a trouble has occurred in the sorter 10, the occurrence of the trouble in the sorter 10 is stored in a sorter trouble memory 370 included in the processing means 306 in step n4-51, and in step n4-52, the continuity flag 312 is reset at logic "0". Then, the inhibition flag 314 is set at logic "1" in step n4-53, and thereafter step n4-66 sets in.

When no trouble has occurred in the sorter 10 in step n4-50, step n4-54 sets in, and in this step, it is judged whether the second document jam counter 346 is set. When the counter 346 is set, the counter 346 performs counting in step n4-55, and thereafter, in step n4-56, it is judged whether the counter 346 has counted a predetermined number. When the counter 346 has counted the predetermined number (namely, when the document moved away for discharge from the transparent plate 12 in the semi-automatic document supplying and discharging device 6 has jammed before it reaches the detecting device 266), the jamming of the discharged document before reaching the detecting means 266 is stored in the document trouble memory 366 in step n4-57. After the delay of a predetermined period of time in step n4-58, the inhibition flag 314 is set at logic "1" in step n4-59, and thereafter step n4-66 sets in. The delay of a predetermined period of time in step n4-58 permits the discharging of the copying paper conveyed in the main body 2 of the copying apparatus.

When the counter 346 is not set in step n4-54, and when the counter 346 has not counted the predetermined number in step n4-56, step n4-60 sets in. In step n4-60, it is judged whether the third document jam counter 348 is set. When the counter 348 is set, the counter 348 performs counting in step n4-61 and it is judged in step n4-62 whether the counter 348 has counted a predetermined number. When the counter 348 has counted the predetermined number. (namely, when the document has jammed during the time from the arrival of the leading edge of the discharged document at the detecting position of the detecting means 266 to the time of passage of its trailing edge past this detecting position), this fact is stored in the document trouble memory 366 in step n4-63. Then, after the delay of a predetermined period of time in step n4-64, the inhibition flag 314 is set at logic "1" in step n4-65. Thereafter, step n4-66 sets in.

When the counter 348 is not set in step n4-60, and when the counter 348 has not counted the predetermined number in step n4-62, step n4-66 sets in.

In step n4-66, it is judged whether a signal for the performance of the copying process, i.e. the aforesaid copying process performance signal produced by momentarily closing the print switch 282 (FIG. 6) by hand or the aforesaid document insertion signal produced by the detection of the manually inserted document by the detecting means 258 in the semi-automatic document supplying and discharging device 6, is produced. When the above signal is produced in step n4-66, step n4-67 sets in, and it is judged whether the inhibition flag 314 is set at logic "1". When the inhibition flag 314 is not set (namely, when the copying process ir ready for performance), step n4-68 sets in. In step n4-68, the continuity flag 312 is set at logic "1". Then in step n4-69, the counted number of the copy number setting counter 310 is displayed, and in step n4-70, the counted number of the copying process counter 320 is displayed. The counted number of the copy number setting counter 310 is displayed digitally in the first display means 302 (FIG. 6), and the counted number of the copying process counter 320 is displayed digitally in the second display means 304 (FIG. 6). When the aforesaid signal is not produced in step n4-66, the process directly goes to step n4-69 and n4-70.

On the other hand, when the inhibition flag 314 is set at logic "1" in step n4-67 (namely when the performance of the copying process is impossible), step n4-71 sets in. In step n4-71, it is judged whether a trouble has occurred in the various constituent elements of the copying apparatus. When a trouble has occurred in the constituent elements, the datum stored in the trouble memory 362 is displayed in step n4-72. Such displaying may include the energization of the serviceman call lamp 298 (FIG. 6) and the indication in the first display means 302 (FIG. 6) of a specific constituent element which has got out of order. Such a display in the first display means 302 may be "L1" as shown in FIG. 12-A when such an element is the document illuminating lamp 118.

When no trouble has occurred in the constituent elements in step n4-71, step n4-73 sets in. In step n4-73, it is judged whether the key card 276 (FIGS. 1 and 2) is inserted in the key card inserting section 274 (FIGS. 1 and 2). When the key card 276 is not inserted, the datum stored in the key card memory 364 is displayed in step n4-74. Such a displaying may be the energization of the key card lamp 294 (FIG. 6).

When the key card 276 is inserted in step n4-73, step n4-75 sets in. In step n4-75, it is judged whether a trouble has occurred in the conveying of the document in the semi-automatic document supplying and discharging device 6. When a trouble has occurred in the conveying of the document, the datum stored in the document trouble memory 366 is displayed in step n4-76. Such a displaying may include the energization of the trouble lamp 300 and the displaying in the first display means 302 (FIG. 6). The display in the first display means 302 may, for example, be "D1" which is a combination of "D" showing the document and the number "1" indicating the place of jamming (meaning the upstream side of the detecting means 264), as illustrated in FIG. 12-B.

When no trouble has occurred in the conveying of the document in step n4-75, step n4-77 sets in. In step n4-77, it is judged whether a trouble has occurred in the conveying of the copying paper in the main body 2 of the copying apparatus. When a trouble has occurred in the conveying of the copying paper, the datum stored in the paper trouble memory 368 is displayed in step n4-78, and in step n4-79, the counted number of the paper counter 322 is displayed. Displaying of the datum stored in the paper trouble memory 368 may include the energization of the trouble lamp 300 (FIG. 6) and displaying in the first display means 302 (FIG. 6). The display in the first display means 302 may be a combination of "P" showing the paper and the number "2" indicating the place of jamming (or wrapping) (the number 2 means a place between the detecting means 232 and the detecting means 234). The counted member of the paper counter 322 is digitally displayed in the second display means 304 (FIG. 6), as shown in FIG. 12-C. The counted number, such as "2", of the paper counter 322 displayed digitally in the second display means 304 means the number of copying paper sheets which exist in the main body 2 of the copying apparatus and should be removed before resuming the copying process.

When no trouble has occurred in the conveying of the copying paper in step n4-77, step n4-80 sets in, and the datum of the sorter trouble memory 370, which relates to the trouble in the sorter 10, is displayed. Such displaying may include the energization of the trouble lamp 300 (FIG. 6) and displaying in the first display means 302 (FIG. 6). The display in the first display means 302 may, for example, be "S" which means the sorter, as illustrated in FIG. 12-D.

In the trouble display control system described hereinabove, the following fact should be noted. Conventional copying apparatuses, too, are adapted to indicate the occurrence of various troubles in the apparatus to the operator. In the conventional apparatuses, however, displaying of troubles is effected before the manual operation of the print switch (or the manual insertion of the document), and therefore, the operator tends to be embarassed or surprised at such displaying and be unable, because of this mental disturbance, to properly cope with the troubles. In contrast, as will be easily appreciated by reference to steps n4-66 and n4-67, troubles are displayed only after the operation of the operator, i.e. the manual operation of the print switch 284 (FIG. 6) or the manual insertion of the document, and the undesirable tendency seen with the conventional copying apparatuses can be avoided.

Controlling on the basis of the temperature of the surface or its vicinity of the photosensitive member In the electrostatic copying apparatus improved in accordance with this invention, the electrical heating means 237 for heating the photosensitive member 20 as described hereinabove is provided. The electrical heating means 237 (FIG. 4) is constructed of, for example, a heater. With reference to FIG. 4, the electrical heating means 237 is disposed beneath the transfer corona discharge device 42 within the housing 4 (FIG. 3). Preferably, the electrical heating means 237 is disposed in proximity to the photosensitive member 20. It can be provided at a suitable position inwardly or outwardly of the rotating drum 18.

Figure 13:
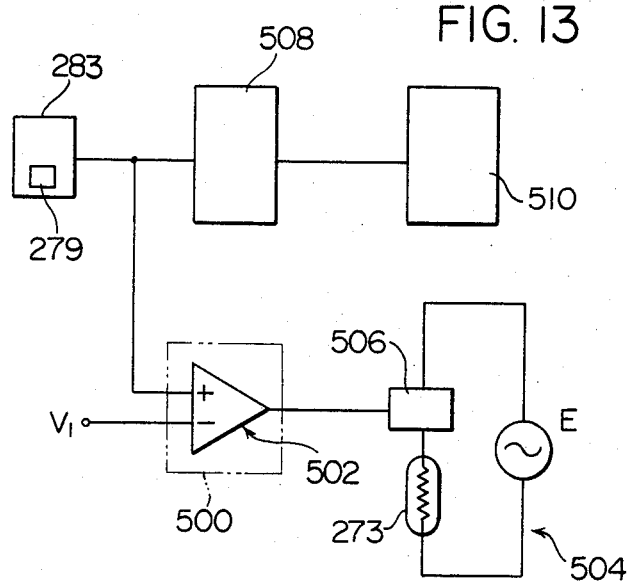
FIG. 13 is a schematic view showing a control system for controlling a charging corona discharge device and an electric heating means in the copying apparatus shown in FIG. 1.

In the electrostatic copying apparatus, a control system shown in FIG. 13 is provided in relation to the electrical heating means 237. The control system includes a detecting device 283 including the temperature detecting means 279 for detecting the temperature of the surface or its vicinity of the photosensitive member 20 and a heating control means 500 included in the processing means 306. The temperature detecting means 279 can be constructed of a detecting means for example a thermistor whose vesistance value decreases with a rise in the detected temperature. The output voltage of the detecting device 283 is increased in proportion to the detected temperature of the temperature detecting means 279. In the illustrated embodiment, this detecting device 283 is provided in proximity to the photosensitive member 20 downstream of the peeling corona discharge device 46 as viewed in the rotating direction of the rotating drum 18 shown by the arrow 22 (FIG. 4). The heating control means 500 comprises a comparator 502. In this control system, the output voltage from the detecting device 283 based on the temperature detected by the temperature detecting means 279 is fed to a non-inverted input of the comparator 502 of the heating control means 500. A reference voltage $V_1$ is applied to a inverted input of the comparator 502. The reference voltage $V_1$ is set at a voltage equal to the output voltage from the detecting device 283 at a predetermined temperature (35° C. in the illustrated embodiment) at which dew formation on the surface of the photosensitive member 20 can be prevented and the charging voltage of the photosensitive member 20 can be maintained at a right value. The output signal from the comparator 502 is fed into a normally closed switch means 506 disposed in a heating control circuit 504, and the switch means 506 is opened or closed by this output signal. In the heating control circuit 504, the electrical heating means 273 is connected to a suitable power supply E such as a commercial AC power supply through the switch means 506. Hence, when the switch means 506 is closed, the electrical heating means 273 is energized, and when the switch means 506 is opened, the electrical heating means 273 is deenergized.

The output voltage of the detecting device 283 which is based on the temperature detected by the temperature detecting means 279 is also fed into a charging control means 508 included in the processing means 306. The output signal from the charging control means 508 is fed into a high voltage source 510 such as a high voltage transformer, and on the basis of this output, the output voltage of the high voltage source 510 is controlled. The charging control means 508 controls the output voltage of the high voltage source 510 on the basis of the output voltage of the detecting device 283, and acts to increase and decrease the output voltage of the high voltage source 510 substantially in proportion of the rising and falling of the output voltage of the detecting device 279, or in other words, to the rising and falling of the temperature detected by the detecting device 279. The output signal of the high voltage source 510 is fed into the charging corona discharge device 38.

With reference to FIGS. 4 and 13, the operation and effect of the electrostatic copying apparatus equipped with the control system described above will be described.

When the temperature of the surface or its vicinity of the photosensitive member 20 is below a relatively low predetermined value (35° C. in the illustrated embodiment), the output voltage from the detecting device 283 is lower than, or equal to, the reference voltage $V_1$, and the output signal of the comparator 502 becomes zero. Hence, the switch means 506 is closed, and the electrical heating means 273 is energized to thereby heat the photosensitive member 20. When the photosensitive member 20 is heated and the temperature of its surface or its vicinity rises, the charging control means 508 controls the output voltage of the high voltage source 510 on the basis of the output voltage from the detecting device 283, and increases the output voltage of the high voltage source 510 in proportion to the rise of the above temperature.

On the other hand, when the photosensitive member 20 is heated by the electrical heating means 273 and the temperature of the surface or its vicinity of the photosensitive member 20 exceeds a predetermined value (35° C. in the illustrated embodiment), the output voltage from the detecting device 283 becomes larger than the reference voltage $V_1$, and the output signal of a predetermined voltage from the comparator 502 is fed into the switch means 506. As a result, the switch means 506 operates and becomes open, whereby the electrical heating means 273 is deenergized, and the heating of the photosensitive member 20 is stopped. When the heating of the photosensitive member 20 is stopped and the temperature of the surface or its vicinity of the photosensitive member 20 drops, the charging control means 508 controls the output voltage of the high voltage source 510 on the basis of the output voltage from the detecting device 283, and the output voltage of the high voltage source 510 is decreased in proportion to the dropping of the temperature.

As stated hereinabove, in the electrostatic copying apparatus equipped with the aforesaid control system, the temperature of the surface or its vicinity of the photosensitive member 20 is maintained approximately at a predetermined value (35° C. in the illustrated embodiment) by the energization of deenergization of the electrical heating means 273. It is possible therefore to prevent dew formation on the surface of the photosensitive member 20 and to obtain a copied image of good quality.

Furthermore, since the voltage applied to the charging corona discharge device 38 by the action of the charging control means 508 is increased and decreased in proportion to the rise and fall of the temperature of the surface of its vicinity of the photosensitive member 20, the charge potential applied to the surface of the photosensitive member 20 by the charging corona discharge device 38 can be controlled to a right value depending upon the aforesaid temperature, and a copied image of good quality can therefore be obtained.

Control of heating the heat fixing device

Figure 14:
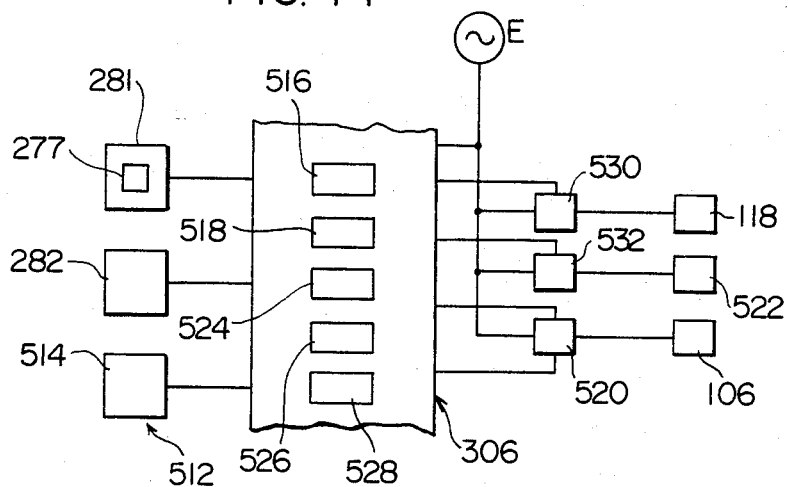
FIG. 14 is a schematic view showing a control system for controlling an electrical heating means of a heat fixing device in the copying apparatus shown in FIG. 1.

In the electrostatic copying apparatus improved in accordance with this invention, a control system illustrated in FIG. 14 is provided in relation to the heat fixing device 104 (FIG. 3). The control system further includes a power saving means 512 and a heating control means (not shown) included in the processing means 306, in addition to the power switch 282 and the detecting device 281 including the temperature detecting means 277 for detecting the temperature of the heat fixing device 104. The temperature detecting means 277 is provided in contact with, or in proximity to, the surface of the heating roller 108 (FIG. 3) in the heat fixing device 104, and detects the temperature of the surface or its vicinity of the heating roller 108. Such a temperature detecting means 277 can be constructed of, for example, a thermistor. The power saving means 512 comprises a power saving switch 514 disposed on the panel 280, and produces a power saving signal when manually closed. The heating control means of the processing means 306 includes a memory 516 and a first heater counter 518. A first predetermined value $T_1$, a second predetermined value $T_2$ and a third predetermined value $T_3$ are stored in the memory 516. The first predetermined value $T_1$ is set at a temperature (about 180° C. in the illustrated embodiment) which is suitable for heat fixing the toner image on the copying paper by the heat fixing device 104. The second predetermined value $T_2$ is set at a suitable temperature (190° C. in the illustrated embodiment) which is higher than the first predetermined temperature value $T_1$ ($T_1 < T_2$). The third predetermined value $T_3$ is set at a suitable temperature (160° C. in the illustrated embodiment) which is higher than the softening temperature of the toner but is lower than the first predetermined value $T_1$ ($T_3 < T_1$). The first heater counter 518 is comprised of a backup-type counter, and begins counting up when the power switch 282 is closed, and begins counting down when the power switch 282 is opened. A detailed description of the detecting device 281 is omitted here since it is given hereinafter.

In the above control system, the output signals of the power switch 282 and the detecting device 281 including the temperature detecting means 277 and the power saving signal of the power saving switch 514 are fed into the heating control means of the processing means 306. The output signal from the heating control means is fed into the switch means 520 and causes the opening and closing of the switch means 520. When the switch means 520 is closed, the electrical heating means 106 of the heat fixing device 104 is connected to a suitable power supply E such as a commercial AC power supply and energized. When the switch means 520 is opened, the aforesaid connection is released to deenergize the electrical heating means 106.

Figure 15:
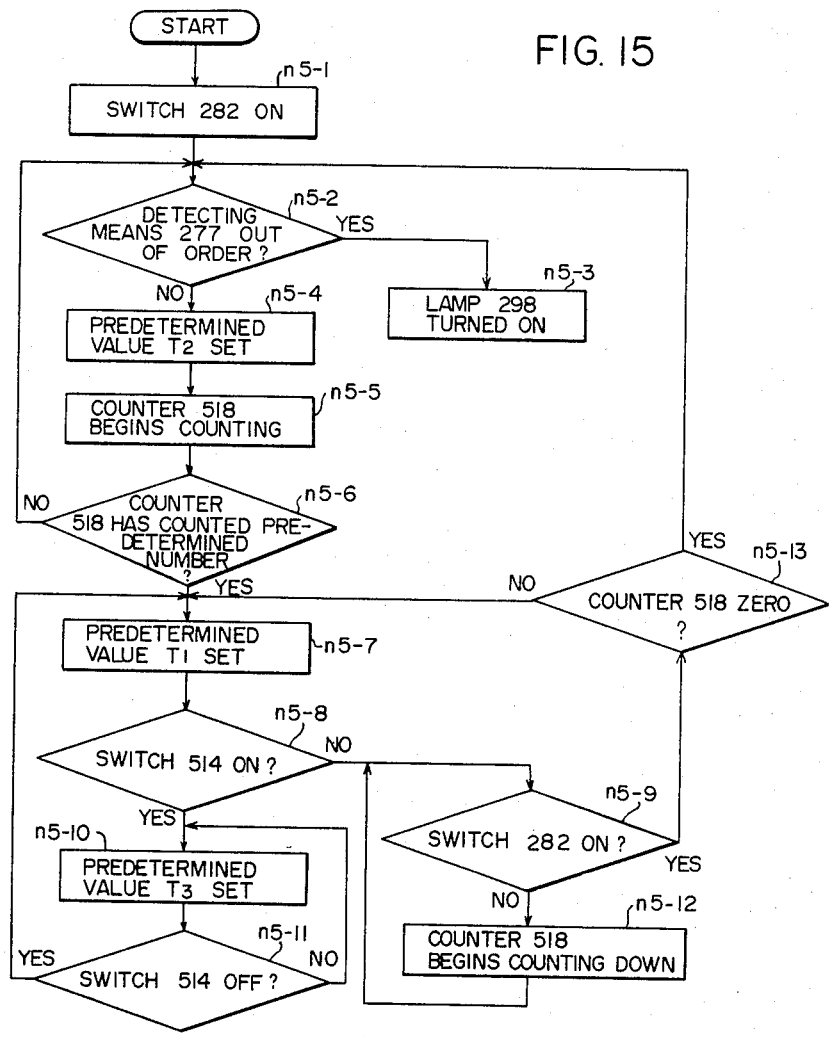
FIG. 15 is a flow chart showing the mode of controlling heating of a heat fixing device in the copying apparatus shown in FIG. 1.
Figure 16:
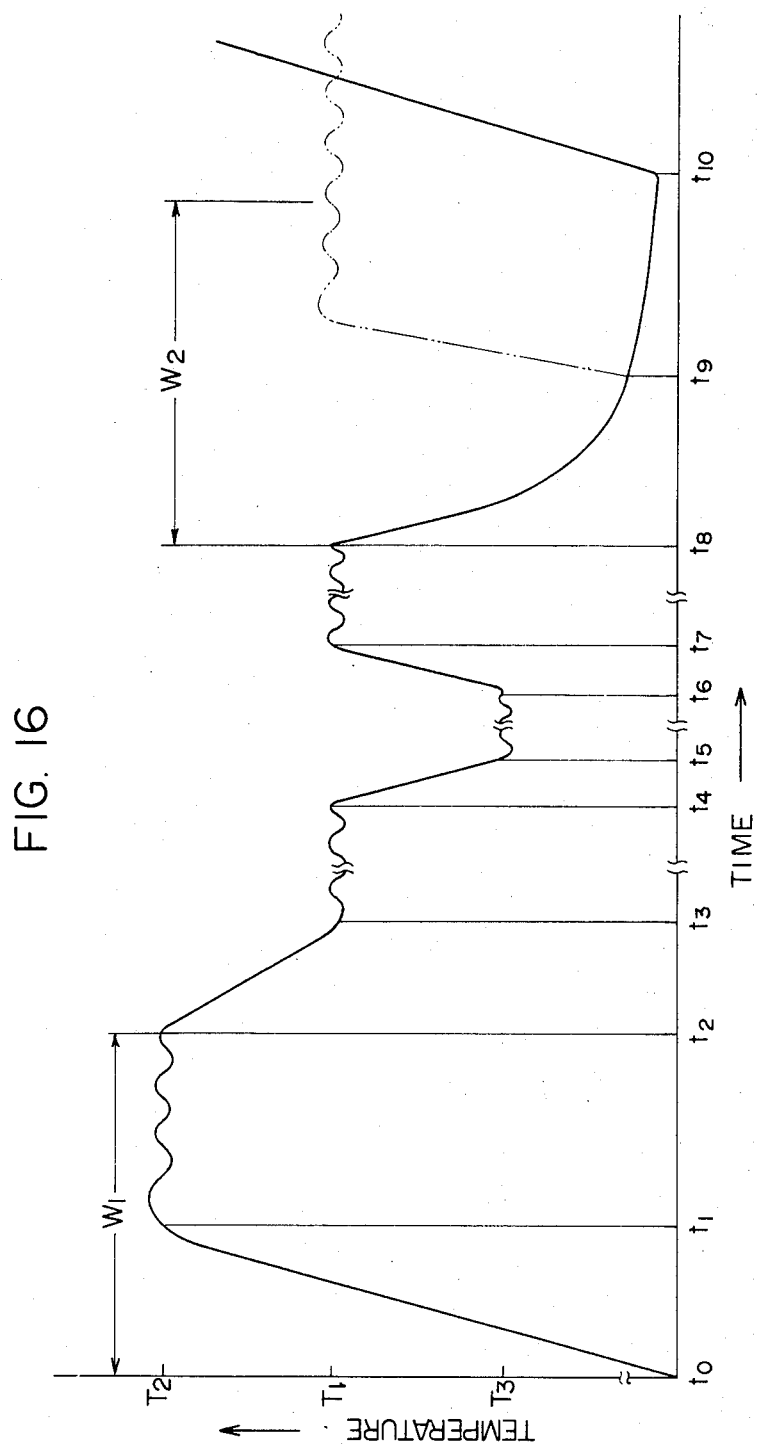
FIG. 16 is a diagram showing changes with time of the temperature of the heat fixing device in the copying apparatus shown in FIG. 1.

The operation and effect of the heat fixing device 104 including the aforesaid control system will be described with reference to FIG. 15 showing a flow chart of the method of control by the control system described above and FIG. 16 which shows changes with time of the temperature of the surface or its vicinity of the heating roller 180. When the power switch 282 on the panel 280 is closed in step n5-1, step n5-2 sets in. In step n5-2, it is judged whether the temperature detecting means 277 is out of order (for example, when the temperature detecting means 277 is constructed of a thermistor, whether the thermistor has breaks). When the power switch 282 is closed, the electrical heating means 106 is energized to heat the heat fixing device 104 and at the same time the waiting flag 308 included in the processing means 306 is set at logic "1", whereby the waiting display lamp 296 (FIG. 6) is energized to indicate that the heat fixing device 104 is in a preparatory condition. The waiting flag 308 is reset at logic "0" once the temperature of the heat fixing device 104 detected by the temperature detecting means 277 has exceeded the second predetermined value $T_2$ as a result of heating by the electrical heating means 106. Hence, the waiting display lamp 296 is deenergized. The waiting flag 308 is set when the power saving switch 514 is closed or the power switch 282 is opened. Moreover, when the power saving switch 514 is opened and the temperature detected by the temperature detecting means 277 has exceeded the first predetermined value $T_1$, the waiting flag 308 is reset.

When in step n5-2 it is judged that the temperature detecting means 277 is out of order, step n5-3 sets in, and the service man call lamp 298 on the panel 280 is turned on, thus showing that some trouble has occurred in the copying apparatus. On the other hand, when it is judged in step n5-2 that the temperature detecting means 277 is not out of order, step n5-4 sets in, and the second predetermined value $T_2$ (about 190° C.) stored in the memory 516 in the heating control means is read out, and set [When the predetermined value $T_2$ has been set, the electrical heating means 106 is controlled based on the signal from the detecting device 281 such that the temperature of the surface or its vicinity of the heating roller 108 is adjusted substantially to the second predetermined value $T_2$ (about 190° C.)]. Then, step n5-5 sets in, and counting up of the counter 518 of the heat control means is started. Furthermore, step n5-6 sets in, and it is judged in this step whether the counter 518 has counted a predetermined number. The predetermined number is the number of counts corresponding to a first predetermined time $W_1$ from time $t_0$ to time $t_2$ in FIG. 16. Hence, when the counter 518 has counted the predetermined number, the first predetermined time $W_1$ elapses. This first predetermined time $W_1$ is, for example, 10 to 15 minutes. When in step n5-6 it is judged that the counter 518 has not counted the predetermined number, step n5-2 again sets in. When during the counting of the counter 518, the heat fixing device 104 is heated to cause the temperature of the surface or its vicinity of the heating roller 108 to exceed the second predetermined value $T_2$, the waiting flag 308 is reset at logic "0" on the basis of the signal from the temperature detecting means 277. As a result, the waiting display lamp 296 is deenergized to show that the copying process is in condition for performance. Although at this time the ambient temperature of the heat fixing device 104 is slightly lower than that in an optimal condition, the temperature of the surface or its vicinity of the heating roller 108 after the deenergization of the waiting display lamp 296 becomes the second predetermined value $T_2$ which is higher than the first predetermined value $T_1$. Hence, the toner image can be fixed satisfactorily.

On the other hand when in step n5-6 it is judged that the counter 518 has counted the predetermined number, step n5-7 sets in, and the first predetermined value $T_1$ (about 180° C.) stored in the memory 516 of the heating control menas is read out. Thus, instead of the second predetermined value $T_2$, the first predetermined value $T_1$ is set [when the predetermined value $T_1$ has been set, the electrical heating means 106 is controlled on the basis of the signal from the detecting device 281 such that the temperature of the surface or its vicinity of the heating roller 108 is adjusted substantially to the first predetermined value $T_1$ (about 180° C.)]. At this time, the counter 518 keeps maintaining the aforesaid predetermined count number. Thus, the electrical heating means 106 is controlled such that the temperature of the surface or its vicinity of the heating roller 108 is adjusted substantially to the first predetermined value $T_1$. After the time $t_3$, this temperature is maintained substantially at the first predetermined value $T_1$, and the temperature of the ambient atmosphere is maintained at an optimal value.

Accordingly, when the power switch 282 is closed to apply power, the temperature of the surface or its vicinity of the heating roller 108 is maintained substantially at the second predetermined value $T_2$ higher than the first predetermined value $T_1$ even during the time from $t_1$ to $t_2$, and thereafter is maintained substantially at the first predetermined value $T_1$ after the time $t_3$. Thus, it is maintained at a temperature optimal for the heat fixing of the toner image.

When the first predetermined value $T_1$ is set in step n5-7, step n5-8 sets in. In step n5-8, it is judged whether the power saving switch 514 is closed. When it is judged in step n5-8 that the power saving switch 514 is not closed, step n5-9 sets in. In step n5-9, it is judged whether the power switch 282 is closed. When it is judged in step n5-9 that the power switch 282 is closed, step n5-13 sets in, and it is judged in this step whether the counter 518 is zero. When it is judged in step n5-13 that the counter 518 is not zero, step n5-7 again sets in. Hence, after the time $t_3$, the temperature of the surface or its vicinity of the heating roller 108 is maintained substantially at the first predetermined value $T_1$ unless the power saving switch 514 or the power switch 282 is closed.

On the other hand, when it is judged in step n5-8 that the power saving seitch 514 is closed, step n5-10 sets in, and the third predetermined value $T_3$ (about 160° C.) stored in the memory 516 in the heating control means is read out. As a result, the third predetermined value $T_3$ is set instead of the first predetermined value $T_1$ [when the predetermined value $T_3$ has been set, the electrical heating means 106 is controlled on the basis of the signal from the detecting device 281 such that the temperature of the surface of its vicinity of the heating roller 108 is adjusted substantially to the third predetermined value $T_3$ (about 160° C.)]. When the third predetermined value $T_3$ has been set in step n5-10, step n5-11 follows. In step n5-11, it is judged whether the power saving switch 514 is opened. When it is judged in step n5-11 that the power saving switch 514 is not opened, the step n5-10 again sets in. Hence, when the power saving switch 514 is closed after the time $t_4$, the electrical heating means 106 is controlled such that the temperature of the surface or its vicinity of the heating roller 108 is adjusted substantially to the third predetermined value $T_3$. After the time $t_5$, this temperature is maintained substantially at the third predetermined value $T_3$. When the power saving switch 514 is closed, the waiting flag 308 is reset at logic "0" to energize the waiting display lamp 296 (FIG. 6), thus showing that the heat fixing device 104 is in a preparatory condition.

On the other hand, when it is judged in step n5-11 that the power saving switch 514 is opened, step n5-7 again sets in. In step n5-7, the first predetermined value $T_1$ stored in the memory 516 is read out, and the first predetermined value $T_1$ is set instead of the third predetermined value $T_3$ (when the predetermined value $T_1$ is set, the electrical heating means 106 is controlled such that the temperature of the surface or its vicinity of the heating roller 108 is adjusted substantially to the first predetermined value $T_1$). Thus, when the power saving switch 514 is closed, and thereafter opened at time $t_6$, the electrical heating means 106 is controlled such that the temperature of the surface or its vicinity of the heating roller 108 is adjusted substantially to the first predetermined value. After the time $t_7$, this temperature is maintained substantially at the first predetermined value $T_1$. When the power saving switch 514 is opened, and by the heating of the electrical heating means 106, the temperature of the heat fixing device 104 detected by the temperature detecting means 277 exceeds the first predetermined value $T_1$, the waiting flag 308 is reset at logic "0" to deenergize the waiting display lamp 296, thus showing that the copying process is in a preparatory condition.

When in step n5-9 it is judged that the power switch 282 is not closed, step n5-12 sets in, and the counting down of the counter 518 is started. The count down of the counter 518 is one from the predetermined number maintained in step n5-5. When the counting down of the counter 518 is performed, step n5-9 again sets in. Hence, when the power switch 282 is opened at time $t_8$, the counting down of the counter 518 is effected, and the copying apparatus is cut off from the power supply to deenergize the electrical heating means 106. Since the power supply is turned off upon the opening of the power switch 282, the waiting flag 308 is reset at logic "0" and thus the waiting display lamp 296 is also deenergized. If it is judged in step n5-9 that the power switch 282 is closed before the number held by the counter 518 becomes zero by the counting down of the counter 518 from the predetermined number in step n5-12 (that is to say, beofre the lapse of a second predetermined time $W_2$ to be described after the opening of the power switch 282), step n5-13 sets in. In step n5-13, it is judged whether the counted value of the counter 518 is zero. Thereafter, step n5-7 again sets in, and the first predetermined value $T_1$ is set in the heating control means. In this case, the counting up of the counter 518 is also started although it is not shown in the flow chart. The counting up can be carried out from the count down number kept in the counter 518 to the predetermined number. Hence, when at time $t_9$ after the opening of the power switch 282 but before the lapse of the second predetermined time $W_2$, the power seitch 282 is again closed to turn on the power supply, the electrical heating means 106 is controlled such that the temperature of the surface or its vicinity of the heating roller 108 is adjusted substantially to the first predetermined value $T_1$. The second predetermined time $W_2$ is the time required for the counter 518 to count down from the predetermined number to zero, and is, for example, 10 to 15 minutes. When the power switch 282 is closed, the waiting flag 308 is set at logic "1" to energize the waiting display lamp 296. When the heating by the electrical heating means 106 causes the temperature detected by the temperature detecting means 277 to exceed the first predetermined value $T_1$, the waiting flag 308 is reset to logic "0" to deenergize the waiting display lamp 296. On the other hand, when it is judged in step n5-9 that the power switch 282 is closed, after the counter 518 has performed counting down and the number kept by the counter 518 has become zero in step n5-12 (in other words, after the second predetermined time $W_2$ has elapsed after the opening of the power switch 282), step n5-13 sets in. In step n5-13, it is judged whether the counter 518 is zero, and thereafter step n5-2 agains sets in. Accordingly, when at time $t_{10}$ which is after the opening of the power switch 282 and further elapsing of the second predetermined period of time $W_2$, the power switch 282 is again closed to turn on the power supply, the electrical heating means 106 is controlled such that the temperature of the surface or its vicinity of the heating roller 108 is adjusted substantially to the second predetermined value $T_2$ which is higher than the first predetermined value $T_1$. A detailed description of the controlling of the electrical heating means 106 on the basis of the signal from the detecting device 281 including the temperature detecting means 277 is omitted here since it is given hereinafter.

In the illustrated embodiment, the first predetermined time $W_1$ and the second predetermined time $W_2$ are measured by one backup-type counter 518. If desired, two such counters may be used so that one of them is used to measure the first predetermined time $W_1$, and the other to measure the second predetermined time $W_2$.

As stated hereinabove, in the heat fixing device 104 equpped with the control system described above, the temperature of the surface or its vicinity of the heating roller 108 is usually kept substantially at the second predetermined value $T_2$ higher than the first predetermined value $T_1$ suitable for heat fixing after the power supply has been turned on, and thereafter it is maintained substantially at the first predetermined value $T_1$. It is possible therefore to bring the temperature of the surface or its vicinity of the heating roller 108 and the ambient temperature to a temperature suitable for heat fixing within a short period of time, and the waiting time after the application of power can be shortened.

Furthermore, since the temperature of the surface or its vicinity of the heating roller 108 is maintained substantially at the third predetermined value $T_3$ lower than the first predetermined value $T_1$ suitable for heat fixing by the operation of the power saving means 512, power consumption can be reduced by utilizing the power saving means when there is a considerable time interval between copying cycles.

Furthermore, when the power supply is again turned on before the lapse of the second predetermined period of time $W_2$ after the turning off of the power supply (the opening of the power switch 282), the temperature of the surface or its vicinity of the heating roller 108 is maintained substantially at the first predetermined value $T_1$. Accordingly, the aforesaid temperature and the ambient temperature can be brought to a value suitable for heat fixation within short period of time.

Control of power distribution

In the electrostatic copying apparatus imporved in accordance with this invention, an control system shown in FIG. 14 is further provided in relation to the heat fixing device 104, the document illuminating lamp 118 and a drive motor 522 constituting a main electric motor (which is a drive source for the copying apparatus and drives the optical device 116, the rotating drum 18, the copying paper conveying means 50, etc.). Again with reference to FIG. 14, this control system comprises a power control means (not shown) included in the processing means 306. The power control means includes a memory 524, a decade counter 526 and a second heat counter 528. Predetermined values "4", "6" and "9" are stored in the memory 524. These predetermined values "4", "6" and "9" are used to control the amount of an electric current supplied to the electrical heating means, as will be described in detail hereinafter.

In the aforesaid control system, the output signal from the power control means of the processing means 306 is supplied to the switch means 520 (the switch 520 is opened and closed by the output signal from the heating control means as described hereinabove), and the switch means 520 is opened and closed by this output signal. The output signal from the processing means 306 is supplied to the switch means 530 and 532 to open or close the switch means 530 and 532. The switch means 530 serves to control the document illuminating lamp 118. When the switch means 530 is closed, the document illuminating lamp 118 is connected to a suitable power supply E such as a commercial AC power supply and thus energized. Furthermore, upon the opening of the switch means 530, the aforesaid connection is released and the document illuminating lamp 118 is deenergized. On the other hand, the switch means 532 serves to control the drive motor 522. When the switch means 532 is closed, the drive motor 522 is connected to the aforesaid power supply E, and when the switch means 532 is open, the aforesaid connection is released, and the drive motor 522 is deenergized. It will be easily appreciated from the foregoing description that an electric power from a power supply E such as a commercial AC power source which is a single power supply source is supplied to the electrical heating means 106, the document illuminating lamp 118 and the drive motor 522. The processing means 306 is also connected to the power supply E.

Figure 17:
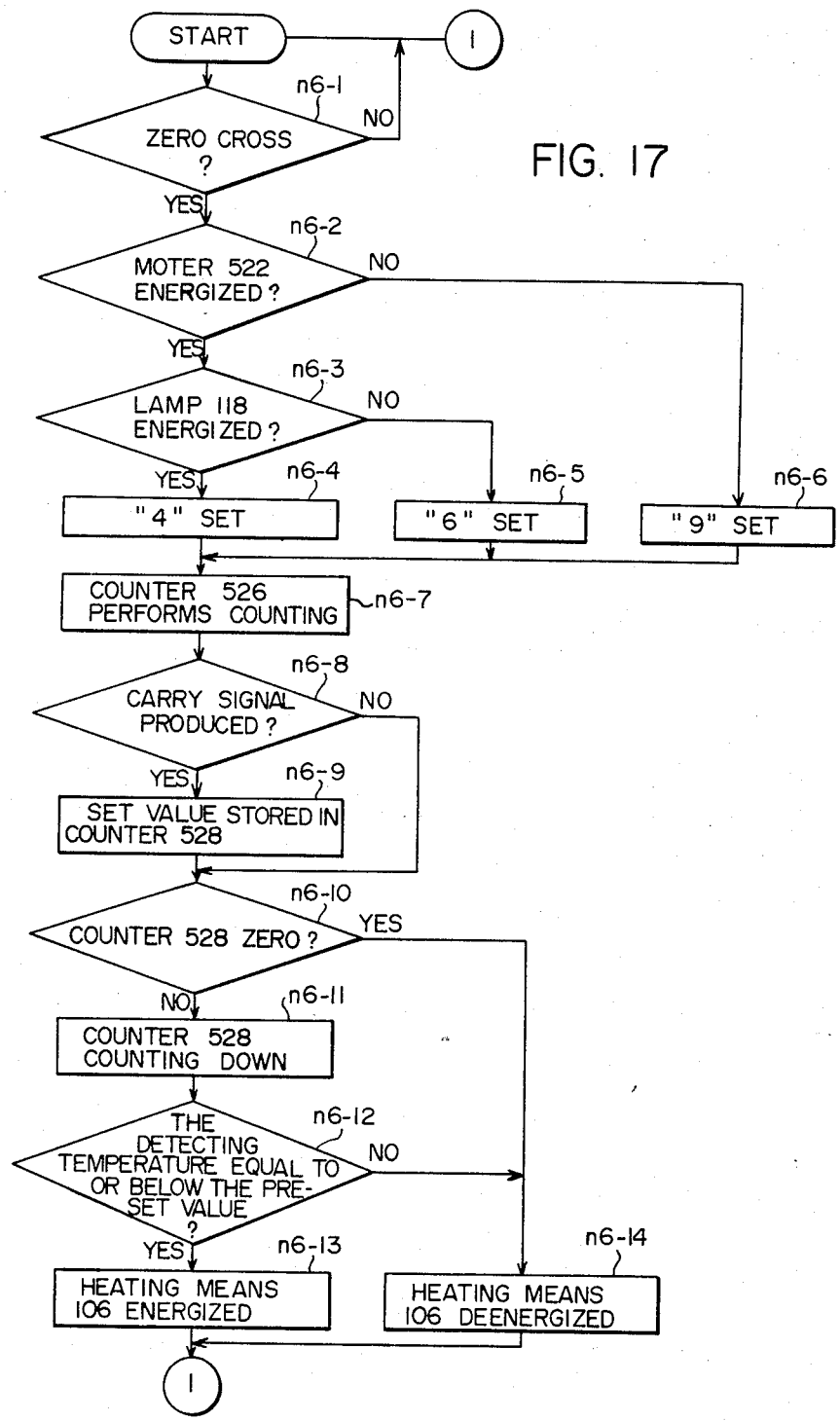
FIG. 17 is a flow chart showing the mode of controlling electric power in the copying apparatus shown in FIG. 1.

The operation and effect of the electrostatic copying apparatus equipped with the aforesaid control means will be described with reference to FIG. 17 showing the flow chart of the method of controlling according to the control system described above and FIG. 18. In the following description, a commercial AC power supply is used as the power supply E. When the power supply is turned on, it is first judged in step n6-1 whether the voltage of the power supply E is zero cross. When it is judged that it is not zero cross, the original state is revived. On the other hand, when it is judged that the voltage is zero cross, step n6-2 sets in. In step n6-2, it is judged whether the drive motor 522 is energized (therefore, whether the switch 532 is closed). When it is judged in step n6-2 that the drive motor 522 is energized, the next step n6-3 sets in, and in this step, it is judged whether the document illuminating lamp 118 is energized (therefore, whether the switch 530 is closed). When in step n6-3 it is judged that the document illuminating lamp 118 is energized, step n6-4 sets in. In step n6-4, the predetermined value "4" stored in the memory 524 in the power control means is read out and set. On the other hand, when it is judged in step n6-3 that the document illuminating lamp is not energized, step n6-5 sets in. In step n6-5, the predetermined value "6" stored in the memory 524 in the power control means is read out and set. Furthermore, when it is judged in step n6-2 that the drive motor 522 is not energized, step n6-6 sets in. In step n6-6, the predetermined value "9" stored in the memory 524 in the power control means is read out and set. Accordingly, when the drive motor 522 and the document illuminating lamp 118 are not energized, the predetermined value "9" is set, and when the drive motor 522 is energized, the predetermined value "6" is set. Furthermore, when the drive motor 522 and the document illuminating lamp 118 are energized, the predetermined value "4" is set.

After the predetermined value has been set in step n6-4, n6-5 or n6-6, step n6-7 sets in and the counting of the decade counter 526 is started. The decade counter 526 counts up from 0 to 9 for each half cycle of the power supply E. When the counting of the decade counter 526 begins, step n6-8 then sets in, and it is judged in this step whether the decade counter 526 has counted up to 9 and produced a carry signal. When it is judged in step n6-8 that the carry signal has been produced, step n6-9 sets in. In step n6-9, the aforesaid predetermined value is transferred to the second heater counter 528 and store. More specifically, when the predetermined value "4" is set in step n6-4, this predetermined value "4" is stored in the heater counter 528. When the predetermined value "6" is set in step n6-5, the predetermined value "6" is stored in the heater counter 528. When the predetermined value "9" is set in step n6-6, this predetermined value "9" is stored in the heater counter 528. Thereafter, step n6-10 sets in, and it is judged in this step whether the value of the heater counter 528 is zero. The heater counter 528 counts down one by one from the aforesaid stored value for each half cycle of the power supply E. When it is judged in step n6-8 that the carry signal is not produced, step n6-8 is followed by step n6-10. When it is judged in step n6-10 that the heater counter 528 is not zero, step n6-11 sets in and the heater counter 528 counts down by one. Then, step n6-12 sets in, and it is judged in this step whether the detected temperature of the heat fixing device 104 (therefore, the temperature of the surface or its vicinity of the heating roller 108 which is detected by the temperature detecting means 277) is equal to, or below, the prescribed value. [In more detail, when the first predetermined value (about 180° C.) is set in the heating control means, it is judged whether the detected temperature is equal to, or below, the first predetermined value; when the second predetermined value (about 190° C.) is set, it is judged whether the detected temperature is equal to or below the second predetermined value; and when the third predetermined value (about 160° C.) is set, it is judged whether the detected temperature is equal to or lower than the third predetermined value.] When it is judged in step n6-12 that the detected temperature is equal to or lower than the preset value, step n6-13 sets in and the electrical heating means 106 is energized (the switch means 520 is closed by the signals from the power control mean and the heating control means). Thereafter, the process returns to step n6-11. On the other hand, when it is judged in step n6-12 that the detected temperature is not equal to, or below, the preset value, step n6-14 sets in, and the electrical heating means 106 is deenergized (the switch means 520 is opened by the signals from the heating control means irrespective of the signal from the power control means). Thereafter, the process returnes to step n6-1. When the aforesaid step is performed, and it is judged in step n6-10 that the counted number of the heater counter 528 is zero, step n6-14 sets in, and the electrical heating means 106 is deenergized (the switch means 520 is opened by the signal from the power control means irrespective of the signal from the heating control means). Thereafter, step n6-1 again sets in. Thereafter, the aforesaid operation is repeated until the power supply of the copying apparatus is turned off. It will be readily appreciated that in the above control system, the above operation is repeated for each half cycle of the alternate current from the power supply E.

In the above-described flow chart, the operations performed when the predetermined value "4" is set in step n6-4 (therefore when the drive motor 522 and the document illuminating lamp 118 are energized), when the predetermined value "6" is set in the step n6-5 (therefore, when the motor 522 is energized), and when the predetermined value "9" is set in step n6-6 (therefore, when the drive motor 522 and the document illuminating lamp 118 are not energized) are briefly as follows:

In the case of the predetermined value "4" being set, the predetermined value "4" is stored in the heater counter 528 when the decade counter 526 has produced a carry signal (namely, when the decade counter 526 has counted up one by one and reached 9). After the decade counter 526 has produced a carry signal, it again returns to 0, and counts up one by one from 0. After the predetermined value "4" has been stored, the heater counter 528 counts down one by one from the predetermined value "4" for each half cycle of the AC current of the power supply E. Until it is counted down to zero, the switch means 520 is closed by the signal from the power control means, and the current from the power supply E is fed into the electrical heating means 106. After the counted value has reached zero, the switch means 520 is opened by the signal from the power control means and the supply of the current is stopped. In such a case, therefore, the current supplied to the electrical heating means is as shown by (1) in FIG. 18, and after storage in the heater counter 528, an alternate current of five half cycles is supplied to the electrical heating means 106, and during the period from the time $t_{11}$ to $t_{12}$, the electrical heating means 106 is energized. When the decade counter 526 counts up one by one for each half cycle of the power supply E and again produces a carry signal, the aforesaid operation is repeated. It will be readily appreciated from the foregoing statement that by the carry signal of the decade counter 526, ten half cycles of the power supply E form one cycle Q (for example, from the time $t_{11}$ to the time $t_{13}$). When the predetermined value "4" is set, the amount of current per predetermined period supplied to the electrical heating means 106 becomes one-half of the amount of current per predetermined period from the power supply E by the action of the power control means. When the aforesaid detected temperature is higher than the preset value, the switch means 520 is opened by the signal from the heating control means. Accordingly, even when the counted value of the heater counter 528 is not zero, the electrical heating means 106 is not energized.

When the predetermined value "6" is set, the predetermined value "6" is stored in the heater counter 528 when the decade counter 526 has produced a carry signal. After the predetermined value "6" has been stored, the heater counter 528 counts down one by one from the predetermined value "6" for each half cycle of the alternate current of the power supply E. Until the counted value becomes zero as a result of counting down, the switch means 520 is closed by the signal from the power control means, and the current from the power supply E is supplied to the electrical heating means 106. After the counted value has become zero, the switch means 520 is opened by the signal from the power control means, and the supply of the current is stopped. Accordingly, in this case, the current supplied to the electrical heating means 106 is as shown by (2) in FIG. 18, and after storage in the heater counter 528, an alternate current of seven half cycles is supplied to the electrical heating means 106, and thus, the electrical heating means 106 is energized during the period from the time $t_{11}$ to the time $t_{14}$. When the decade counter 526 counts up one by one for every half cycle of the power supply E and again produces a carry signal, the aforesaid operation is repeated. Thus, when the predetermined value "6" is set, the amount of current per predetermined period supplied to the electrical heating means 106 becomes 7/10 of the amount of current per predetermined period from the power supply E by the action of the power control means. In this case, too, when the detected temperature is the above the predetermined value, the switch means 520 is opened by the signal from the heating control means. Hence, even when the counted number of the heater counter is not zero, the electrical heating means 106 is not energized.

Furthermore, when the predetermined value "9" is set, the predetermined value "9" is stored in the heater counter 528 when the decade counter 526 has produced a carry signal. After the predetermined value "9" has been stored, the heater counter 528 counts down one by one from the predetermined value "9" for each half cycle of the alternate current from the power supply E. Until the counted value becomes zero as a result of counting down, the switch means 520 is closed by the signal from the power control means, and the current from the power supply E is supplied to the electrical heating means 106. Since the predetermined value is "9", the current supplied to the electrical heating means 106 is as shown by (3) in FIG. 18, and after storage in the heater counter 528, an alternate current of 10 half cycles is supplied to the electrical heating means, and thus, the electrical heating means 106 is energized during the period from the time $t_{11}$ to the time $t_{13}$. When the decade counter 526 counts up one by one for each half cycle of the power supply E and again produces a carry signal, the above operation is repeated. When the predetermined value "9" is set, the amount of current per predetermined period supplied to the electrical heating means 106 becomes substantially equal to the amount of current per predetermined period from the power supply E by the action of the power control means. In this case, too, the switch means 520 is opened by the signal from the heating control means when the detected temperature is above the prescribed value. Hence, the electrical heating means 106 is not energized.

As stated hereinabove, in the electrostatic copying apparatus equpped with the control system described above, when the document illuminating lamp 118 and the drive motor 522 are deenergized, the amount of current per predetermined period supplied to the electrical heating means 106 is greatest, and its power consumption is greatest. When the drive motor 522 is energized, the amount of current per predetermined period is smaller than in the above-described instance, and the power consumption is of a medium degree. When the drive motor 522 and the document illuminating lamp 118 are energized, the amount of current per predetermined period of time is smallest, and the power consumption is smallest. Accordingly, in the aforesaid electrostatic copying apparatus, the power consumption increases as a result of the energization of the drive motor 522 and the document illuminating lamp 118, but the overall increase of the power consumption in the entire copying apparatus can be prevented by reducing the power consumption of the electrical heating means 106. This is effective especially when there is used a power supply having a restricted maximum power consumption, such as a commercial AC power supply. Furthermore, since the maximum power is supplied to the electrical heating means 106 immediately after application of power when the drive motor 522 and the document illuminating lamp 118 are deenergized, the time required until the temperature of the surface or its vicinity of the heating roller 108 reaches a value suitable for the fixation of a toner image (the waiting time) can be shortened.

Figure 18:
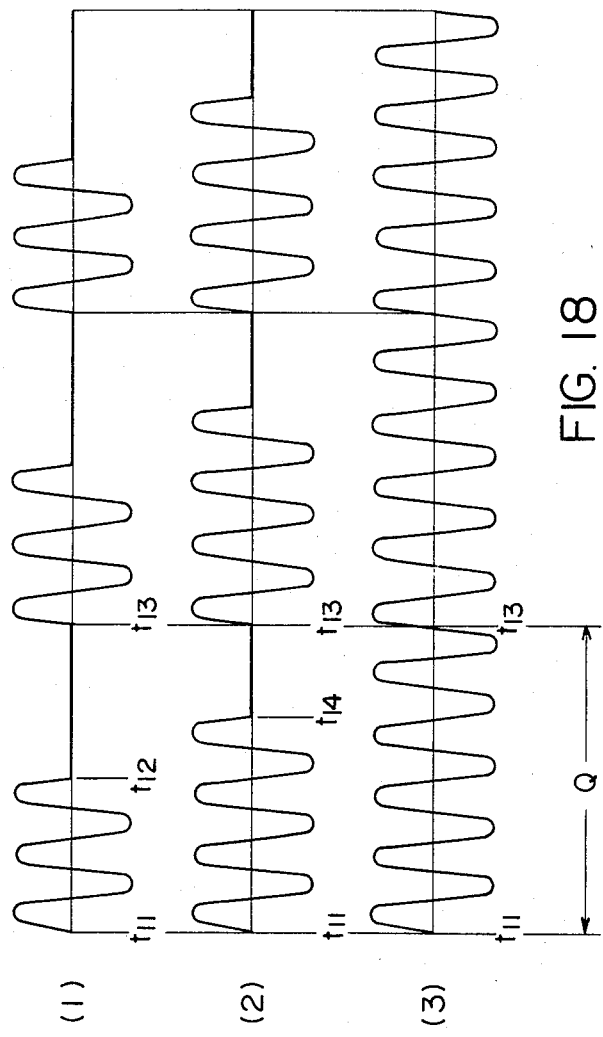
FIG. 18 is a diagram showing the waveform of a current supplied to an electrical heating means of a heat fixing device in the copying apparatus shown in FIG. 1.
Figure 19:
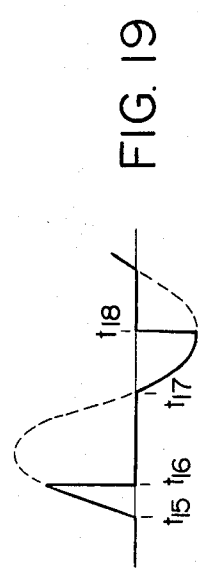
FIG. 19 is a diagram showing a modified example of the waveform of a current supplied to an electrical heating means of a heat fixing device.

It will be clear from FIG. 18 that in the illustrated embodiment, the amount of current per predetermined period supplied to the electrical heating means 106 is controlled by using a half cycle of the power supply E as one unit. If desired, the amount of current may be controlled as shown in FIG. 19. In FIG. 19, the alternate current of the power supply is controlled in each half cycle. As regards the AC current shown in FIG. 19, that part of the current which corresponds to the period from the time $t_{15}$ to the time $t_{16}$ and that part of the current which corresponds to the period from the time $t_{17}$ to the time $t_{18}$ are supplied to the electrical heating means 106 as a result of the opening and closing of the switch means 520 by the signal from the power control means. By controlling the current as shown in FIG. 19, substantially the same effect as in the case of FIG. 18 can be obtained.

In the illustrated embodiment, the power consumption of the electrical heating means is controlled according to the power consumption of the drive motor 522 and the document illuminating lamp 118 which consume a relatively great deal of power. If desired, the power consumed by the electrical heating means 106 can also be controlled according to the power consumption of the electric heating means 237 (FIG. 4), the electric motor 188 for the semiautomatic document supplying and discharging device, a fan motor (not shown) for cooling the document illuminating lamp, etc. in addition to the above. In this case, the amount of current per predetermined period supplied to the electrical heating means 106 may be decreased stepwise according to the number of electrical means (the drive motor 522, the document illuminating lamp 118, the electric motor 188, the electrical heating means 237, etc.).

Electrical detecting device

Figure 20:
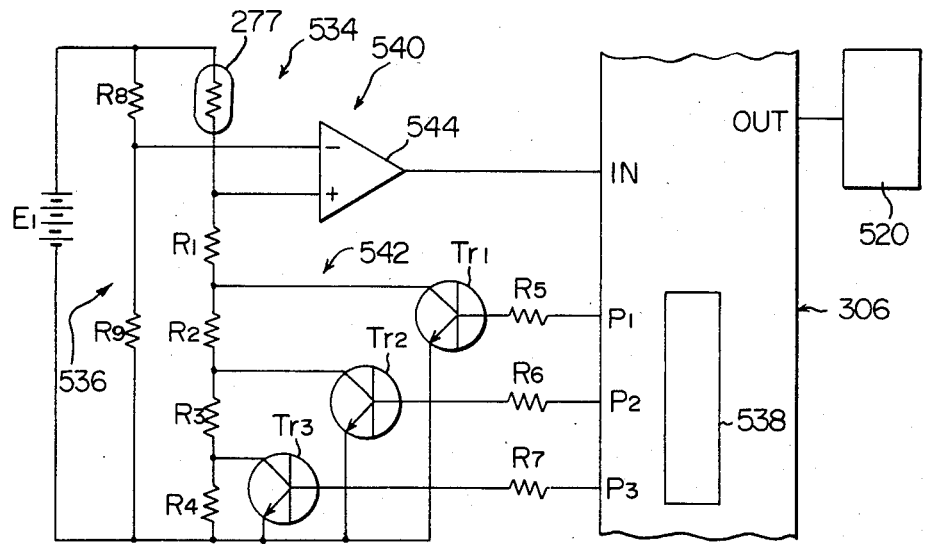
FIG. 20 is a circuit diagram showing a detecting device for a heat fixing device in the copying apparatus shown in FIG. 1.

In the electrostatic copying apparatus improved in accordance with this invention, an electrical detecting device shown in FIG. 20 is used as the aforesaid detecting device 281 (FIG. 14) provided in relation to the heat fixing device 104 (FIG. 3). With reference to FIG. 20, this electrical detecting device includes a first linear-connected circuit portion 534, a second linear-connected circuit portion 536, a switching control means 538 included in the processing means 306, a comparison means 540 and a DC power supply $E_1$. The first linear-connected circuit portion 534 includes the aforesaid temperature detecting means 277 (constituting an electrical detecting element) such as a thermistor for detecting the temperature of the surface or its vicinity of the heating roller 108, and a variable voltage dividing circuit 542 connected in series to the temperature detecting means 277. The variable voltage dividing circuit 542 has resistance elements $R_1$, $R_2$, $R_3$ and $R_4$ and transistors $Tr_1$, $Tr_2$ and $Tr_3$ constituting switching means. The resistance elements $R_1$, $R_2$, $R_3$ and $R_4$ are connected to each other in series. The transistor $Tr_1$ is connected parallel to a series circuit portion composed of the resistance elements $R_2$, $R_3$ and $R_4$, and the transistor $Tr_2$ is connected parallel to a series circuit portion composed of the resistance elements $R_3$ and $R_4$. The transistor $Tr_3$ is connected parallel to the resistance element $R_4$. The bases of these transistors $Tr_1$, $Tr_2$ and $Tr_3$ are connected respectively to output terminals $P_1$, $P_2$ and $P_3$ of the switching control means 538 through resistance elements $R_5$, $R_6$ and $R_7$. The switching control means 538 will be described in detail hereinafter. The second linear-connected circuit portion 536 has resistance elements $R_8$ and $R_9$ connected to each other in series. The second linear-connected circuit portion 536 and the aforesaid first linear-connected circuit portion 534 are connected parallel to each other to the DC power supply $E_1$. The comparison means 540 is constructed of a comparator 544. The non-inverted input terminal of the comparator 544 is connected to a point of connection between the temperature detecting means 277 and the variable voltage dividing circuit 542 in the first linear-connected circuit portion 534, and its inverted input terminal is connected to a point of connection between the resistance elements $R_8$ and $R_9$ in the second linear-connected circuit portion 536. On the other hand, the output terminal of the comparator 544 is connected to an input terminal IN of the heating control means included in the processing means 306. Thus, when a first divided voltage at the point of connection between the temperature detecting means 277 and the variable voltage dividing circuit 542 becomes equal to, or below, a second divided voltage (acting as a reference voltage) of the point of connection between the resistance elements $R_8$ and $R_9$, a signal of logic "0" is produced in the comparator 544. This logic "0" signal is fed into the heating control means formed of memory 516 and first heater counter 518 (FIG. 14). When the first divided voltage becomes higher than the second divided voltage, a signal of logic "1" is produced in the comparator 544 and is fed to the heating control means. A signal produced in the heating control means on the basis of the signal from the comparator 544 is fed to the switch means 520, and the switch means 520 is opened or closed on the basis of this signal. As stated above, when the switch means 520 is closed, the electrical heating means 106 (FIGS. 3 and 14) is energized. When the switch means 520 is opened, the electrical heating means 106 is deenergized. The switch means 520 is also opened or closed by the power control means as stated hereinabove.

Figure 21:
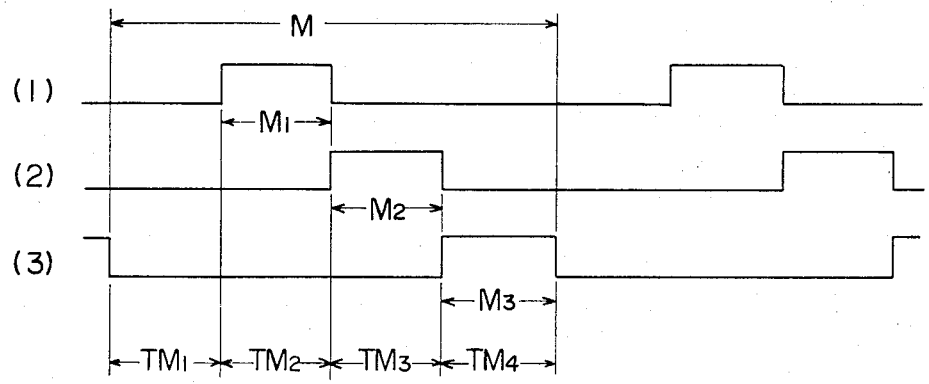
FIG. 21 is a diagram showing signals delivered from a switching control means in the detecting device shown in FIG. 20.

Now, the switching control means 538 will be described. FIG. 21 depicts output volage as a function of time. The signals shown in FIG. 21 are delivered respectively from the output terminals $P_1$, $P_2$ and $P_3$ of the switching control means 538. A high level signal of a cycle M with a pulse width $M_1$ shown by (1) in FIG. 21 is delivered from the output terminal $P_1$. From the output terminal $P_2$, a high level signal of a cycle M with a pulse width $M_2$ as shown by (2) in FIG. 21 is delivered. The high level signal with a pulse width $M_2$ is delivered according to the falling of the high level signal with a pulse width $M_1$. Furthermore, a high level signal of a cycle M having a pulse width $M_3$ shown by (3) in FIG. 21 is delivered from the output terminal $P_3$. The high level signal with a pulse width $M_3$ is delivered according to the falling of the high level signal with a pulse width $M_2$. In the illustrated embodiment, the pulse widths $M_1$, $M_2$ and $M_3$ of the high level signals are the same and set at one-fourth of the cycle M. The resistance values of the resistance elements $R_1$, $R_2$, $R_3$ and $R_4$ of the variable voltage dividing circuit 542 are selected such that in a first timing period $TM_1$ (when a high level signal is not delivered from the switching control means 538), the first divided voltage does not become lower than the second divided voltage unless the resistance value of the temperature detecting means 277 becomes larger than that at the lowest expected temperature ($-20°$ C. in the illustrated embodiment); that in a second timing period $TM_2$ (when the high level signal with a pulse width $M_1$ is delivered from the switching control means 538), the first divided voltage does not become lower than the second divided voltage unless the resistance value of the temperature detecting means 277 becomes higher than that at the aforesaid second predetermined value $T_2$ (about 190° C.); that in a third timing period $TM_3$ (when the high level signal with a pulse width $M_2$ is delivered from the switching control means 538), the first divided voltage does not become lower than the second divided voltage unless the resistance value of the temperature detecting means 277 becomes higher than that at the aforesaid first predetermined value $T_1$ (about 180° C.); and that in a fourth timing period $TM_4$ (when the high level signal with a pulse width $M_3$ is delivered from the switching control means 538), the first divided voltage does not become lower than the second divided voltage unless the resistance value of the temperature detecting means 277 becomes higher than that at the aforesaid third predetermined value $T_3$ (about 160° C.). The second divided voltage can be set at a suitable value by varying the resistance values of the resistance elements $R_8$ and $R_9$.

Now, the operation and effect of the detecting device will be described. When no high level signal is delivered from the switching control means 538 (during the first timing period $TM_1$), the transistors $Tr_1$, $Tr_2$ and $Tr_3$ are held at cut off, and the current from the DC power supply $E_1$ flows through the temperature detecting means 277 and the resistance elements $R_1$, $R_2$, $R_3$ and $R_4$. In this case, therefore, the voltage between the two terminals of the series circuit portion composed of the resistance elements $R_1$, $R_2$, $R_3$ and $R_4$ is the first divided voltage, and in the comparator 544, this first divided voltage is compared with the second divided voltage. When it is found that the first divided voltage is higher than the second divided voltage [in other words, when the detected temperature of the temperature detecting means 277 is higher than the lowest conceivable temperature ($-20°$ C.)], the output signal of the comparator 544 becomes logic "1". When the first divided voltage is equal to, or lower than, the second divided voltage [in other words, when the detected temperature of the temperature detecting means 277 is equal to, or lower than, the lowest conceivable temperature; but since such an instance is not conceivable, when a trouble (such as wire breaks if a thermistor is used) occurs in the temperature detecting means 277], the output signal of the comparator 544 becomes logic "0". It is possible therefore to determine by the output signal from the comparator 544 during the first timing period $TM_1$ whether the temperature detecting means 277 gets out of order.

When the high level signal with a pulse width $M_1$ is delivered from the switching control means 538 (during the second timing period $TM_2$), the transistor $Tr_1$ conducts, and the current from the DC power source $E_1$ flows through the temperature detecting means 277, the resistance element $R_1$ and the transistor $Tr_1$. Hence, in this case, the voltage between the two terminals of the resistance element $R_1$ is the first divided voltage, and this first divided voltage is compared with the second divided voltage in the comparator 544. When it is found that the first divided voltage is higher than the second divided voltage [in other words, when the detected temperature of the temperature detecting means 277 is higher than the second predetermined value $T_2$ (about 190° C.)], the output signal of the comparator 544 becomes logic "1". When the first divided voltage is equal to, or lower than, the second divided voltage [in other words, when the detected temperature of the temperature detecting means 277 is equal to, or lower than, the second predetermined value $T_2$ (about 190° C.)], the output signal of the comparator 544 becomes logic "0". Thus, it is possible to determine by the output signal from the comparator 544 during the second timing period $TM_2$ whether the detected temperature of the temperature detecting means 277 is equal to, or lower than, the second predetermined value $T_2$.

When the high level signal with a pulse width $M_2$ is delivered from the switching control means 538 (during the third timing period $TM_3$), the transistor $Tr_2$ conducts, and the current from the DC power supply $E_1$ flows through the temperature detecting means 277, the resistance elements $R_1$ and $R_2$ and the transistor $Tr_2$. In this case, therefore, the voltage between the two terminals of the series circuit portion composed of the resistance element $R_1$ and $R_2$ is the first divided voltage, and this first divided voltage is compared with the second divided voltage in the comparator 544. When the first divided voltage is found to be higher than the second divided voltage [in other words, when the detected temperature of the temperature detecting means 277 is higher than the aforesaid first predetermined value $T_1$ (about 180° C.)], the output signal of the comparator 544 becomes logic "1". When the first divided voltage is equal to, or lower than, the second divided voltage [in other words, when the detected temperature of the temperature detecting means 277 is equal to, or lower than, the first predetermined value $T_1$ (about 180° C.)], the output signal of the comparator 544 becomes logic "0". It is possible therefore to determine by the output signal from the comparator 544 during the third timing period $TM_3$ whether the detected temperature of the temperature detecting means 277 is equal to, or lower than, the first predetermined value $T_1$.

When the high level signal with a pulse width $M_3$ is delivered from the switching control means 538 (during the fourth timing period $TM_4$), the transistor $Tr_4$ conducts, and the current from the DC power source $E_1$ flows through the temperature detecting means 277, the resistance elements $R_1$, $R_2$ and $R_3$ and the transistor $Tr_3$. In this case, therefore, the voltage between the two terminals of the series circuit portion composed of the resistance elements $R_1$, $R_2$ and $R_3$ is the first divided voltage, and this first divided voltage is compared with the second divided voltage in the comparator 544. When it is found that the first divided voltage is higher than the second divided voltage [in other words, when the detected temperature of the temperature detecting means 277 is higher than the aforesaid third predetermined value $T_3$ (about 160° C.)], the output signal of the comparator 544 becomes logic "1". When the first divided voltage is equal to, or lower than, the second divided voltage [in other words, when the detected temperature of the temperature detecting means 277 is equal to, or lower than, the third predetermined value $T_3$ (about 160° C.)], the output signal of the comparator 544 becomes logic "0". It is possible therefore to determine by the output signal from the comparator 544 during the fourth timing period $TM_4$ whether the detected temperature of the temperature detecting means 277 is equal to, or lower than, the third predetermined value $T_3$.

As stated hereinabove, in the illustrated detecting device, not only a plurality of predetermined temperatures but also a throuble in the temperature detecting means 277 itself can be detected by a single temperature detecting means 277. The detecting device is characterized by the fact that a trouble in the temperature detecting means 277 can be promptly detected.

The output signal of the comparator 544 produced as above is fed to the heating control means of the processing means 306, and the switch means 520 is opened or closed by a signal produced in the heating control means on the basis of the signal fed from the comparator 544. More specifically, when the second predetermined value $T_2$ (about 190° C.) is set in the heating control means, only the output signal of the comparator 544 produced during the second timing period $TM_2$ is taken out. When this output signal is logic "0", an actuating signal is produced in the heating control means to close the switch means 520. On the other hand, when this output signal is logic "1", an operation stopping signal is produced in the heating control means to open the switch means 520. It will be readily seen from the foregoing description that when the second predetermined value $T_2$ is set, the electrical heating means 106 is controlled by the output signal of the comparator 544 produced during the second timing period $TM_2$, and consequently, the temperature of the surface or its vicinity of the heating roller 108 is adjusted substantially to the second predetermined value $T_2$.

When the first predetermined value $T_1$ (about 180° C.) is set in the heating control means, only the output signal of the comparator 544 produced during the third timing period $TM_3$ is taken out. When this output signal is logic "0", the switch means 520 is closed, and when this output signal is logic "1", the switch means 520 is opened. Accordingly, when the first predetermined value $T_1$ is set, the elqctrical heating means 106 is controlled by the output signal of the comparator 544 produced during the third timing period $TM_3$, and consequently the temperature of the surface or its vicinity of the heating roller 108 is adjusted substantially at the first predetermined value $T_1$.

When the third predetermined value $T_3$ (about 160° C.) is set in the heating control means, only the output signal of the comparator 544 produced during the fourth timing period $TM_4$ is taken out. When this output signal is logic "0", the switch means 520 is closed as stated hereinabove. On the other hand, when this output is logic "1", the switch means 520 is opened. Hence, when the third predetermined value $T_3$ is set, the electrical heating means 106 is controlled by the output signal of the comparator 544 produced during the fourth timing period $TM_4$, and consequently, the temperature of the surface or its vicinity of the heating roller 108 is adjusted substantially at the third predetermined value $T_3$.

Figure 22:
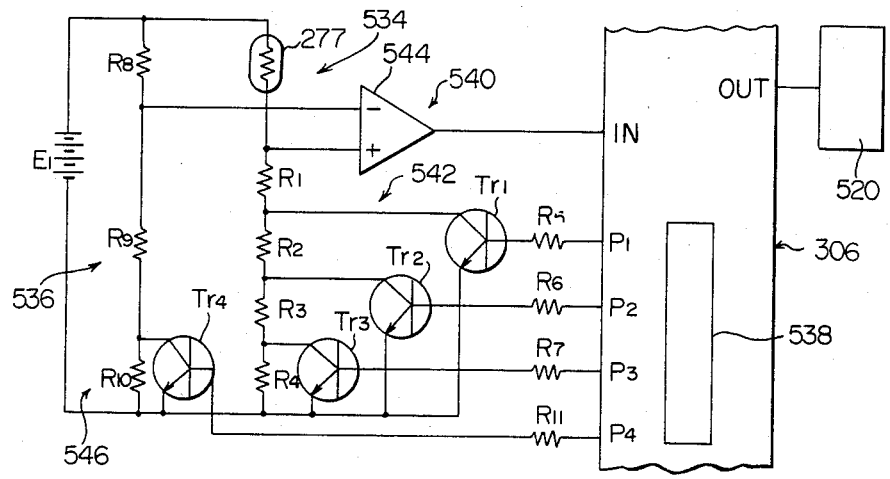
FIG. 22 is a circuit diagram showing a modified example of the detecting device shown in FIG. 20.

FIG. 22 shows a modified example of the electrical detecting device. In this figure, substantially the same parts as those in the aforesaid embodiment are designated by the same reference numerals. In the embodiment shown in FIG. 22, the second linear-connected circuit portion 536 of the electrical detecting device further comprises a parallel circuit 546 connected in series to the resistance elements $R_8$ and $R_9$. The parallel circuit 546 has an additional resistance element $R_{10}$ and a transistor $Tr_4$ constituting an additional switching means connected parallel to the resistance element $R_{10}$. The base of the transistor $Tr_4$ is connected to the output terminal $P_4$ of the switching control means 538 through a resistance element $R_{11}$. Otherwise, the structure of the detecting device in the modified example is substantially the same as that of the embodiment described hereinabove.

Figure 23:
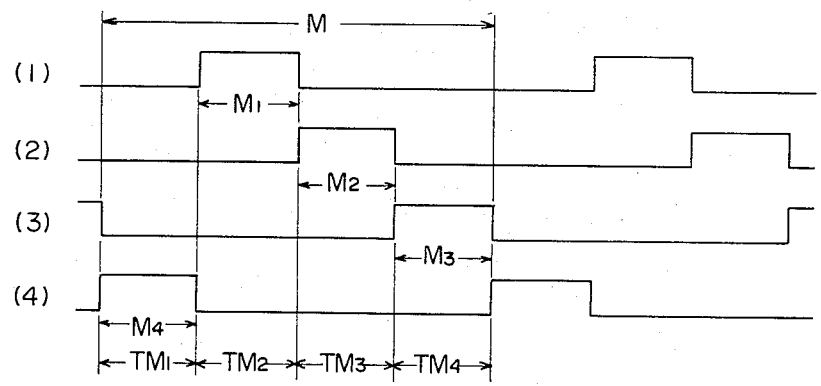
FIG. 23 is a diagram showing signals delivered from a switching control means in the modified example of the detecting device of FIG. 22.

The signals shown in FIG. 23 are delivered from the output terminals $P_1$, $P_2$, $P_3$ and $P_4$ of the switch control means 538. From the output terminal $P_1$, a high level signal of a cycle M with a pulse width $M_1$ as shown by (1) in FIG. 23 is delivered. This high level signal with a pulse width $M_1$ is delivered according to the falling of a high level signal with a pulse width $M_4$ which will be described hereinafter. Substantially the same high level signals as the aforesaid high level signal, shown by (2) and (3) in FIG. 23, are respectively delivered from the output terminals $P_2$ and $P_3$. Furthermore, a high level signal of a cycle M with a pulse width $M_4$ shown by (4) in FIG. 23 is delivered from the output terminal $P_4$. The high level signal with a pulse width $M_4$ is delivered according to the falling of the high level signal having a pulse width $M_3$. The resistance value of the resistance element $R_{10}$ in the parallel circuit 546 is selected such that during the first timing period $TM_1$ (when the high level signal having a pulse width $M_4$ is delivered from the switching control means 538), the first divided voltage does not become lower than the second divided voltage unless the resistance value of the temperature detecting means 277 becomes higher than that at the lowest conceivable temperature ($-20°$ C. in the illustrated embodiment).

When a high level signal with a pulse width $M_4$ is delivered from the switching control means 538 in this detecting device (during the first timing period $TM_1$), the transistor $Tr_4$ conducts, and the current from the DC power supply $E_1$ flows through the resistance elements $R_8$ and $R_9$ and the transistor $Tr_4$. In this case, therefore, the voltage between the two terminals of the resistance element $R_9$ is the second divided voltage, and in the comparator 544, this second divided voltage is compared with the first divided voltage (which, in this case, is the voltage between the two terminals of the seried circuit portion composed of the resistance elements $R_1$, $R_2$, $R_3$ and $R_4$). On the other hand, when a high level signal with a pulse width $M_1$, a high level signal with a pulse width $M_2$, or a high level signal with a pulse width $M_3$ is delivered from the switching control means 538 (during the second timing period $TM_2$, the third timing period $TM_3$ or the fourth timing period $TM_4$), the transistor $Tr_4$ is held at cut off, and the current from the DC power supply $E_1$ flows through the resistance elements $R_8$, $R_9$ and $R_{10}$. In this case, therefore, the voltage between the two terminals of the series circuit portion composed of the resistance elements $R_9$ and $R_{10}$ is the second divided voltage, and is compared with the first divided voltage in the comparator 544. Otherwise, the operation and effect of the detecting device in the modified example are nearly the same as those in the embodiment illustrated in FIG. 20.

In the detecting device in the modified example described above, the second divided voltage is increased during the first timing period $TM_1$. It is possible to maintain the resistance value of the resistance element $R_4$ of the first linear-connected circuit portion 534 at a lower value and the resistance values of the resistance elements $R_1$, $R_2$ and $R_3$ at higher values than in the embodiment described hereinabove. As a result, the currents flowing through the temperature detecting means 277 during the second, third and fourth timing periods $TM_2$, $TM_3$ and $TM_4$ can be reduced, and the amount of heat generated in the temperature detecting means 277 itself can be decreased.

The illustrated embodiments have been described with regard to an example in which the detecting device is applied to the detecting device 281 including the temperature detecting means 277. If desired, it is also possible to apply such a detecting device to the detecting device 283 including the temperature detecting means 279. In the latter case, only one temperature value is preset, and therefore, the resistance elements $R_2$ and $R_3$ and the transistors $Tr_2$ and $Tr_3$ can be omitted.

Furthermore, in the illustrated embodiments, the temperature is detected by using the temperature detecting means 277. If desired, elements other than temperature can be detected by using a detecting element whose resistance value changes with a change in the amount of detection, instead of the temperature detecting means 277.

While the present invention has been described hereinabove with reference to the accompanying drawings showing the preferred embodiments of the copying apparatus constructed in accordance with this invention, it should be understood that the present invention is no way limited to these specific embodiments, and various changes and modifications are possible without departing from the scope of this invention.

What is claimed is:

1. An electrostatic copying apparatus comprising
    an endless photosensitive member to be rotated sequentially through a latent electrostatic image-forming zone, a developing zone, a transfer zone and a cleaning zone,
    a latent electrostatic image-forming means for forming a latent electrostatic image on said photosensitive member in said electrostatic image-forming zone,
    a developing means of the magnetic brush type for applying a toner to said latent electrostatic image on said photosensitive member in said developing zone to develop it into a toner image,
    a copying paper conveying means for conveying a copying paper through said transfer zone, said conveying means being adapted to convey selectively at least a short copying paper having a length smaller than the total length of said photosensitive member and a long copying paper having a length greater than the total length of said photosensitive member,
    a transfer means for transferring said toner image on said photosensitive member to the copying paper in said transfer zone, and
    a cleaning blade to be selectively held in said cleaning zone between an operating position at which it is kept in contact with the surface of said photosensitive member and a non-operating position at which it is isolated from said photosensitive member; characterized in that said apparatus further comprises
    a detecting means for detecting the copying paper to determine whether it is the short or long copying paper, and
    a cleaning control means which, when said copying paper conveyed by said paper conveying means is the long one, holds said cleaning blade at said operating position for a predetermined period of time so that after the transfer, the toner remaining on said photosensitive member is removed by said cleaning blade in said cleaning zone, and when said copying paper conveyed by said paper conveying means is the short one, holds said cleaning blade at said non-operating position and maintains said photosensitive member in rotation for a predetermined period of time while said latent electrostatic image-forming means is out of operation, so that after the transfer, the toner remaining on said photosensitive member is removed by said developing means of the magnetic brush type in said developing zone.

2. The apparatus of claim 1 wherein when the copying paper to be conveyed by said paper conveying means is the short one, said cleaning control means maintains said photosensitive member in rotation during at least one turn after the trailing edge of a used area of said photosensitive member with which said copying paper makes contact in said transfer zone has passed through said developing zone.

3. The apparatus of claim 1 wherein when the copying paper to be conveyed by said paper conveying means is the lone one, said cleaning control means holds said cleaning blade at said operating position during the time from the initiation of the rotation of the photosensitive member until the rotation of the photosensitive member is stopped.

4. The apparatus of claim 1 wherein said copying paper conveying means includes a copying paper feed device comprised of at least one cassette-receiving section and at least two copying paper cassettes for selective loading in said cassette-receiving section, each said cassette containing a plurality of stacked paper sheets and the length of paper sheets in one cassette being different from that of paper sheets in another, and said detecting means includes a discriminating means for determining which of the paper cassettes is loaded in the cassette-receiving section.

5. The apparatus of claim 1 wherein said copying paper conveying means includes a copying paper feed device comprised of at least two cassette-receiving sections, at least two copying paper cassettes for loading in said cassette-receiving sections respectively, each said cassette containing a plurality of stacked paper sheets and the length of paper sheets in one cassette being different from that of paper sheets in another, and at least two copying paper supply means provided respectively in said cassette-receiving sections, one of said copying paper supply means being selectively actuated to supply a copying paper from that cassette which is loaded in the cassette-receiving section having said actuated paper supply means; and said detecting means includes a discriminating means for determining which of the copying paper supply means is actuated.

6. The apparatus of claim 1 wherein said copying paper conveying means includes a copying paper feed device comprised of at least two cassette-receiving sections, at least two copying paper cassettes containing a plurality of stacked paper sheets, the length of paper sheets in one cassette being different from that of paper sheets in another, at least one said cassettes being adapted to be loaded in one cassette-receiving section and at least one other said cassettes, in another cassette-receiving section, and at least two copying paper supply means provided respectively in said cassette-receiving sections, one of said at least two paper supply means being adapted to be selectively actuated to supply a copying paper from that cassette which is loaded in the cassette-receiving section having said actuated paper supply means; and said detecting means includes a first discriminating means for determining which of the paper cassettes is loaded in each of said cassette-receiving sections, and a second discriminating means for determining which of the paper supply means is actuated.

* * * * *